(12) United States Patent
Umetsu et al.

(10) Patent No.: US 11,038,173 B2
(45) Date of Patent: *Jun. 15, 2021

(54) LITHIUM ION SECONDARY BATTERY

(71) Applicant: Asahi Kasei Kabushiki Kaisha, Tokyo (JP)

(72) Inventors: Kazuteru Umetsu, Tokyo (JP); Hitoshi Morita, Tokyo (JP); Nobuhiro Okada, Tokyo (JP); Keita Kusuzaka, Tokyo (JP); Takeshi Kamijo, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 16/070,331

(22) PCT Filed: Jan. 20, 2017

(86) PCT No.: PCT/JP2017/001995
§ 371 (c)(1),
(2) Date: Jul. 16, 2018

(87) PCT Pub. No.: WO2017/126682
PCT Pub. Date: Jul. 27, 2017

(65) Prior Publication Data
US 2019/0020034 A1 Jan. 17, 2019

(30) Foreign Application Priority Data

Jan. 22, 2016 (JP) .............................. JP2016-010757
Aug. 8, 2016 (JP) .............................. JP2016-155391
(Continued)

(51) Int. Cl.
*H01M 4/36* (2006.01)
*H01M 4/38* (2006.01)
(Continued)

(52) U.S. Cl.
CPC .............. *H01M 4/62* (2013.01); *H01G 11/06* (2013.01); *H01G 11/24* (2013.01); *H01G 11/46* (2013.01);
(Continued)

(58) Field of Classification Search
CPC .... H01M 4/62; H01M 10/0569; H01M 4/131; H01M 10/052; H01M 10/058;
(Continued)

(56) References Cited

U.S. PATENT DOCUMENTS 5,891,416 A * 4/1999 Yamazaki .............. C01G 51/42
423/594.6
6,001,139 A * 12/1999 Asanuma ................ H01M 4/13
29/623.3
(Continued)

FOREIGN PATENT DOCUMENTS

CN 102007623 A 4/2011
CN 104011914 A 8/2014
(Continued)

OTHER PUBLICATIONS

Huff, Laura Ann, Identification of Battery Products and Intermediates Through NMR Spectroscopy, Dissertation, University of Illinois at Urbana-Champaign, 2014, pp. 1-175. (Year: 2014).*

(Continued)

*Primary Examiner* — Milton I Cano
*Assistant Examiner* — Christian Roldan
(74) *Attorney, Agent, or Firm* — Morgan, Lewis & Bockius LLP

(57) ABSTRACT

A lithium ion secondary battery of the present disclosure is provided with a positive electrode, a negative electrode, a separator, and a nonaqueous electrolyte containing lithium ions.

20 Claims, 1 Drawing Sheet

US 11,038,173 B2
Page 2

(30) Foreign Application Priority Data

| Aug. 8, 2016 | (JP) | JP2016-155675 |
| Aug. 8, 2016 | (JP) | JP2016-155689 |
| Aug. 8, 2016 | (JP) | JP2016-155802 |

(51) Int. Cl.

| H01M 4/58 | (2010.01) |
|---|---|
| H01M 4/02 | (2006.01) |
| H01M 4/04 | (2006.01) |
| H01M 10/44 | (2006.01) |
| H01M 4/62 | (2006.01) |
| H01G 11/06 | (2013.01) |
| H01G 11/86 | (2013.01) |
| H01G 11/50 | (2013.01) |
| H01G 11/56 | (2013.01) |
| H01M 10/058 | (2010.01) |
| H01G 11/24 | (2013.01) |
| H01G 11/46 | (2013.01) |
| H01M 10/052 | (2010.01) |
| H01M 4/131 | (2010.01) |
| H01M 10/0569 | (2010.01) |
| H01M 4/485 | (2010.01) |
| H01M 4/587 | (2010.01) |
| H01M 10/0525 | (2010.01) |
| H01M 10/0562 | (2010.01) |
| H01M 10/0567 | (2010.01) |
| H01M 10/04 | (2006.01) |
| H01G 11/26 | (2013.01) |
| H01G 11/52 | (2013.01) |

(52) U.S. Cl.
CPC ............. *H01G 11/50* (2013.01); *H01G 11/56* (2013.01); *H01G 11/86* (2013.01); *H01M 4/131* (2013.01); *H01M 4/364* (2013.01); *H01M 4/386* (2013.01); *H01M 4/387* (2013.01); *H01M 4/485* (2013.01); *H01M 4/587* (2013.01); *H01M 4/5825* (2013.01); *H01M 10/052* (2013.01); *H01M 10/058* (2013.01); *H01M 10/0525* (2013.01); *H01M 10/0562* (2013.01); *H01M 10/0569* (2013.01); *H01G 11/26* (2013.01); *H01G 11/52* (2013.01); *H01M 4/0447* (2013.01); *H01M 10/049* (2013.01); *H01M 10/0567* (2013.01); *H01M 10/446* (2013.01); *H01M 2004/021* (2013.01); *H01M 2300/0071* (2013.01); *Y02E 60/13* (2013.01)

(58) Field of Classification Search
CPC ......... H01M 10/0562; H01M 10/0525; H01M 4/587; H01M 4/5825; H01M 4/485; H01M 4/387; H01M 4/386; H01M 4/364; H01M 2300/0071; H01M 2004/021; H01M 10/446; H01M 10/0567; H01M 10/049; H01M 4/0447; H01G 11/46; H01G 11/24; H01G 11/56; H01G 11/50; H01G 11/86; H01G 11/06; H01G 11/52; H01G 11/26; Y02E 60/13

USPC .......................................................... 429/304
See application file for complete search history.

(56) References Cited

U.S. PATENT DOCUMENTS

| 2004/0091786 | A1 | 5/2004 | Unoki et al. |
| 2008/0076031 | A1 | 3/2008 | Yamaguchi et al. |
| 2009/0053612 | A1 | 2/2009 | Ihara et al. |
| 2009/0226819 | A1 | 9/2009 | Ihara et al. |
| 2010/0255356 | A1 | 10/2010 | Fujii et al. |
| 2011/0039160 | A1 | 2/2011 | Takahata et al. |
| 2012/0288759 | A1 | 11/2012 | Nagai et al. |
| 2013/0089778 | A1 | 4/2013 | Ihara et al. |
| 2014/0292281 | A1 | 10/2014 | Kiya et al. |
| 2014/0308578 | A1 | 10/2014 | Onizuka et al. |
| 2015/0064568 | A1* | 3/2015 | Yushin .............. H01M 10/0525 429/233 |
| 2015/0372304 | A1 | 12/2015 | Hasegawa et al. |
| 2016/0141575 | A1* | 5/2016 | Sasaki ................ H01M 2/1653 429/144 |

FOREIGN PATENT DOCUMENTS

| CN | 105103343 A | 11/2015 |
| CN | 201737540 A | 10/2017 |
| DE | 112012004372 T5 | 7/2014 |
| EP | 2216844 A2 | 8/2010 |
| JP | 2000-306602 A | 11/2000 |
| JP | 2001-283906 A | 10/2001 |
| JP | 2002-083632 A | 3/2002 |
| JP | 2005-197174 A | 7/2005 |
| JP | 2010-232469 A | 10/2010 |
| JP | 2012-209161 A | 10/2012 |
| KR | 10-2014-0118809 A | 10/2014 |
| WO | 2011/089701 A1 | 7/2011 |
| WO | 2013/090027 A1 | 6/2013 |

OTHER PUBLICATIONS

Supplemental European Search Report issued in related European Patent Application No. 17741559.3 dated May 23, 2019.
Supplemental European Search Report issued in related European Patent Application No. 17741559.3 dated Feb. 15, 2019.
International Search Report issued in corresponding International Patent Application No. PCT/JP2017/001995 dated Apr. 25, 2017.
International Preliminary Report on Patentability and Written Opinion issued in corresponding International Patent Application No. PCT/JP2017/001995 dated Aug. 2, 2018.
Liu et al., "Surface phenomena of high energy Li(Ni1/3Co1/3Mn1/3)O2/graphite cells at high temperature and high cutoff voltages," Journal of Power Sources, 269: 920-926 (2014).
Nanda et al., "Local State-of-Charge Mapping of Lithium-Ion Battery Electrodes," Advanced Functional Materials, 21: 3282-3290 (2011).
Decision to Grant issued in corresponding Japanese Patent Application No. 2017-509051 dated Nov. 7, 2017.

* cited by examiner

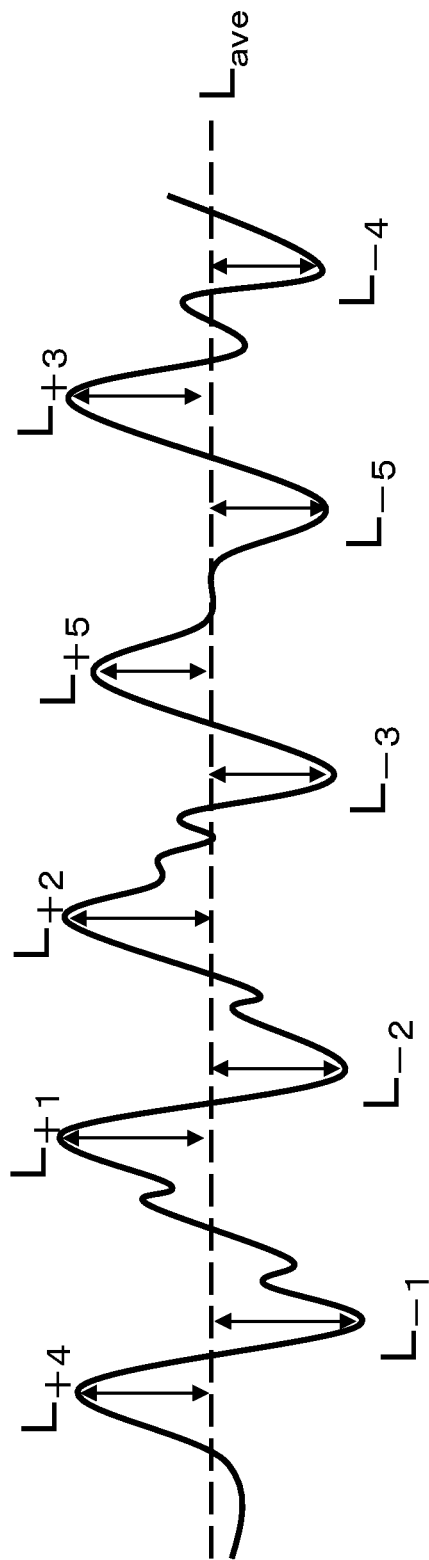

LITHIUM ION SECONDARY BATTERY

FIELD

The present invention relates to a lithium ion secondary battery.

BACKGROUND

In recent years, with an aim toward effective utilization of energy for greater environmental conservation and reduced usage of resources, a great deal of attention is being directed to power smoothing systems for wind power generation or overnight charging electric power storage systems, household dispersive power storage systems based on solar power generation technology, and power storage systems for electric vehicles and the like.

The number one requirement for cells used in such power storage systems is high energy density. The development of lithium ion secondary batteries is therefore advancing at a rapid pace, as an effective strategy for cells with high energy density that can meet this requirement.

The second requirement is a high output characteristic. For example, in a combination of a high efficiency engine and a power storage system (such as in a hybrid electric vehicle), or a combination of a fuel cell and a power storage system (such as in a fuel cell electric vehicle), the power storage system must exhibit a high output discharge characteristic during acceleration.

In the case of lithium ion secondary batteries, for example, lithium ion secondary batteries are being developed that yield high output exceeding 3 kW/L at 50% depth of discharge (a value representing the state of the percentage of discharge of the service capacity of a power storage element). However, the energy density is 100 Wh/L or less, and the design is such that high energy density, as the major feature of a lithium ion secondary battery, is reduced. Moreover, in order to provide practical durability (cycle characteristic and high-temperature storage characteristic), therefore, these are used with a depth of discharge in a narrower range than 0 to 100%. Because the usable capacity is even lower, research is actively being pursued toward further increasing the durability of lithium ion secondary batteries.

In light of this background, as a measure for improving the output characteristic and cycle durability of a lithium ion secondary battery, it has been proposed to appropriately specify the conductive filler amount, voids and pore sizes in the positive electrode active material layer of the positive electrode, in order to form a satisfactory conductive pathway in the positive electrode active material layer, increase the lithium ion conductivity and ensure retentivity of an electrolytic solution (see PTLs 1 and 2).

The third requirement is low degradation with storage and use. For example, when an internal combustion engine is operated in a hybrid electric vehicle, the power storage system is located in a high-temperature environment. A lithium ion secondary battery suffers degradation of the electrodes or electrolytic solution under elevated temperature, thereby resulting in degradation of its properties. It is therefore a major issue to suppress degradation of lithium ion secondary batteries under elevated temperature.

Research has long been carried out with the aim of suppressing degradation of lithium ion secondary batteries, and the common method is to add an additive to the electrolyte that can form a satisfactory solid electrolyte on the negative electrode by reductive decomposition. For example, PTLs 3 and 4 attempt to prevent electrolytic solution decomposition that occurs under high-temperature environmental conditions, by adding an additive, typically vinylene carbonate, to the electrolytic solution.

In addition, PTL 5 describes addition of 3-propanesultone to the electrolytic solution and reaction on the negative electrode surface to form a satisfactory solid electrolyte, thereby suppressing gas generation during high-temperature storage and improving the cycle characteristic.

CITATION LIST

Patent Literature

[PTL 1] International Patent Publication No. WO2011/089701
[PTL 2] Japanese Unexamined Patent Publication No. 2012-209161
[PTL 3] Japanese Unexamined Patent Publication No. 2001-283906
[PTL 4] Japanese Unexamined Patent Publication No. 2000-306602
[PTL 5] Japanese Unexamined Patent Publication No. 2002-83632

SUMMARY

Technical Problem

For increasing power density, as the second requirement, the technique of PTL 1 is particularly dependent on the pores formed by the gaps between the conductive filler in the positive electrode active material layer, and despite retentivity of the electrolytic solution in the pores, because linkage between the conductive fillers is easily broken the input/output characteristic has had room for improvement. Moreover, while the technique of PTL 2 ensures the void percentage or pore size and increases the lithium ion conductivity, it is also associated with lower positive electrode bulk density and has potentially resulted in reduced energy density.

Moreover, in terms of suppressing degradation with storage and use, as the third requirement, the conventional techniques described in PTLs 3 to 5 successfully suppress degradation of properties and generation of gas during high-temperature storage, but because of the thick solid electrolyte layer that forms on the negative electrode active material, increased resistance is an associated problem.

The present invention has been devised in light of the existing situation as described above. Therefore, one problem to be solved by the invention, according to the first embodiment, is to provide a lithium ion secondary battery having a high output characteristic and excellent durability. A problem to be solved by the invention according to the second embodiment is to provide a lithium ion secondary battery having high energy density, a high input/output characteristic and excellent charge/discharge cycle durability under high load. A problem to be solved by the invention according to the third embodiment is to provide a lithium ion secondary battery having both high energy density and excellent durability. A problem to be solved by the invention according to the fourth embodiment is to provide a method for producing a nonaqueous lithium power storage element wherein pre-doping of the negative electrode with lithium ion is possible without using lithium metal, and which has low gas generation during high-temperature storage and a satisfactory high-load charge/discharge cycle characteristic.

A problem to be solved by the invention according to the fifth embodiment is to provide a positive electrode precursor for a high-capacitance nonaqueous alkali metal-type power storage element, wherein pre-doping of the negative electrode can be carried out in a short period of time by accelerating decomposition of an alkali metal carbonate.

Solution to Problem

The present inventors have conducted much diligent experimentation with the aim of solving the problems described above. As a result, it has been found that by forming a satisfactory coating film containing lithium ion on the positive electrode, it is possible to provide high energy density and a high output characteristic, while suppressing degradation of the properties due to high-temperature storage.

The present invention has been devised on the basis of this knowledge. Specifically, the present invention provides the following.

[1]

A lithium ion secondary battery comprising a positive electrode, a negative electrode, a separator and a lithium ion-containing nonaqueous electrolytic solution, wherein the negative electrode has a negative electrode power collector, and a negative electrode active material layer containing a negative electrode active material provided on one or both sides of the negative electrode power collector, the positive electrode has a positive electrode power collector, and a positive electrode active material layer containing a positive electrode active material provided on one or both sides of the positive electrode power collector, the positive electrode active material containing a transition metal oxide capable of intercalating and releasing lithium ions, and the positive electrode active material layer comprises one or more compounds selected from the group consisting of the following formulas (1) to (3), at $3.8 \times 10^{-9}$ mol/g to $3.0 \times 10^{-2}$ mol/g per unit weight of the positive electrode active material layer.

[Chem.1]

$$LiX^1—OR^1O—X^2Li \quad (1)$$

{in formula (1), $R^1$ is an alkylene group of 1 to 4 carbon atoms or a halogenated alkylene group of 1 to 4 carbon atoms, and $X^1$ and $X^2$ respectively and independently represent —$(COO)_n$ (where n is 0 or 1)},

[Chem.2]

$$LiX^1—OR^1O—X^2R^2 \quad (2)$$

{in formula (2), $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —$(COO)_n$ (where n is 0 or 1)}, and

[Chem. 3]

$$R^2X^1—OR^1O—X^2R^3 \quad (3)$$

{in formula (3), $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —$(COO)_n$ (where n is 0 or 1)}.

[2]

The lithium ion secondary battery, wherein the pore distribution curve representing the relationship between pore size and log differential pore volume, in measurement of the pore distribution of the positive electrode active material layer by mercury intrusion, has at least one peak with a peak value of 0.10 mL/g to 1.0 mL/g for the log differential pore volume in a pore size range of 0.3 μm to 50 μm, and the total cumulative pore volume Vp in the pore size range of 0.3 μm to 50 μm is 0.03 mL/g to 0.2 mL/g.

[3]

The lithium ion secondary battery, wherein the pore distribution curve for the positive electrode active material layer has at least two peaks with a peak value of 0.10 mL/g to 1.0 mL/g for the log differential pore volume in the pore size range of 0.1 μm to 50 μm.

[4]

The lithium ion secondary battery, wherein the pore distribution curve for the positive electrode active material layer has at least one peak with a peak value of 0.10 mL/g to 1.0 mL/g for the log differential pore volume in the pore size range of 0.5 μm to 20 μm.

[5]

The lithium ion secondary battery, wherein the negative electrode active material contains an alloy-type negative electrode material that forms an alloy with lithium.

[6]

The lithium ion secondary battery, wherein the alloy-type negative electrode material is one or more selected from the group consisting of silicon, silicon compounds, tin, tin compounds, and composite materials of these with carbon or carbonaceous materials.

[7]

The lithium ion secondary battery, wherein the film thickness of the negative electrode active material layer is 10 μm to 75 μm for each side.

[8]

The lithium ion secondary battery, wherein the positive electrode contains one or more lithium compounds different from the transition metal oxide, and the mean particle diameter of the lithium compound is 0.1 μm to 10 μm.

[9]

The lithium ion secondary battery, wherein the lithium compound is one or more lithium compounds selected from the group consisting of lithium carbonate, lithium oxide and lithium hydroxide.

[10]

The lithium ion secondary battery, wherein the lithium compound in the positive electrode is lithium carbonate.

[11]

The lithium ion secondary battery, wherein 1.04 b/a 5.56 is satisfied, where, in the solid $^7$Li—NMR spectrum of the positive electrode active material layer, "a" is the peak area at −40 ppm to 40 ppm, obtained by measurement with a repeated latency of 10 seconds, and "b" is the peak area at −40 ppm to 40 ppm, obtained by measurement with a repeated latency of 3000 seconds.

[12]

The lithium ion secondary battery, wherein the separator contains a polymer that swells by infiltration of the nonaqueous electrolytic solution.

[13]

The lithium ion secondary battery, wherein the separator contains a solid electrolyte.

[14]

The lithium ion secondary battery, wherein the solid electrolyte contains one or more compounds selected from among inorganic oxides and inorganic sulfides having lithium ion conductivity.

[15]

A method for producing a lithium ion secondary battery, comprising the following steps in order:

(1) housing a laminated body that comprises a positive electrode precursor containing a positive electrode active material containing a lithium-containing transition metal oxide, and a lithium compound selected from among lithium carbonate, lithium oxide and lithium hydroxide, a negative electrode containing a negative electrode active material capable of intercalating and releasing lithium ions, and a separator, in a casing, (2) filling the casing with a nonaqueous electrolytic solution that contains an electrolyte comprising lithium ion, and (3) applying a voltage between the positive electrode precursor and the negative electrode to decompose the lithium compound, wherein the ratio $A_1/B_1$ is 0.05 (g/Ah) to 0.30 (g/Ah), where $A_1$ (g/m$^2$) is the amount of lithium compound per unit area of the positive electrode precursor, and $B_1$ (Ah/m$^2$) is the capacitance per unit area of the negative electrode, and the voltage applied for decomposition of the lithium compound is 4.2 V or greater.

[16]

The method for producing a lithium ion secondary battery, wherein the ratio $A_1/C_1$ is 0.01 to 0.10, where C (g/m$^2$) is the weight per unit area of the positive electrode active material.

[17]

The method for producing a lithium ion secondary battery, wherein the lithium compound is in the form of particulates with a mean particle diameter of 0.1 μm to 100 μm.

[18]

The method for producing a lithium ion secondary battery, wherein the nonaqueous electrolytic solution contains a Lewis acid at 0.5 weight % to 5 weight %.

[19]

The method for producing a lithium ion secondary battery, wherein the nonaqueous electrolytic solution contains a crown ether at 1.0 weight % to 10.0 weight %.

[20]

A positive electrode precursor having a positive electrode active material layer containing a positive electrode active material and an alkali metal carbonate other than the positive electrode active material, wherein $1 \leq X \leq 20$ is satisfied, where X (weight %) is the weight ratio of the alkali metal carbonate in the positive electrode active material layer of the positive electrode precursor, and $1 \leq A_2 \leq 30$ and $0.5 \leq A_2/X \leq 2.0$ are satisfied, where $A_2$ (%) is the area of carbonate ion mapping in an image obtained by microscopic Raman spectroscopy of the surface of the positive electrode precursor.

[21]

The positive electrode precursor, wherein $1 \leq A_3 \leq 30$ and $0.5 \leq A_3/X \leq 2.0$ are satisfied, where $A_3$ (%) is the area of carbonate ion mapping in an image obtained by microscopic Raman spectroscopy of a cross-section of the positive electrode precursor.

[22]

The positive electrode precursor, wherein the alkali metal carbonate is at least one selected from the group consisting of lithium carbonate, sodium carbonate, potassium carbonate, rubidium carbonate and cesium carbonate.

[23]

The positive electrode precursor, wherein the alkali metal carbonate contains lithium carbonate at 10 weight % or greater.

[24]

The positive electrode precursor, wherein the mean particle diameter of the alkali metal carbonate is 0.1 μm to 10 μm.

[25]

A power storage module employing a lithium ion secondary battery.

[26]

A power regenerating system employing a lithium ion secondary battery.

[27] A power load-leveling system employing a lithium ion secondary battery.

[28]

An uninterruptable power source system employing a lithium ion secondary battery.

[29]

A non-contact power supply system employing a lithium ion secondary battery.

[30]

An energy harvesting system employing a lithium ion secondary battery.

[31]

A power storage system employing a lithium ion secondary battery.

Advantageous Effects of Invention

According to the first embodiment of the invention it is possible to provide a lithium ion secondary battery with a high output characteristic and excellent durability. According to the second embodiment of the invention it is possible to provide a lithium ion secondary battery having high energy density, a high input/output characteristic and excellent charge/discharge cycle durability under high load. According to the third embodiment of the invention it is possible to provide a lithium ion secondary battery exhibiting both high energy density and excellent durability. According to the fourth embodiment of the invention it is possible to provide a method for producing a nonaqueous lithium power storage element wherein pre-doping of the negative electrode with lithium ion is possible without using lithium metal, and which has low gas generation during high-temperature storage and a satisfactory high-load charge/discharge cycle characteristic. According to the fifth embodiment of the invention it is possible to provide a positive electrode precursor for a high-capacitance nonaqueous alkali metal-type power storage element, wherein pre-doping of the negative electrode can be carried out in a short period of time by accelerating decomposition of an alkali metal carbonate.

BRIEF DESCRIPTION OF DRAWINGS

FIG. 1 is a schematic diagram of a cross-section curve for measurement of the ten-point average height of ruggedness Rzjis of a negative electrode power collector.

DESCRIPTION OF EMBODIMENTS

An embodiment of the invention (hereunder referred to as "this embodiment") will now be explained in detail as an example, with the understanding that the invention is not limited to this embodiment. The upper limits and lower limits for the numerical ranges for this embodiment may be combined as desired to constitute any desired numerical ranges.

Throughout the present specification, "nonaqueous alkali metal-type power storage element" is one employing a positive electrode, a negative electrode, a separator and an electrolytic solution as major constituent elements, and an alkali metal ion-containing organic solvent as the electrolytic solution (hereunder also referred to as "nonaqueous electrolytic solution"). "Lithium ion secondary battery" is used to refer to one wherein lithium ion has been selected as the alkali metal ion.

A nonaqueous alkali metal-type power storage element containing a lithium ion secondary battery may employ a solid electrolyte instead of a separator (and electrolytic solution).

<Positive Electrode>

The positive electrode of this embodiment has a positive electrode power collector and a positive electrode active material layer containing a positive electrode active material, formed on one or both sides thereof.

The positive electrode of this embodiment preferably contains a lithium compound and/or alkali metal carbonate as the positive electrode precursor, prior to assembly of the power storage element. As explained below, during assembly of the power storage element of this embodiment, preferably the negative electrode is pre-doped with an alkali metal ion. The pre-doping method for this embodiment is preferably application of a voltage between the positive electrode precursor containing a lithium compound and/or alkali metal carbonate, and the negative electrode, after the power storage element has been assembled using the positive electrode precursor containing a lithium compound, the negative electrode, the separators and the nonaqueous electrolytic solution. The lithium compound and/or alkali metal carbonate may be present in any form in the positive electrode precursor and positive electrode. For example, the lithium compound and/or alkali metal carbonate may be present between the positive electrode power collector and the positive electrode active material layer, or it may be present on the surface of the positive electrode active material layer. The lithium compound and/or alkali metal carbonate is preferably contained in the positive electrode active material layer formed on the positive electrode power collector of the positive electrode precursor.

For this embodiment, "positive electrode precursor" is defined as the state of the positive electrode before the pre-doping described below, and "positive electrode" is defined as the state of the positive electrode after pre-doping. The positive electrode precursor of this embodiment has a positive electrode active material layer containing a positive electrode active material and a lithium compound and/or alkali metal carbonate other than the positive electrode active material.

<Positive Electrode Precursor>

The positive electrode precursor may also be one having a positive electrode power collector and a positive electrode active material layer situated on one or both sides thereof, so as to allow construction of the positive electrode for the nonaqueous alkali metal-type power storage element. The positive electrode precursor of this embodiment forms the positive electrode after assembly of the power storage element and pre-doping. As explained below, during assembly of the power storage element of this embodiment, preferably the negative electrode is pre-doped with an alkali metal ion. The pre-doping method is preferably application of a voltage between the positive electrode precursor of this embodiment and negative electrode, after the power storage element has been assembled using the positive electrode precursor, the negative electrode, the separators, the casing and the nonaqueous electrolytic solution.

[Positive Electrode Active Material Layer]

The positive electrode active material layer contains a positive electrode active material containing a transition metal oxide, but it may additionally contain optional components such as a conductive filler, binder and dispersion stabilizer, as necessary.

The positive electrode active material layer may comprise a lithium compound and/or alkali metal carbonate other than the positive electrode active material in the positive electrode active material layer or on the surface of the positive electrode active material layer.

(Positive Electrode Active Material)

The positive electrode active material contains a transition metal oxide that is capable of intercalating and releasing lithium. There are no particular restrictions on the transition metal oxide to be used as the positive electrode active material. Examples of transition metal oxides include oxides containing one or more elements selected from the group consisting of cobalt, nickel, manganese, iron, vanadium and chromium. Specific examples of transition metal oxides include $Li_xCoO_2$, $Li_xNiO_2$, $Li_xNi_yM_{(1-y)}O_2$ (M is one or more elements selected from the group consisting of Co, Mn, Al, Fe, Mg and Ti, and y satisfies $0.2<y<0.97$), $Li_xNi_{1/3}Co_{1/3}Mn_{1/3}O_2$, $Li_xMnO_2$, $\alpha\text{-}Li_xFeO_2$, $Li_xVO_2$, $Li_xCrO_2$, $Li_xFePO_4$, $Li_xMn_2O_4$, $Li_xM_yMn_{(2-y)}O_4$ (M is one or more elements selected from the group consisting of Co, Mn, Al, Fe, Mg and Ti, and y satisfies $0.2<y<0.97$), $Li_xNi_aCo_bAl_{(1-a-b)}O_2$ (a and b satisfy $0.2<a<0.97$ and $0.2<b<0.97$), $Li_xNi_cCo_dMn_{(1-c-d)}O_2$ (c and d satisfy $0.2<c<0.97$ and $0.2<d<0.97$) (x satisfies $0\le x\le 1$).

For this embodiment, if a lithium compound and/or alkali metal carbonate different from the positive electrode active material is included in the positive electrode precursor, the lithium compound and/or alkali metal carbonate can serve as a dopant source for the alkali metal in pre-doping to allow pre-doping of the negative electrode, so that electrochemical charge/discharge as a nonaqueous alkali metal-type power storage element can be achieved even if an alkali metal is not already included in the transition metal compound (i.e., even if x=0).

The positive electrode active material used for this embodiment may be a transition metal oxide alone, or another positive electrode active material may be used in combination with the transition metal oxide. Examples of other positive electrode active materials include activated carbon, for example. There are no particular restrictions on activated carbon, and it is possible to use a commercially available product obtained from a petroleum-based, coal-based, plant-based or polymer-based starting material. The content ratio of the activated carbon is preferably no greater than 15 weight % based on the total weight of the positive electrode active material layer in the positive electrode precursor. It is more preferably no greater than 10 weight %. If the content ratio is no greater than 15 weight %, it will be possible to increase the energy density of the nonaqueous alkali metal-type power storage element.

The mean particle diameter of the positive electrode active material is preferably 1 to 20 μm. If the mean particle diameter of the positive electrode active material is 1 μm or greater, the capacitance per electrode volume will tend to be higher due to the higher density of the active material layer. If the mean particle diameter of the positive electrode active material is small the durability may be reduced, but the durability is unlikely to be reduced if the mean particle diameter is 1 μm or greater. A mean particle diameter of the positive electrode active material of no larger than 20 μm will tend to be more suitable for high-speed charge/discharge. The mean particle diameter of the positive electrode active material is more preferably 1 to 15 μm and even more preferably 1 to 10 μm.

The mean particle diameter of the active material of this embodiment is the particle diameter at the point where, when the particle size distribution is measured using a particle size distribution analyzer, and a cumulative curve with 100% as the total volume is determined, the cumulative curve is at 50% (i.e., the 50% diameter (median diameter)). The mean particle diameter can be measured using a commercially available laser diffraction particle size distribution analyzer.

The content ratio of the positive electrode active material in the positive electrode active material layer is preferably 35 weight % to 95 weight % based on the total weight of the positive electrode active material layer in the positive electrode precursor. The lower limit for the content ratio of the positive electrode active material is more preferably 45 weight % or greater and even more preferably 55 weight % or greater. The upper limit for the content ratio of the positive electrode active material is more preferably no greater than 90 weight %. If the content ratio of the positive electrode active material in the positive electrode active material layer is 35 weight % to 95 weight %, a satisfactory charge/discharge characteristic will be exhibited.

Within this range, the content ratio of the positive electrode active material in the positive electrode active material layer is preferably such that the ratio $A_1/C_1$ between the amount of lithium compound per unit area $A_1$ in the positive electrode precursor and the positive electrode active material weight $C_1$ (g/m$^2$) is as specified below.

(Alkali Metal Carbonate)

The alkali metal carbonate of this embodiment is preferably one or more selected from among lithium carbonate, sodium carbonate, potassium carbonate, rubidium carbonate and cesium carbonate, which allow pre-doping by decomposition in the positive electrode precursor to release cations and reduction at the negative electrode. Of these, lithium carbonate is preferably used from the viewpoint of high capacitance per unit weight. The alkali metal carbonate in the positive electrode precursor may be of a single type, or two or more alkali metal carbonates may be included. The positive electrode precursor of this embodiment may be any one that contains at least one alkali metal carbonate, and it may also contain, in addition to an alkali metal carbonate, one or more from among oxides such as $M_2O$, hydroxides such as MOH, halides such as MF or MCl, oxalates such as $M_2(CO_2)_2$, and carboxylates such as RCOOM (where R is H, an alkyl group or an aryl group), where M is one or more selected from among Li, Na, K, Rb and Cs. It may also contain one or more alkaline earth metal carbonates selected from among $BeCO_3$, $MgCO_3$, $CaCO_3$, $SrCO_3$ and $BaCO_3$, and one or more alkaline earth metal oxides, alkaline earth metal hydroxides, alkaline earth metal halides, alkaline earth metal oxalates and alkaline earth metal carboxylates. The alkali metal carbonate contains lithium carbonate at preferably 10 weight % or greater, more preferably 50 weight % or greater and even more preferably 90 weight % or greater.

If the weight ratio of the alkali metal carbonate in the positive electrode active material layer for each side of the positive electrode precursor of this embodiment is represented as X (weight %), then $1 \leq X \leq 20$ is preferably satisfied.

If X is 1 or greater, a sufficient number of alkali metal ions will be ensured for pre-doping into the negative electrode, thereby increasing the capacitance of the nonaqueous alkali metal-type power storage element. If X is no greater than 20, electron conduction in the positive electrode precursor will increase, and therefore pre-doping will be complete within a short period of time due to accelerated decomposition of the alkali metal carbonate.

The positive electrode active material layer may also contain an alkali metal compound and/or an alkaline earth metal compound, in addition to the alkali metal carbonate. When the positive electrode active material layer contains an alkali metal compound or an alkaline earth metal compound, it is preferred to fabricate the positive electrode precursor so that the total amount of the alkali metal carbonate, the alkali metal compound and alkaline earth metal compound is 1 weight % to 20 weight % of the positive electrode active material layer for each side of the positive electrode precursor.

The alkali metal carbonate in the positive electrode precursor, when used in a nonaqueous alkali metal-type power storage element, undergoes oxidative decomposition by application of a high voltage, releasing alkali metal ions, which are reduced at the negative electrode, thereby causing pre-doping to proceed. The pre-doping can therefore be carried out in a short period of time by accelerating the oxidation reaction. In order to accelerate the oxidation reaction, it is important to contact the alkali metal carbonate insulator with the positive electrode active material to ensure electron conduction, and to diffuse the alkali metal ions produced by oxidation reaction into the electrolytic solution. It is therefore important for the alkali metal carbonate to suitably cover the surface of the positive electrode active material.

In other words, oxidative decomposition of the alkali metal carbonate is accelerated when $1 \leq A_2 \leq 30$ and $0.5 \leq A_2/X \leq 2.0$ are satisfied, where $A_2$ (%) is the area of carbonate ion mapping in an image obtained by microscopic Raman spectroscopy of the surface of the positive electrode precursor. If $A_2$ is 1% or greater, electron conduction of the alkali metal carbonate and positive electrode active material will be ensured and therefore pre-doping will be accelerated. If $A_2$ is no greater than 30%, diffusion of alkali metal ions in the electrolytic solution will be accelerated and therefore pre-doping will be accelerated. If $A_2/X$ is 0.5 or greater, diffusion of the electrolytic solution in the positive electrode precursor will be accelerated and therefore pre-doping will be accelerated. If $A_2/X$ is no greater than 2.0, electron conduction of the alkali metal carbonate and positive electrode active material will be ensured and therefore pre-doping will be accelerated.

Also, preferably $1 \leq A_3 \leq 30$ and $0.50 \leq A_3/X \leq 2.0$ are satisfied, where $A_3$ (%) is the area of carbonate ion mapping in an image obtained by microscopic Raman spectroscopy of a cross-section of the positive electrode precursor. If $A_3$ is 1% or greater, electron conduction of the alkali metal carbonate and positive electrode active material will be ensured and therefore pre-doping will be accelerated. If $A_3$ is no greater than 30%, diffusion of alkali metal ions in the electrolytic solution will be accelerated and therefore pre-doping will be accelerated. If $A_3/X$ is 0.50 or greater, diffusion of the electrolytic solution in the positive electrode precursor will be accelerated and therefore pre-doping will be accelerated. If $A_3/X$ is no greater than 2.0, electron conduction of the alkali metal carbonate and positive electrode active material will be ensured and therefore pre-doping will be accelerated.

The method of fabricating a cross-section of the positive electrode precursor is preferably fabrication of a cross-section perpendicular to the in-plane direction of the positive electrode precursor, by broad ion beam (BIB) processing. BIB processing is a processing method in which an Ar beam is irradiated from above the sample, and a smooth cross-section is created along the edges of a masking shield set directly above the sample.

Various methods may be used for micronization of the alkali metal carbonate, alkali metal compound and alkaline earth metal compound. For example, a pulverizer such as a ball mill, bead mill, ring mill, jet mill or rod mill may be used.

The method of fabricating a cross-section of the positive electrode precursor is preferably fabrication of a cross-section perpendicular to the in-plane direction of the positive electrode precursor, by broad ion beam (BIB) processing. BIB processing is a processing method in which an Ar beam is irradiated from above the sample, and a smooth cross-section is created along the edges of a masking shield set directly above the sample.

Quantitation of the alkali metal element and alkaline earth metal element may be carried out by ICP-AES, atomic absorption spectroscopy, fluorescent X-ray analysis, neutron activation analysis, ICP-MS or the like.

The mean particle diameter of the alkali metal carbonate is preferably 0.1 μm to 10 μm. If it is 0.1 μm or greater, dispersibility in the positive electrode precursor will be excellent. If it is no greater than 10 μm, the surface area of the alkali metal carbonate will increase, and decomposition reaction will proceed efficiently.

(Lithium Compound)

Through the present specification, "lithium compound" refers to a lithium compound that is not the positive electrode active material and not a compound of formulas (1) to (3).

The lithium compound may be one or more selected from the group consisting of lithium carbonate, lithium oxide, lithium hydroxide, lithium fluoride, lithium chloride, lithium bromide, lithium iodide, lithium nitride, lithium sulfide, lithium phosphide, lithium nitrate, lithium sulfate, lithium phosphate, lithium oxalate, lithium formate and lithium acetate, that can decompose at the positive electrode in the pre-doping described below, releasing lithium ion. The lithium compound is preferably lithium carbonate, lithium oxide or lithium hydroxide, and more preferably lithium carbonate, which can be handled in air and has low hygroscopicity. Such lithium compounds can decompose upon application of a voltage, to function as a dopant source for pre-doping in the negative electrode, while also forming pores in the positive electrode active material layer, having excellent electrolytic solution retentivity, and forming a positive electrode with excellent ionic conductivity.

The lithium compound is preferably in particulate form. The mean particle diameter of the particulate lithium compound is preferably 0.1 μm to 100 μm. The upper limit for the mean particle diameter of the lithium compound is more preferably no larger than 50 μm and even more preferably no larger than 10 μm. If the mean particle diameter of the lithium compound is 0.1 μm or larger, the volume of pores remaining after oxidation reaction of the lithium compound at the positive electrode will be sufficiently large to hold the electrolytic solution, and the high-load charge/discharge characteristic will therefore be improved. If the mean particle diameter of the lithium compound is no larger than 10 μm, the surface area of the lithium compound will not be excessively reduced, thus allowing the speed of the oxidation reaction of the lithium compound to be ensured. It is preferred if the mean particle diameter of the lithium compound is no greater than 10 μm, because the surface area of the lithium compound will increase, and the oxidation rate can be further increased. If the mean particle diameter of the lithium compound is no larger than 100 μm, the surface area of the lithium compound will not be excessively reduced, thus allowing the speed of the oxidation reaction of the lithium compound to be ensured. The upper limit and lower limit ranges for the mean particle diameter of the lithium compound may be combined as desired.

Various methods may be used for micronization of the lithium compound. For example, a pulverizer such as a ball mill, bead mill, ring mill, jet mill or rod mill may be used.

The content ratio of the lithium compound in the positive electrode active material layer of the positive electrode precursor is preferably 1 weight % to 50 weight % and more preferably 1 weight % to 20 weight %, based on the total weight of the positive electrode active material layer of the positive electrode precursor. It is preferred if the content ratio of the lithium compound in the positive electrode active material layer of the positive electrode precursor is 1 weight % or greater, because pre-doping can be carried out sufficiently at the negative electrode, and also if it is no greater than 50 weight %, because the positive electrode density can be higher after reaction of the lithium compound, and the strength of the positive electrode can be maintained.

Within this range, the content ratio of the lithium compound in the positive electrode active material layer is preferably such that the ratio $A_1/C_1$ between the amount of lithium compound per unit area $A_1$ in the positive electrode precursor and the positive electrode active material weight C (g/m²), and the ratio $A_1/B_1$ between $A_1$ and the capacitance $B_1$ per unit area of the negative electrode, are as specified below.

(Optional Components)

If necessary, the positive electrode active material layer of this embodiment may also contain optional components such as a conductive filler, binder and dispersion stabilizer, in addition to the positive electrode active material, lithium compound and/or alkali metal carbonate.

The conductive filler is not particularly restricted, and for example, acetylene black, Ketchen black, vapor grown carbon fibers, graphite, carbon nanotubes, and mixtures thereof, may be used. The amount of conductive filler used is preferably greater than 0 parts by weight and up to 30 parts by weight, more preferably greater than 0 parts by weight and up to 25 parts by weight and even more preferably 1 part by weight to 20 parts by weight, with respect to 100 parts by weight of the positive electrode active material. If the mixing amount is no greater than 30 parts by weight, the content ratio of the positive electrode active material in the positive electrode active material layer will be increased, allowing the energy density per volume of the positive electrode active material layer to be ensured.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 1 part by weight to 15 parts by weight and even more preferably 1 part by weight to 10 parts by weight, with respect to 100 parts by weight of the positive electrode active material. If the amount of binder is 1 weight % or greater, adequate electrode strength will be exhibited. If the amount of binder is no greater than 30 parts by weight, on the other hand, a high input/output characteristic will be exhibited without inhibiting movement or diffusion of ions in and from the positive electrode active material.

The dispersion stabilizer is not particularly restricted, and for example, PVP (polyvinylpyrrolidone), PVA (polyvinyl alcohol) or cellulose derivatives may be used. The amount of binder used is preferably greater than 0 parts by weight and up to 10 parts by mass, with respect to 100 parts by mass of the positive electrode active material. If the amount of dispersion stabilizer is no greater than 10 parts by weight, on the other hand, a high input/output characteristic will be exhibited without inhibiting movement or diffusion of ions in and from the positive electrode active material.

[Positive Electrode Power Collector]

The material composing the positive electrode power collector of this embodiment is not particularly restricted so long as it is a material with high electron conductivity, and with resistance to degradation by elution into the electrolytic solution or reaction with the electrolyte or ion, but a metal foil is preferred. The positive electrode power collector in the nonaqueous alkali metal-type power storage element of this embodiment is most preferably an aluminum foil.

The metal foil may be a common metal foil without ruggedness or through-holes, or it may be a metal foil having ruggedness formed by embossing, chemical etching, electrolytic deposition or blasting, or it may be a metal foil having through-holes, such as an expanded metal, punching metal or etching foil.

The thickness of the positive electrode power collector is not particularly restricted so long as it allows the shape and strength of the positive electrode to be maintained, but 1 to 100 μm, for example, is preferred.

[Production of Positive Electrode Precursor]

The positive electrode precursor comprises a positive electrode active material layer on one or both sides of a positive electrode power collector. Typically, the positive electrode active material layer is anchored to one or both sides of the positive electrode power collector.

According to this embodiment, the positive electrode precursor can be produced by a known production technique for electrodes for lithium ion batteries or electrical double layer capacitors, to construct a positive electrode for a nonaqueous alkali metal-type power storage element. For example, the positive electrode active material, lithium compound and/or alkali metal carbonate, as well as the other optional components that are used as necessary, may be dispersed and dissolved in water or an organic solvent to prepare a slurry-like coating solution, and the coating solution coated onto one or both sides of a positive electrode power collector to form a coating film, which is dried to obtain a positive electrode precursor. The obtained positive electrode precursor may also be pressed to adjust the film thickness or bulk density of the positive electrode active material layer. An alternative method may also be used, in which the positive electrode active material, lithium compound and/or alkali metal carbonate, as well as the other optional components used as necessary, are mixed in a dry state without using a solvent, and the obtained mixture is subjected to press molding, after which a conductive adhesive is used for attachment to the positive electrode power collector.

Preparation of the positive electrode precursor coating solution may be by dry blending all or a portion of each of the starting material powders containing the positive electrode active material, and then adding water or an organic solvent, and/or adding a liquid or slurry-like substance comprising a binder or dispersion stabilizer dissolved or dispersed in them. It may also be prepared by adding various starting powders containing the positive electrode active material, to a liquid or slurry-like substance comprising a binder or dispersion stabilizer dissolved or dispersed in water or an organic solvent. The method of dry blending may be, for example, premixing in which a ball mill or the like is used to premix the positive electrode active material and alkali metal carbonate, and a conductive filler if necessary, and the low-conductivity lithium compound and/or alkali metal carbonate is coated with the conductive material. Thus, the lithium compound and/or alkali metal carbonate easily decomposes at the positive electrode precursor during the pre-doping described below. When water is used as the solvent for the coating solution, the coating solution can potentially be rendered alkaline by addition of the lithium compound and/or alkali metal carbonate, and therefore a pH modifier may be added as necessary.

The method for dissolution or dispersion is not particularly restricted, and a dispersing machine such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because breakdown of each material by heat or shear force during dispersion will be reduced, and re-aggregation can be suppressed.

The degree of dispersion of the coating solution is such that the granularity as measured with a fineness gauge is preferably 0.1 μm to 100 μm, with an upper limit of preferably no greater than 80 μm and more preferably no greater than 50 μm. It is preferred if the granularity is 0.1 μm or greater, because this indicates that the material has not been excessively crushed during preparation of the coating solution. If the granularity is no greater than 100 μm, there will be less clogging during discharge of the coating solution and no formation of streaks in the coating film, allowing more stable coating.

The viscosity ($\eta$b) of the coating solution of the positive electrode precursor is preferably 1,000 mPa·s to 20,000 mPa·s, more preferably 1,500 mPa·s to 10,000 mPa·s and even more preferably 1,700 mPa·s to 5,000 mPa·s. If the viscosity ($\eta$b) is 1,000 mPa·s or higher, liquid dripping during formation of the coating film will be suppressed, and the coating film width and thickness can be satisfactorily controlled. If the viscosity ($\eta$b) is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

Formation of the coating film of the positive electrode precursor is not particularly restricted, and a coating machine such as a die coater, comma coater, knife coater or gravure coating machine may be suitably used. The coating film may be formed by monolayer coating or by multilayer coating. In the case of multilayer coating, the coating solution compositions may be adjusted so that the lithium compound and/or alkali metal carbonate content differs within each layer of the coating film. The coating speed is preferably 0.1 m/min to 100 m/min, more preferably 0.5 m/min to 70 m/min and even more preferably 1 m/min to 50 m/min. If the coating speed is 0.1 m/min or greater, stable coating will be possible. If the coating speed is 100 m/min or lower, the coating precision can be adequately ensured.

Drying of the coating film of the positive electrode precursor is not particularly restricted, and a drying method such as hot air drying or infrared ray (IR) drying may be suitably employed. Drying of the coating film may be drying at a single temperature, or it may be drying while varying the temperature in various stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the positive electrode power collector or positive electrode active material layer.

Pressing of the positive electrode precursor is not particularly restricted, and a pressing machine such as a hydraulic press or vacuum pressing machine may be suitably used. The film thickness, bulk density and electrode strength of the positive electrode active material layer can be adjusted by the pressing pressure, the gap, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, there will be less distortion or wrinkling in the positive electrode precursor, and adjustment can be made to the desired film thickness and bulk density for the positive electrode active material layer. Also, the gap between the press rolls may be set to a desired value depending on the film thickness of the dried positive electrode precursor, so that the desired film thickness and bulk density of the positive electrode active material layer is obtained. Moreover, the pressing speed may be set to the desired speed, so as to minimize distortion and wrinkle in the positive electrode precursor. The surface temperature of the pressed portion may be room temperature, or it may be heated instead, if necessary. In the case of heating, the lower limit for the surface temperature of the pressed portion is at least the melting point of the binder used minus preferably 60° C., more preferably 45° C. and even more preferably 30° C. In the case of heating, the upper limit for the surface temperature of the pressed portion is no higher than the melting point of the binder used plus preferably 50° C., more preferably 30° C. and even more preferably 20° C. For example, when PVdF (polyvinylidene fluoride: melting point=150° C.) is used as the binder, it is heated to preferably 90° C. to 200° C., more preferably 105° C. to 180° C. and even more preferably 120° C. to 170° C. When a styrene-butadiene copolymer (melting point=100° C.) is used as the binder, heating is to preferably 40° C. to 150° C., more preferably 55° C. to 130° C. and even more preferably 70° C. to 120° C.

The melting point of the binder can be determined by the endothermic peak position in DSC (Differential Scanning calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

Preferably, $A_1/C_1$ is 0.01 to 0.10, where $A_1$ (g/m$^2$) is the amount of lithium compound per unit area of the formed positive electrode precursor and C (g/m$^2$) is the weight per unit area of the positive electrode active material in the positive electrode precursor. In other words, the amount of lithium compound to be mixed with the positive electrode material (the positive electrode active material and conductive filler and binder as necessary) during preparation of the slurry is preferably adjusted to an amount so that $A_{1a}/C_{1a}$ is 0.01 to 0.1, where $A_{1a}$ (g) is the weight of the lithium compound and $C_{1a}$ (g) is the weight of the positive electrode material (the total value for the weight of the positive electrode active material, conductive filler and binder).

If $A_1/C_1$ is 0.01 or greater, it will be possible to pre-dope a sufficient amount of lithium ion in the negative electrode. If $A_1/C_1$ is no greater than 0.10, then the density of the positive electrode after reaction of the lithium compound can be increased, and the strength of the positive electrode can be maintained.

The thickness of the positive electrode active material layer is preferably 20 μm to 200 μm for each side of the positive electrode power collector, more preferably 25 μm to 100 μm for each side, and even more preferably 30 μm to 80 μm. If the thickness of the positive electrode active material layer is 20 μm or greater, sufficient charge/discharge capacity can be exhibited. If the thickness of the positive electrode active material layer is no greater than 200 μm, low ion diffusion resistance can be maintained in the electrode. It will thus be possible to obtain an adequate output characteristic and to reduce the cell volume, thereby increasing the energy density. The thickness of the positive electrode active material layer, when the power collector has through-holes or ruggedness, is the mean value of the thickness for each side at the sections of the power collector without through-holes or ruggedness.

The degree of dispersion for this embodiment is the value determined by a dispersion evaluation test using a fineness gauge conforming to MS K5600. Specifically, a sufficient amount of sample is allowed to flow into the tip of a fineness gauge having a groove with the prescribed depth corresponding to the particle size, through the deep part of the groove, and is allowed to slightly spill over from the groove. Next, with the long side of a scraper parallel to the width-wise direction of the gauge, and placed with the blade edge in contact with the deep tip of the groove of the fineness gauge, the scraper is held on the surface of the gauge, the surface of the gauge is pulled at an even speed perpendicular to the long side direction of the groove to a groove depth of 0 for a period of 1 to 2 seconds, observation is made with light irradiated at an angle of 20° to 30° within 3 seconds after the pulling has ended, and the depth at which particles appear in the groove of the fineness gauge is read off The viscosity (ηb) and TI value for this embodiment are the values determined by the following respective methods. First, an E-type viscometer is used to determine the viscosity (ηa) stabilized after measurement for 2 minutes or longer under conditions with a temperature of 25° C. and a shear rate of 2 s$^{-1}$. Next, the viscosity (ηb) is determined as measured under the same conditions except for changing the shear rate to 20 s$^{-1}$. The viscosity values as obtained above are used to calculate the TI value as: TI value=ηa/ηb. When increasing the shear rate from 2 s$^{-1}$ to 20 s$^{-1}$, it may be increased in a single stage, or the shear rate may be increased in stages within the range specified above, while appropriately determining the viscosity at each shear rate.

<Method of Identifying Alkali Metal Carbonate in Positive Electrode Precursor>

The method of identifying the alkali metal carbonate in the positive electrode precursor is not particularly restricted, and it can be identified by the following method, for example. Identification of the alkali metal carbonate is preferably accomplished by combining several methods of analysis, as described below.

In ion chromatography, described below, the water after washing of the positive electrode precursor with distilled water is analyzed to allow identification of the anion.

[Microscopic Raman Spectroscopy]

The alkali metal carbonate and positive electrode active material can be discriminated by Raman imaging of carbonate ion on the surface of the positive electrode precursor, measured at an observation magnification of 1000× to 4000×. As an example for the measuring conditions, measurement may be performed with an excitation light of 532 nm, an excitation light intensity of 1%, 50× long working of objective lens, a diffraction grating of 1800 gr/mm, point scanning as the mapping system (slit: 65 mm, binning: 5 pix), a 1 mm step, an exposure time per point of 3 seconds, a number of scans of 1, and a noise filter. For the measured Raman spectrum, a straight baseline is set in the range of 1071 to 1104 cm$^{-1}$, a value positive from the baseline is considered a carbonate ion peak, followed by integration of the frequency thereof, but the frequency of the noise relative to the peak area of the carbonate ions approximated by a Gaussian function is subtracted from the carbonate ion frequency distribution.

[X-Ray Photoelectron Spectroscopy (XPS)]

The electronic state can be analyzed by XPS to discriminate the bonded state of the alkali metal element. As an example for the measuring conditions, measurement may be performed with monochromatized AlKα as the X-ray source, an X-ray beam diameter of 100 μmφ (25 W, 15 kV), narrow scan for path energy (58.70 eV), with charge neutralization, narrow scan for sweeping: 10 times (carbon, oxygen), 20 times (fluorine), 30 times (phosphorus), 40 times (alkali metal element), 50 times (silicon), narrow scan for energy step: 0.25 eV. The surface of the positive electrode is preferably cleaned by sputtering before XPS measurement. As the sputtering conditions, cleaning of the positive electrode surface may be carried out, for example, with an acceleration voltage of 1.0 kV, and 1 minute in a range of 2 mm×2 mm (1.25 nm/min as $SiO_2$). In the obtained XPS spectrum, the following assignments may be made: a peak having Lis bonding energy of 50 to 54 eV as a $LiO_2$ or Li—C bond, a peak of 55 to 60 eV as LiF, $Li_2CO_3$, or $Li_xPO_yF_z$ (x, y and z are integers of 1 to 6); a peak having C1s bonding energy of 285 eV as C—C bonds, a peak of 286 eV as C—O bonds, a peak of 288 eV as COO, a peak of 290 to 292 eV as $CO_3^{2-}$ and C—F bonds; a peak having O1s bonding energy of 527 to 530 eV as $O^{2-}$ ($Li_2O$), a peak of 531 to 532 eV as CO, $CO_3$, OH, $PO_x$ (x is an integer of 1 to 4), or $SiO_x$ (x is an integer of 1 to 4), a peak of 533 eV as C—O or $SiO_x$ (x is an integer of 1 to 4); a peak having F1s bonding energy of 685 eV as LiF, a peak of 687 eV as C—F bonds, $Li_xPO_yF_z$ (x, y and z are integers of 1 to 6), or $PF_6^-$; and for P2p bonding energy, a peak of 133 eV as $PO_x$ (x is an integer of 1 to 4), a peak of 134 to 136 eV as $PF_x$ (x is an integer of 1 to 6); and a peak having Si2p bonding energy of 99 eV as Si or silicide, a peak of 101 to 107 eV as $Si_xO_y$ (x and y are any integers). When peaks overlap in the obtained spectrum, the spectrum is preferably assigned upon separating the peaks with the assumption of a Gaussian function or Lorentz function. The alkali metal compound that is present can be identified based on the obtained results of measuring the electronic state, and the existing element ratio.

[Energy Dispersive X-Ray Analysis (SEM-EDX)]

The elements in the positive electrode precursor can be quantified by SEM-EDX analysis of the front side of the positive electrode precursor, measured at an observation magnification of 1000× to 4000×. As an example of measurement of an SEM-EDX image, it can be measured with an acceleration voltage of 10 kV, an emission current of 1 μA and a measuring pixel count of 256×256 pixels, and a number of scans of 50. In order to prevent electrification of the sample, surface treatment with gold, platinum, osmium or the like may be carried out by a method such as vacuum vapor deposition or sputtering.

[Ion Chromatography]

Anion species eluted in water can be identified by washing the positive electrode precursor with distilled water and analyzing the water after washing, by ion chromatography.

The columns used may be an ion-exchange type, ion exclusion type and reversed-phase ion pair type. The detector used may be an electric conductivity detector, ultraviolet-visible absorption intensity detector or electrochemical detector, and a suppressor system with a suppressor installed before the detector, or a non-suppressor system without installation of a suppressor, using a solution with low electric conductivity as the eluent, may be used. Since measurement can also be carried out by combining a mass spectrometer or charged particle detector with the detector, it is preferred to combine an appropriate column and detector, depending on the lithium compound identified from the results of analysis by SEM-EDX, Raman spectroscopy or XPS.

<Method of Quantifying Alkali Metal Carbonate: Calculation of X>

A method of quantifying the alkali metal carbonate in the positive electrode precursor will now be described. The positive electrode precursor may be washed with distilled water, and the alkali metal carbonate can be quantified from the change in weight of the positive electrode before and after washing with distilled water. The area of the positive electrode precursor to be measured is not particularly restricted, but from the viewpoint of reducing measurement variation it is preferably 5 $cm^2$ to 200 $cm^2$ and more preferably 25 $cm^2$ to 150 $cm^2$. Measurement reproducibility can be ensured if the area is at least 5 $cm^2$. The handleability of the sample will be excellent if the area is no greater than 200 $cm^2$.

A method of quantifying the alkali metal carbonate in the positive electrode active material layer of the positive electrode precursor will now be described.

The weight of the cut positive electrode precursor is measured as Mo (g). Next, in a 25° C. environment, the positive electrode is thoroughly immersed for 3 days or longer in distilled water at 100 times the weight of the positive electrode precursor (100 Mo (g)), to elute the alkali metal carbonate in the water. During the procedure, certain measures are preferred such as capping of the vessel so that the distilled water does not volatilize off. After immersion for 3 days or longer, the positive electrode precursor is removed from the distilled water (for the aforementioned ion chromatography measurement, the liquid volume is adjusted so that the amount of distilled water is 100 Mo (g)), and vacuum drying is performed. The conditions for vacuum drying are preferably conditions such that the residual water content in the positive electrode precursor is no greater than 1 weight %, in a range of, for example, temperature: 100 to 200° C., pressure: 0 to 10 kPa and time: 5 to 20 hours. The residual amount of water can be quantified by the Karl Fischer method. The weight of the positive electrode precursor after vacuum drying is recorded as $M_1$ (g), and then the positive electrode active material layer is removed from the power collector using a spatula, brush, bristles or the like, for measurement of the weight of the power collector of the obtained positive electrode precursor. If the weight of the obtained positive electrode power collector is represented as $M_2$ (g), then the weight ratio X (weight %) of the alkali metal carbonate in the active material layer of the positive electrode precursor can be calculated by the following formula 1.

$$X = 100 \times (M_0 - M_1)/(M_0 - M_2) \quad \text{(Math. 1)}$$

<Alkali Metal Element Quantitation Method: ICP-MS>

The positive electrode precursor is acid-decomposed using a strong acid such as concentrated nitric acid, concentrated hydrochloric acid or aqua regalis, and the obtained solution is diluted with purified water to an acid concentration of 2% to 3%. The acid decomposition may be decomposition with appropriate heating and pressure. The obtained diluted solution is analyzed by ICP-MS, during which time it is preferred to add an element of known amount as an internal standard. When the alkali metal element to be measured is at a concentration above the measurable limit, the diluted solution is preferably further diluted while maintaining the acid concentration. Each element can be quantified from the obtained measurement results, based on a calibration curve pre-drawn using a standard solution for chemical analysis.

<Negative Electrode>

The negative electrode of this embodiment has a negative electrode power collector and a negative electrode active material layer containing a negative electrode active material, formed on one or both sides thereof

[Negative Electrode Active Material Layer]

The negative electrode active material layer contains the negative electrode active material capable of intercalating and releasing lithium ion, but it may also contain optional components such as a conductive filler, binder and dispersion stabilizer, as necessary.

(Negative Electrode Active Material)

The negative electrode active material used may be a substance capable of intercalating and releasing alkali metal ions such as lithium ions. Negative electrode active materials include, specifically, carbon materials, titanates, silicon, silicon oxides, silicon alloys, silicon compounds, tin and tin compounds.

The content ratio of the negative electrode active material in the negative electrode active material layer of the negative electrode is preferably 70 weight % or greater and more preferably 80 weight % or greater, based on the total weight of the negative electrode active material layer.

(Carbon Material)

Examples of carbon materials include non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbonaceous material precursors such as petroleum-based pitch, coal-based pitch, mesocarbon microbeads, coke and synthetic resins (for example, phenol resins); thermal decomposition products of furfuryl alcohol resins or novolac resins; fullerenes; carbon nanohorns; and carbon materials that are composites of the foregoing.

The BET specific surface area of the composite carbon material is preferably 100 $m^2/g$ to 350 $m^2/g$. The BET specific surface area is more preferably 150 $m^2/g$ to 300 $m^2/g$. If the BET specific surface area is 100 $m^2/g$ or greater, the pre-doping amount of alkali metal ions such as lithium ions can be sufficiently increased thereby allowing the thickness of the negative electrode active material layer to be reduced. If the BET specific surface area is no greater than 350 $m^2/g$, on the other hand, the negative electrode active material layer will have excellent coatability.

Preferably, the composite carbon material uses lithium metal as the counter electrode, and the initial charge capacity is 300 mAh/g to 1,600 mAh/g per unit weight of the composite carbon material when, after constant-current charge has been conducted with a current value of 0.5 $mA/cm^2$ to a voltage value of 0.01 V at a measuring temperature of 25° C., constant-voltage charging is conducted until the current value reaches 0.01 $mA/cm^2$. It is more preferably 400 mAh/g to 1,500 mAh/g and even more preferably 500 mAh/g to 1,450 mAh/g. If the initial charge capacity is 300 mAh/g or greater, the lithium ion pre-doping amount can be sufficiently large, thus allowing a high output characteristic to be exhibited even when the negative electrode active material layer is reduced in thickness. If the initial charge capacity is no greater than 1,600 mAh/g, swelling and shrinkage of the composite carbon material during doping and de-doping of lithium ions in the composite carbon material can be reduced, and the strength of the negative electrode can be maintained.

From the viewpoint of obtaining a satisfactory internal resistance value, the negative electrode active material most preferably is a composite porous material satisfying the following conditions (1) and (2).

(1) The mesopore volume (amount of pores with diameters of 2 nm to 50 nm) $Vm_1$ (cc/g), as calculated by the BJH method, satisfies the condition $0.01 \leq Vm_1 < 0.10$.

(2) The micropore volume (amount of pores with diameters of smaller than 2 nm) $Vm_2$ (cc/g), as calculated by the MP method, satisfies the condition $0.01 \leq Vm_2 < 0.30$.

The MP method is a method in which the "t-plot method" (B. C. Lippens, J. H. de Boer, J. Catalysis, 4319(1965)) is utilized to determine micropore volume, micropore area and micropore distribution, and it is the method proposed by M. Mikhail, Brunauer and Bodor (R. S. Mikhail, S. Brunauer, E. E. Bodor, J. Colloid Interface Sci., 26, 45 (1968)). The BJH method is a method of calculation commonly used for analysis of mesopores, and it was advocated by Barrett, Joyner, Halenda et al. (E. P. Barrett, L. G. Joyner and P. Halenda, J. Am. Chem. Soc., 73, 373(1951)).

(Alloy-Type Negative Electrode Material)

The negative electrode active material may be a material that forms an alloy with lithium (hereunder also referred to as "alloy-type negative electrode material"), and it is preferably one or more selected from the group consisting of silicon, silicon compounds, tin, tin compounds, and composite materials of these with carbon or carbonaceous materials. The silicon compound is preferably a silicon oxide, and more preferably $SiO_x$ ($0.01 \le x \le 1$).

A composite material is preferably a material obtained by combining, by heat treatment or the like, at least one type of base material selected from the group consisting of silicon, silicon compounds, tin and tin compounds, with at least one type of carbon or carbonaceous material selected from the group consisting of non-graphitizable carbon materials; easily graphitizable carbon materials; carbon black; carbon nanoparticles; activated carbon; artificial graphite; natural graphite; graphitized mesophase carbon microspheres; graphite whiskers; amorphous carbonaceous materials such as polyacene-based materials; carbonaceous materials obtained by heat treatment of carbonaceous material precursors such as petroleum-based pitch, coal-based pitch, mesocarbon microbeads, coke and synthetic resins (for example, phenol resins); thermal decomposition products of furfuryl alcohol resins or novolac resins; fullerenes; and carbon nanohorns.

Especially preferred among these are composite materials that are obtained by heat treatment of one or more of the aforementioned base materials with petroleum-based pitch or coal-based pitch in admixture. Before the heat treatment, the base material and the pitch may be mixed at a temperature higher than the melting point of the pitch. The heat treatment temperature may be any temperature such that the components generated when the pitch that is used volatilizes or thermally decomposes, form a carbonaceous material, and it is preferably 400° C. to 2500° C., more preferably 500° C. to 2000° C., and even more preferably 550° C. to 1500° C. The atmosphere for heat treatment is not particularly restricted, but it is preferably a non-oxidizing atmosphere.

The mean particle diameter of the negative electrode active material is preferably 0.01 μm to 30 μm, the lower limit being more preferably 2 μm or larger and even more preferably 2.5 μm or larger, and the upper limit being more preferably no larger than 6 μm and even more preferably no larger than 4 μm. If the mean particle diameter is 0.01 μm or larger, the contact area with the nonaqueous electrolytic solution will be increased, allowing the resistance of the lithium ion secondary battery to be lowered. If the mean particle diameter of the negative electrode active material is no larger than 30 μm, then the negative electrode active material layer can be adequately reduced in thickness, and therefore the energy density of the lithium ion secondary battery can be increased.

The mean particle diameter of the negative electrode active material can be adjusted by pulverization using a classifier-equipped wet or dry jet mill, or a stirring ball mill or the like. A pulverizer may comprise a centrifugal classifier, and the microparticles pulverized in an inert gas such as nitrogen or argon can be collected with a cyclone or dust collector.

The mean particle diameter for the invention can be determined by the following method. First, the primary particle size of the active material is measured by the following method. If the primary particle size is a value less than 1 μm, then the primary particle size is used as the mean particle diameter. If the primary particle size is 1 μm or larger, then the mean particle diameter is the particle diameter at the point where, when the particle size distribution of a powder of the active material is measured using a particle size distribution analyzer, and a cumulative curve with 100% as the total volume is determined, the cumulative curve is at 50% (i.e., the 50% diameter (median diameter)). An example for the particle size distribution analyzer is a Laser diffraction particle size distribution analyzer.

The primary particle size of the active material for the invention is determined by one of the following methods.

1) A method in which the powder of the active material is photographed with an electron microscope in several visual fields, the particle diameters are calculated for 2,000 to 3,000 particles in the visual fields using a fully automatic image processing device, and the value of the arithmetic mean is recorded as the primary particle size.

2) A method in which the surface and/or cross-section of the obtained electrode is photographed in several fields with an electron microscope, and the arithmetic mean is determined by the method described above.

The primary particle size of the active material incorporated into the lithium ion secondary battery can be measured by method 2) after disassembling the lithium ion secondary battery and removing out the electrodes; or by method 1) after excluding the components other than the active material from the removed electrodes.

The procedure for disassembling the lithium ion secondary battery and removing the electrodes is preferably carried out under an inert atmosphere such as argon.

The following method, for example, may be used to remove the components other than the active material from the electrode. First, the removed electrode is immersed in ethyl methyl carbonate or dimethyl carbonate, the nonaqueous electrolytic solution and lithium salt are removed and air-drying is carried out. It is then immersed in a mixed solvent comprising methanol and isopropanol to inactivate the lithium ion intercalated in the active material, and air-drying is again carried out. Next, in order to remove the binder in the active material layer, the electrode with inactivated lithium ions is immersed in distilled water or NMP. After then scraping off the active material with a spatula or the like if necessary, it is irradiated with ultrasonic waves, and the active material is allowed to slide down from the power collector and suction filtered to recover the active material. If necessary also, a procedure of re-immersion of the obtained active material in distilled water or NMP, irradiation with ultrasonic waves and then suction filtration, may be repeated several times. Finally, the obtained active material is vacuum dried at 170° C. to obtain a powder of the active material.

(Optional Components)

The negative electrode active material layer of this embodiment may also contain optional components such as a conductive filler, binder and dispersion stabilizer, as necessary, in addition to the negative electrode active material.

The type of conductive filler is not particularly restricted, and examples include acetylene black, Ketchen black and vapor grown carbon fibers. The amount of conductive filler used is preferably greater than 0 parts by weight and up to 30 parts by weight, more preferably greater than 0 parts by weight and up to 20 parts by weight and even more preferably greater than 0 parts by weight and up to 15 parts by weight, with respect to 100 parts by weight of the negative electrode active material.

The binder is not particularly restricted, and for example, PVdF (polyvinylidene fluoride), PTFE (polytetrafluoroethylene), polyimide, latex, styrene-butadiene copolymer, fluorine rubber or an acrylic copolymer may be used. The amount of binder used is preferably 1 part by weight to 30 parts by weight, more preferably 2 parts by weight to 27 parts by weight and even more preferably 3 parts by weight to 25 parts by weight, with respect to 100 parts by weight of the negative electrode active material. If the amount of binder is 1 weight % or greater, adequate electrode strength will be exhibited. If the amount of binder is no greater than 30 parts by weight, movement of alkali metal ions such as lithium ions into and out of the negative electrode active material will not be inhibited, and a high input/output characteristic will be exhibited.

The dispersion stabilizer is not particularly restricted, and for example, PVP (polyvinylpyrrolidone), PVA (polyvinyl alcohol) or cellulose derivatives may be used. The amount of binder used is preferably 0 parts by weight to 10 parts by weight, with respect to 100 parts by weight of the negative electrode active material. If the amount of dispersion stabilizer is no greater than 10 parts by weight, movement of alkali metal ions such as lithium ions into and out of the negative electrode active material will not be inhibited, and a high input/output characteristic will be exhibited.

[Negative Electrode Power Collector]

The material composing the negative electrode power collector of this embodiment is preferably a metal foil with high electron conductivity, and with resistance to degradation by elution into the nonaqueous electrolytic solution or reaction with the electrolyte or ion. There are no particular restrictions on such metal foils, and examples include aluminum foils, copper foils, nickel foils and stainless-steel foils. The negative electrode power collector in the lithium ion secondary battery of this embodiment is preferably a copper foil.

The metal foil may be a common metal foil without ruggedness or through-holes, or it may be a metal foil having ruggedness formed by embossing, chemical etching, electrodeposition or blasting, or it may be a metal foil having through-holes, such as an expanded metal, punching metal or etching foil.

The thickness of the negative electrode power collector is not particularly restricted so long as it allows the shape and strength of the negative electrode to be maintained, but 1 to 100 μm, for example, is preferred.

The ten-point average height of ruggedness Rzjis of the negative electrode power collector is preferably 0.01 μm to 30 μm, more preferably 0.1 μm to 20 μm and even more preferably 1 μm to 15 μm. If Rzjis is 0.01 μm or greater, the wettability of the coating solution and the adhesiveness with the negative electrode active material layer can be adequately increased. If Rzjis is no greater than 30 μm, then the risk of micro-short occurring by tearing through the facing separator will be minimal.

The ten-point average height of ruggedness Rzjis for the invention is determined by the following method, according to JIS B 0601(2001).

First, a straight line for measurement of a cross-section curve (roughness curve) is established at an arbitrary location of the negative electrode power collector. The evaluation length should be at least 5-fold the average length $R_{sm}$ of the elements mentioned below and is preferably about 10-fold to 15-fold $R_{sm}$. If $R_{sm}$ is unknown, a provisional evaluation length is determined, and when the evaluation length is deemed to be insufficient from the obtained $R_{sm}$ value, measurement should be performed again after resetting the measurement line to an appropriate length. Measurement of the cross-section curve can be carried out using a commercially available contact surface measuring apparatus, for example.

The measurement can yield a cross-section curve such as shown in FIG. 1, for example. From the measured cross-section curve, the average length $R_{sm}$ for the elements is calculated, and $R_{sm}$ is used to determine the reference length (cutoff value λc). The ten-point average height of ruggedness $R_{zjis}$ is the value determined by the following formula 2, where "$L_{+1}$" to "$L_{+5}$" represent 5 coordinate points at heights from the top within the evaluation length, up to the 5th one, and "$L_{-1}$" to "$L_{-5}$" represent 5 coordinate points at heights from the bottom, up to the 5th one.

[Math. 1]

$$R_{zjis} = \frac{\text{abs}\left\{\sum_{i=1}^{5}(L_{+i})\right\} + \text{abs}\left\{\sum_{i=1}^{5}(L_{-1})\right\}}{5} \quad (2)$$

The dashed line $L_{ave}$ in FIG. 1 is the average coordinate on the cross-section curve.

[Production of Negative Electrode Using Carbon Material]

The negative electrode comprises a negative electrode active material layer on one or both sides of a negative electrode power collector. Typically, the negative electrode active material layer is anchored to one or both sides of the negative electrode power collector.

The negative electrode can be produced by a known electrode production technique for lithium ion secondary batteries or electrical double layer capacitors. For example, each material containing the negative electrode active material is dispersed or dissolved in water or an organic solvent and used to prepare a slurry-like negative electrode coating solution. The negative electrode coating solution may be coated onto one or both sides of a negative electrode power collector to form a coating film, which is dried to obtain a negative electrode. The obtained negative electrode may also be pressed to adjust the film thickness or bulk density of the negative electrode active material layer. As an alternative method, various materials containing negative electrode active materials may also be dry-mixed without using a solvent, and the obtained mixture press-molded and then attached to a negative electrode power collector using a conductive adhesive.

Preparation of the negative electrode coating solution may also be by dry blending all or a portion of each of the starting materials containing the negative electrode active material, and then adding water or an organic solvent, and/or a liquid or slurry-like substance comprising a binder or dispersion stabilizer dissolved or dispersed in them. It may also be prepared by adding various starting powders containing the negative electrode active material, to a liquid or slurry-like substance comprising a binder or dispersion stabilizer dissolved or dispersed in water or an organic solvent.

The method of dissolution or dispersion is not particularly restricted, and a dispersing machine such as a homodisperser or multiscrew disperser, planetary mixer, thin-film spinning high-speed mixer or the like, may be suitably used. In order to obtain a coating solution in a satisfactorily dispersed state, it is preferred for the dispersion to be at a circumferential speed of 1 m/s to 50 m/s. It is preferred if the circumferential speed is 1 m/s or greater, because this will allow each material to satisfactorily dissolve or disperse. It is also preferred if the circumferential speed is no greater than 50 m/s, because each material will be unlikely to be broken down by heat or shear force during dispersion, and reaggregation will be reduced.

The degree of dispersion of the coating solution is preferably to a granularity of 0.1 µm to 100 µm, as measured with a fineness gauge. The upper limit for the degree of dispersion is more preferably to a granularity of no greater than 80 µm, and more preferably to a granularity of no greater than 50 µm. A granularity of 0.1 µm or greater means that each of the material powders containing negative electrode active materials are not excessively crushed during preparation of the coating solution. In addition, if the granularity is no greater than 100 µm, there will be less clogging during discharge of the coating solution and less formation of streaks in the coating film, allowing more stable coating.

The viscosity (ηb) of the coating solution is preferably 1,000 mPa·s to 20,000 mPa·s, more preferably 1,500 mPa·s to 10,000 mPa·s and even more preferably 1,700 mPa·s to 5,000 mPa·s. If the viscosity (ηb) of the coating solution is 1,000 mPa·s or higher, liquid dripping during formation of the coating film will be suppressed, and the coating film width and thickness can be satisfactorily controlled. If the viscosity (ηb) of the coating solution is no higher than 20,000 mPa·s, there will be less pressure loss in the flow channel of the coating solution when a coating machine is used, allowing stable coating to be carried out, and allowing control to less than the prescribed coating film thickness.

The TI value (thixotropy index value) of the coating solution is preferably 1.1 or greater, more preferably 1.2 or greater and even more preferably 1.5 or greater. If the TI value is 1.1 or greater, the coating film width and thickness can be satisfactorily controlled.

The method of forming a coating film is not particularly restricted, and a coating machine such as a die coater, comma coater, knife coater or gravure coating machine may be suitably used. The coating film may be formed by monolayer coating or by multilayer coating. The coating speed is preferably 0.1 m/min to 100 m/min, more preferably 0.5 m/min to 70 m/min and even more preferably 1 m/min to 50 m/min. If the coating speed is 0.1 m/min or greater then stable coating will be possible, and if it is no greater than 100 m/min then coating precision can be adequately ensured.

The method of drying the coating film is not particularly restricted, and a drying method such as hot air drying or infrared ray (IR) drying may be suitably employed. Drying of the coating film may be drying at a single temperature, or it may be drying while varying the temperature in various stages. Several drying methods may also be used in combination for drying. The drying temperature is preferably 25° C. to 200° C., more preferably 40° C. to 180° C. and even more preferably 50° C. to 160° C. If the drying temperature is 25° C. or higher, it will be possible to adequately volatilize off the solvent in the coating film. If the drying temperature is no higher than 200° C., it will be possible to reduce cracking of the coating film by rapid volatilization of the solvent or maldistribution of the binder by migration, and oxidation of the negative electrode power collector or negative electrode active material layer.

The method of pressing the negative electrode is not particularly restricted, and a pressing machine such as a hydraulic press or vacuum pressing machine may be suitably used. The film thickness, bulk density and electrode strength of the negative electrode active material layer can be adjusted by the pressing pressure, the gap, and the surface temperature of the pressed portion, as described below. The pressing pressure is preferably 0.5 kN/cm to 20 kN/cm, more preferably 1 kN/cm to 10 kN/cm and even more preferably 2 kN/cm to 7 kN/cm. If the pressing pressure is 0.5 kN/cm or greater, it will be possible to adequately increase the electrode strength. If the pressing pressure is no greater than 20 kN/cm, distortion or wrinkles will be unlikely to occur in the negative electrode, and adjustment to the desired film thickness and bulk density will be easier. The gap between the press rolls may be set to a desired value depending on the dried film thickness, so that the desired film thickness and bulk density is obtained. The pressing speed may also be set to the desired speed, so that distortion and wrinkling are reduced.

The surface temperature of the pressed portion may be room temperature, or it may be heated instead, if necessary. In the case of heating, the lower limit for the surface temperature of the pressed portion is preferably at least the melting point of the binder minus 60° C., more preferably at least the melting point of the binder minus 45° C., and even more preferably at least the melting point of the binder minus 30° C. The upper limit for the surface temperature of the pressed portion in the case of heating is also preferably no higher than the melting point of the binder used plus 50° C., more preferably no higher than the melting point of the binder plus 30° C., and even more preferably no higher than the melting point of the binder plus 20° C. For example, when PVdF (polyvinylidene fluoride: melting point=150° C.) is used as the binder, heating is to preferably 90° C. to 200° C., more preferably 105° C. to 180° C. and even more preferably 120° C. to 170° C. When a styrene-butadiene copolymer (melting point=100° C.) is used as the binder, heating is to preferably 40° C. to 150° C., more preferably 55° C. to 130° C. and even more preferably 70° C. to 120° C.

The melting point of the binder can be determined by the endothermic peak position in DSC (Differential Scanning calorimetry). For example, using a "DSC7" differential scanning calorimeter by Perkin-Elmer, 10 mg of sample resin is set in the measuring cell and the temperature is increased from 30° C. to 250° C. at a temperature-elevating rate of 10° C./min, in a nitrogen gas atmosphere, the melting point being the endothermic peak temperature during the temperature elevation.

Pressing may also be carried out multiple times while varying the conditions including the pressing pressure, gap, speed, and pressed portion surface temperature.

The thickness of the negative electrode active material layer is preferably 5 µm to 100 µm, for each side of the negative electrode power collector. The lower limit for the thickness of the negative electrode active material layer is more preferably 7 µm or greater and even more preferably 10 µm or greater. The upper limit for the thickness of the negative electrode active material layer is more preferably no greater than 80 µm and even more preferably no greater than 60 µm. If the thickness of the negative electrode active material layer is 5 µm or greater, the coatability will be excellent with less tendency to produce streaks during coating of the negative electrode active material layer. If the thickness of the negative electrode active material layer is 100 µm or lower, high energy density can be exhibited by reduction of the cell volume. The thickness of the negative electrode active material layer, when the negative electrode power collector has ruggedness, is the average thickness of the negative electrode active material layer for each side at the sections of the negative electrode power collector without ruggedness.

The bulk density of the negative electrode active material layer is preferably 0.30 g/cm$^3$ to 3.0 g/cm$^3$, more preferably 0.40 g/cm$^3$ to 1.5 g/cm$^3$ and even more preferably 0.45 g/cm$^3$ to 1.3 g/cm$^3$. If the bulk density of the negative electrode active material layer is 0.30 g/cm$^3$ or greater, sufficient strength can be obtained, and sufficient conductivity can be exhibited between the negative electrode active materials. If the bulk density of the negative electrode active material layer is 3.0 g/cm$^3$ or lower, it will be possible to ensure pores through which the ions can be sufficiently diffused in the negative electrode active material layer.

[Production of Negative Electrode Using Alloy-Type Negative Electrode Material]

The negative electrode comprises a negative electrode active material layer on one or both sides of a negative electrode power collector. Typically, the negative electrode active material layer is anchored to one or both sides of the negative electrode power collector.

The negative electrode can be produced by a known electrode production technique for lithium ion batteries or electrical double layer capacitors. For example:

1) Different materials containing a negative electrode active material may be dispersed and dissolved in water or an organic solvent to prepare a slurry-like coating solution, and the coating solution coated onto one or both sides of a negative electrode power collector to form a coating film, which is dried to obtain a negative electrode. The obtained negative electrode may also be pressed to adjust the film thickness or bulk density of the negative electrode active material layer.

2) Various materials including negative electrode active materials may be dry-mixed without using a solvent, and the obtained mixture press-molded and then attached to the negative electrode power collector using a conductive adhesive, to obtain a negative electrode.

3) A negative electrode active material layer may be formed on the negative electrode power collector to obtain a negative electrode. As the film-forming method, an electroless plating method, electrolytic plating method, chemical reduction method, vacuum vapor deposition method, ion plating method, sputtering method, chemical vapor deposition (CVD) method, laser ablation method or thermal spraying method may be suitably used.

Method 1) is preferred among the negative electrode production methods mentioned above, from the viewpoint of productivity.

The film thickness of the negative electrode active material layer is preferably 10 µm to 75 µm for each side, the lower limit being more preferably 13 µm or greater, even more preferably 15 µm or greater and yet more preferably 20 µm or greater, and the upper limit being more preferably no greater than 70 µm, even more preferably no greater than 65 µm and yet more preferably no greater than 60 µm. If the film thickness of the negative electrode active material layer is 10 µm or greater, the electric capacity of the positive electrode can be adequately utilized, and if it is no greater than 75 µm, then high energy density can be exhibited by reduction of the cell volume. The film thickness of the negative electrode active material layer, when the negative electrode power collector has through-holes or ruggedness, is the mean value of the film thickness for each side at the sections of the negative electrode power collector without through-holes or ruggedness. In this case, examples of such through-holes include through-hole sections of punched metal, and through sections of expanded metal or etching foil.

<Separator>

The positive electrode precursor and negative electrode will usually be laminated or wound via a separator, to form an electrode laminated body or wound electrode comprising a positive electrode precursor, negative electrode and separator.

The separator used may be a polyethylene microporous film or polypropylene microporous film used in lithium ion secondary batteries, or a cellulose nonwoven sheet used in electrical double layer capacitors. A film composed of organic or inorganic microparticles may also be laminated on one or both sides of these separators. Organic or inorganic microparticles may also be included inside a separator.

The thickness of the separator is preferably 5 µm to 35 µm. The thickness of the separator is preferably 5 µm or greater, as this will tend to reduce self-discharge due to internal micro-short-circuiting. The thickness of the separator is preferably no greater than 35 µm, as this will tend to result in a higher input/output characteristic of the nonaqueous alkali metal-type power storage element, such as a lithium ion secondary battery.

The thickness of a film composed of organic or inorganic microparticles is preferably 1 µm to 10 µm. The thickness of a film composed of organic or inorganic microparticles is preferably 1 µm or greater, as this will tend to reduce self-discharge due to internal micro-short. The thickness of a film composed of organic or inorganic microparticles is also preferably no greater than 10 µm, as this will tend to result in a higher output characteristic of the nonaqueous alkali metal-type battery, such as a lithium ion secondary battery.

For one embodiment of the lithium ion secondary battery of the invention, the separator may contain an organic polymer that swells by infiltration of the nonaqueous electrolytic solution, or an organic polymer may be used alone as a substitute for the separator. The organic polymer is not particularly restricted but is preferably one with good affinity with the nonaqueous electrolytic solution, and that gels by infiltration of the electrolytic solution and swelling. Examples of organic polymers include polyethylene oxide, polyacrylnitrile, polyvinylidene fluoride, polymethyl methacrylate and mixtures thereof, which may be suitably used because they exhibit high lithium ion conductivity when gelled.

The organic polymer may have the electrolytic solution included within the organic polymer. This will provide an effect of preventing bleeding of electrolytic solution out from the lithium ion secondary battery when the casing has been damaged and is preferred in terms of safety.

<Solid Electrolyte>

According to another embodiment of the invention, the lithium ion secondary battery may comprise a solid electrolyte in addition to the positive electrode and negative electrode.

When a solid electrolyte is used, the positive electrode precursor and negative electrode are laminated across the solid electrolyte, but it is essential to ensure a path for lithium ion conduction. The method is not particularly restricted, and in the case of an inorganic solid electrolyte, for example, a solid boundary with the active material particles can be suitably constructed by a method of adding a solid electrolyte layer to the positive electrode precursor or negative electrode.

The material used for the solid electrolyte is not particularly restricted so long as it has a function as a solid electrolyte material, and it may be any of the same ones commonly used in solid lithium ion secondary batteries.

Examples of inorganic solid electrolytes include LiN, LISI-CON kinds, Thio-LISICON, oxide-based solid electrolytes such as $La_{0.51}Li_{0.34}TiO_{2.94}$ having a perovskite structure, $Li_{1.3}A_{10.3}Ti_{1.7}P_3O_{12}$ having a NASICON structure and $Li_7La_3Zr_2O_{12}$ having a garnet structure, and sulfide-based amorphous solid electrolytes such as $Li_2S$—$P_2S_5$-based materials, LiI—$Li_2S$—$P_2S_5$-based materials, $Li_3PO_4$—$Li_2S$—$Si_2S$-based materials and $Li_{10}GeP_2S_{12}$, but inorganic solid electrolytes containing one or more inorganic oxides or inorganic sulfides with lithium ion conductivity are preferred.

<Method for Producing Lithium Ion Secondary Battery>

The lithium ion secondary battery of this embodiment can be produced by the following method, using a positive electrode precursor and negative electrode formed in the manner described above:

A method for producing a lithium ion secondary battery comprising the following steps in order:

(1) housing a laminated body that comprises a positive electrode precursor containing a positive electrode active material and a lithium compound, a negative electrode, and a separator, in a casing (cell assembly), (2) filling the casing with a nonaqueous electrolytic solution (electrolytic solution filling), and (3) applying a voltage between the positive electrode precursor and the negative electrode to decompose the lithium compound (pre-doping), wherein the ratio $A_1/B_1$ between $A_1$ (g/m$^2$) and B (Ah/m$^2$) is 0.05 (g/Ah) to 0.30 [g/Ah], and the voltage applied for pre-doping is 4.2 V or greater.

<Method for Producing Nonaqueous Alkali Metal-Type Power Storage Element>

[Assembly]

In the cell assembly step, a positive electrode terminal and negative electrode terminal are connected to a laminated body formed by laminating a positive electrode precursor and negative electrode cut into the shape of a sheet, via a separator, to fabricate an electrode laminated body. Alternatively, a positive electrode terminal and negative electrode terminal are connected to a wound body formed by laminating or winding a positive electrode precursor and negative electrode via a separator, to fabricate a wound electrode. The shape of the wound electrode may be cylindrical or flat.

The method of connecting the positive electrode terminal and negative electrode terminal is not particularly restricted, and it may be carried out by a method such as resistance welding or ultrasonic welding.

[Casing]

The casing used may be a metal can or laminate package. A metal can is preferably made of aluminum. A laminate package is preferably a laminated film of a metal foil and a resin film, an example of which is a laminate package comprising a three-layer structure: outer layer resin film/metal foil/inner layer resin film. The outer layer resin film serves to prevent damage to the metal foil by contact, and a resin such as nylon or polyester may be suitably used. The metal foil serves to prevent penetration of moisture and gas, and a foil such as copper, aluminum or stainless steel may be suitably used. The inner layer resin film serves to protect the metal foil from the electrolytic solution housed inside while also providing a melt seal during heat sealing of the casing, and a polyolefin or acid-modified polyolefin may be suitably used.

[Housing in Exterior Material]

The dried electrode laminated body or wound electrode is preferably stored in a casing, which is typically a metal can or laminate package, and sealed, leaving only one of the openings. The method of sealing the casing is not particularly restricted, but when using a laminate package, a method such as heat sealing or impulse sealing may be employed.

[Drying]

The electrode laminated body or wound electrode housed in the casing is preferably dried to remove the residual solvent. The drying method is not restricted and drying may be carried out by vacuum drying or the like. The residual solvent is preferably no greater than 1.5 weight % based on the weight of the positive electrode active material layer or negative electrode active material layer. It is not preferred if the residual solvent is greater than 1.5 weight %, because the solvent will remain in the system and may impair the self-discharge property or cycle characteristic.

[Nonaqueous Electrolytic Solution]

The electrolytic solution of this embodiment is a nonaqueous electrolytic solution containing an alkali metal ion such as lithium ion. Specifically, the nonaqueous electrolytic solution contains a nonaqueous solvent as described below. The nonaqueous electrolytic solution preferably comprises an alkali metal salt such as a lithium salt at a concentration of 0.5 mol/L or greater based on the total volume of the nonaqueous electrolytic solution. Specifically, the nonaqueous electrolytic solution contains an alkali metal ion such as lithium ion as the electrolyte. The alkali metal salt used as the electrolyte is preferably a lithium salt.

Examples of lithium salts include $(LiN(SO_2F)_2)$, $LiN(SO_2CF_3)_2$, $LiN(SO_2C_2F_5)_2$, $LiN(SO_2CF_3)(SO_2C_2F_5)$, $LiN(SO_2CF_3)(SO_2C_2F_4H)$, $LiC(SO_2F)_3$, $LiC(SO_2CF_3)_3$, $LiC(SO_2C_2F_5)_3$, $LiCF_3SO_3$, $LiC_4F_9SO_3$, $LiPF_6$ and $LiBF_4$, which may be used alone or in mixtures of two more. The lithium salt also preferably contains $LiPF_6$ and/or $LiN(SO_2F)_2$, since these will allow high conductivity to be exhibited.

The lithium salt concentration in the nonaqueous electrolytic solution is preferably 0.5 mol/L or greater, and more preferably in the range of 0.5 to 2.0 mol/L. If the lithium salt concentration is 0.5 mol/L or greater, anions will be sufficiently present to allow sufficiently high battery capacitance. The lithium salt concentration is preferably no higher than 2.0 mol/L, because this can prevent precipitation of the undissolved lithium salt in the nonaqueous electrolytic solution and prevent the viscosity of the nonaqueous electrolytic solution from becoming too high and will help avoid lowering of the conductivity or reduction in the output characteristic as well.

The nonaqueous electrolytic solution of this embodiment preferably comprises a cyclic carbonate and linear carbonate as nonaqueous solvents. If the nonaqueous electrolytic solution comprises a cyclic carbonate and a linear carbonate, this is advantageous from the viewpoint of dissolving the alkali metal salt to the desired concentration and exhibiting high ionic conductance. Examples of cyclic carbonates include alkylene carbonate compounds, representative of which are ethylene carbonate, propylene carbonate and butylene carbonate. An alkylene carbonate compound will typically be unsubstituted. Linear carbonates include dialkyl carbonate compounds, representative of which are dimethyl carbonate, diethyl carbonate, methyl ethyl carbonate, dipropyl carbonate and dibutyl carbonate. A dialkyl carbonate compound will typically be unsubstituted.

The total content of the cyclic carbonate and linear carbonate is preferably 50 weight % or greater and more preferably 65 weight % or greater, and preferably no greater than 95 weight % and more preferably no greater than 90 weight %, based on the total weight of the nonaqueous electrolytic solution. If the total content of the cyclic carbonate and linear carbonate is 50 weight % or greater it will be possible to dissolve the desired concentration of the alkali metal salt, allowing high ionic conductance to be exhibited. If the total concentration of the cyclic carbonate and linear carbonate is no greater than 95 weight %, the electrolytic solution will be able to further comprise the additives mentioned below.

The nonaqueous electrolytic solution of this embodiment may also further comprise additives. The additives are not particularly restricted, and for example, they include sultone compounds, cyclic phosphazenes, acyclic fluoroethers, fluorinated cyclic carbonates, cyclic carbonates, cyclic carboxylates, and cyclic acid anhydrides, which may be used alone or in mixtures of two or more.

A Lewis acid, Lewis base or the like is preferably added to the nonaqueous electrolytic solution of the lithium ion secondary battery.

Addition of a Lewis acid allows the Lewis acid to coordinate with the anion of the lithium compound, promoting oxidation reaction by lowering the HOMO (Highest Occupied Molecular Orbital) of the anion. The Lewis acid is not particularly restricted so long as it can form a complex with the anion of the lithium compound. For example, phosphine complexes, such as a monophosphine metal complex with triphenylphosphine or the like as the ligand or a diphosphine metal complex with BINAP or the like as the ligand; amine complexes such as an amine metal complex with triethylamine or the like as the ligand or a diamine metal complex with TMEDA (tetramethylethylenediamine) or the like as the ligand; imine metal complexes with pyridine or porphyrin as the ligand; metallocene complexes with a cyclopentadienyl group as the ligand; oxalate complexes; cyanato complexes; nitro complexes; acac (acetylacetone) complexes; carbonyl complexes; amino acid complexes; alkenyl complexes; and alkynyl complexes, may be used. Complexes comprising one or more of these ligands may be used, and the ligands may be modified with functional groups including halogen atoms such as fluorine and chlorine; alkyl groups such as methyl; aryl groups such as phenyl; alkoxy groups such as methoxy; sulfonyl groups; amino groups; carboxyl groups; or hydroxyl groups.

Examples of central metals of such Lewis acids that may be used include boron, aluminum, scandium, titanium, vanadium, chromium, manganese, iron, cobalt, nickel, copper, zinc, zirconium, molybdenum, ruthenium, rhodium, palladium, silver, iridium, platinum and gold.

The Lewis acid used may be a metal oxide such as aluminum oxide, manganese oxide, magnesium oxide, zinc oxide or boron oxide.

On the other hand, addition of a Lewis base to the nonaqueous electrolytic solution can shift the solution equilibrium of the lithium compound, promoting dissolution of the lithium compound in the electrolytic solution and accelerating oxidation reaction. The Lewis base is not particularly restricted so long as it can form a complex with lithium ion. For example, ether-based compounds such as crown ethers and furans may be suitably used. Crown ethers are preferred among these. In particular, 12-crown-4-ether is preferred for use since it can form a stable complex with lithium ion.

The amount of Lewis acid used is preferably 0.5 weight % to 5 weight % and more preferably 1 weight % to 4 weight %, based on the total weight of the nonaqueous electrolytic solution. Use in an amount within this range can further promote pre-doping of lithium ion into the negative electrode under mild conditions, without impairing the self-discharge property of the lithium ion secondary battery.

The amount of Lewis base used is preferably 1 weight % to 10 weight % and more preferably 2 weight % to 8 weight %, based on the total weight of the nonaqueous electrolytic solution. Use in an amount within this range can further promote pre-doping of lithium ion into the negative electrode under mild conditions, without impairing the self-discharge property of the lithium ion secondary battery.

[Filling, Impregnation and Sealing]

After assembly, the electrode laminated body housed in the casing is filled with the nonaqueous electrolytic solution. After filling, impregnation is again carried out and the positive electrode, negative electrode and separator are preferably thoroughly wetted with the nonaqueous electrolytic solution. If the nonaqueous electrolytic solution has not wetted at least a portion of the positive electrode precursor, negative electrode and separator, then in the pre-doping step described below, pre-doping will proceed in a non-uniform manner, resulting in increased resistance or lower durability of the obtained lithium ion secondary battery. The method of impregnation is not particularly restricted, and for example, the method used may be setting the nonaqueous electrolytic solution-filled electrode laminated body in a pressure reduction chamber with the exterior material in an opened state, using a vacuum pump to bring the interior of the chamber to a reduced pressure state, and then restoring it to atmospheric pressure. After impregnation, the electrode laminated body with the exterior material in an open state may be closed by sealing while under reduced pressure.

[Pre-Doping]

For this embodiment, the positive electrode active material containing the alkali metal ion such as lithium ions and the like, the lithium compound and/or alkali metal carbonate, function as dopant sources for alkali metal ion into the negative electrode active material. In pre-doping, preferably a voltage is applied between the positive electrode precursor and the negative electrode, and the lithium compound and/or alkali metal carbonate is decomposed in the positive electrode precursor, releasing alkali metal ions, while the alkali metal ions are reduced at the negative electrode to cause pre-doping of the alkali metal ions into the negative electrode active material layer.

(Relationship Between $A_1$ and $B_1$)

If $A_1$ (g/m$^2$) is the amount of lithium compound per unit area of the positive electrode precursor and $B_1$ (Ah/m$^2$) is the capacitance per unit area of the negative electrode, preferably the value of $A_1$ or $B_1$ is adjusted so that $A_1/B_1$ is 0.05 to 0.30. If $A_1/B_1$ is 0.05 or greater, it will be possible to pre-dope a sufficient amount of lithium ion into the negative electrode, thereby increasing the energy density of the nonaqueous lithium ion power storage element. If $A_1/B_1$ is no greater than 0.30, excessive pre-doping of lithium ion into the negative electrode can be suppressed, and deposition of lithium metal on the negative electrode can be suppressed.

The capacitance per unit area of the negative electrode can be determined by the following method.

The negative electrode before pre-doping is cut out to a specified area (designated as Z (cm$^2$)) for use as a working electrode, lithium metal is used for both the counter electrode and reference electrode, and a nonaqueous solvent containing a lithium salt is used as the electrolytic solution, to fabricate an electrochemical cell. A charge/discharge apparatus is used for constant-current charge of the electrochemical cell in a 25° C. environment, with a current value of 0.5 mA/cm$^2$ until reaching a voltage value of 0.01 V, followed by constant-voltage charge until the current value reaches 0.01 mA/cm$^2$. The sum of the charge capacities during constant-current charge and constant-voltage charge is evaluated as the capacitance (Y (Ah)) of the negative electrode. The obtained Z and Y values are used to calculate the capacitance $B_1$ per unit area of the negative electrode, as Y/Z.

The amount of lithium compound per unit area $A_1$ of the positive electrode precursor can be adjusted by adjusting the amount of lithium compound added during preparation of the slurry for formation of the positive electrode precursor as described above, to reduce the amount of slurry coated onto the positive electrode power collector. The capacitance $B_1$ per unit area of the negative electrode can be adjusted by selecting the type and amount of negative electrode active material used for fabrication of the negative electrode and reducing the amount of slurry coated onto the negative electrode power collector.

In the method for producing the lithium ion secondary battery of the invention, the voltage applied between the positive electrode precursor and the negative electrode during pre-doping is 4.2 V or higher. The voltage is preferably 4.2 to 5.0 V and more preferably 4.3 to 4.9 V.

The method of voltage application is not particularly restricted, and it may be a method of applying a constant voltage, at a voltage of 4.2 V or higher, using a charge/discharge apparatus and power source; a method of superimposing a pulse voltage during application of a constant voltage of 4.2 V or higher; or a method of conducting charge/discharge cycling using a charge/discharge apparatus, in a voltage range that includes a voltage of 4.2 V or higher.

During the pre-doping procedure, gas such as $CO_2$ is generated with oxidative decomposition of the alkali metal carbonate and/or lithium compound in the positive electrode precursor. It is therefore preferable to provide means for releasing the generated gas out of the casing during application of the voltage. Examples of such means include a method of applying a voltage with a portion of the casing in an open state; and a method of applying voltage with appropriate outgassing means such as a degassing valve or gas permeable film set beforehand on a portion of the casing.

[Aging]

After the pre-doping, the electrode laminated body is preferably subjected to aging. During aging, the solvent in the nonaqueous electrolytic solution is decomposed at the negative electrode, and a lithium ion-permeable solid polymer coating film is formed on the negative electrode surface.

The method of aging is not particularly restricted, and for example, a method of reacting the solvent in the electrolytic solution in a high-temperature environment may be used.

[Degassing]

After aging, preferably degassing is further carried out to reliably remove the gas remaining in the electrolytic solution, positive electrode and negative electrode. Any gas remaining in at least portions of the electrolytic solution, positive electrode and negative electrode will interfere with ion conduction, thus increasing the resistance of the obtained nonaqueous alkali metal-type power storage element.

The method of degassing is not particularly restricted, and for example, the method used may be setting the electrode laminated body in a pressure reduction chamber with the casing in an opened state and using a vacuum pump to bring the interior of the chamber to a reduced pressure state. After degassing, the casing may be sealed to close the casing and fabricate a nonaqueous alkali metal-type power storage element.

<Lithium Ion Secondary Battery>

A lithium ion secondary battery can be produced by the method described above. According to one embodiment, the lithium ion secondary battery comprises a positive electrode having a porous positive electrode active material layer with pores that are traces of lithium compound in the positive electrode precursor that has decomposed and dissipated, and a negative electrode having a negative electrode active material layer doped with lithium compound as the dopant source. The positive electrode may also contain lithium compound that has not decomposed during the pre-doping.

[Positive Electrode]

The bulk density of the positive electrode active material layer is in the range of preferably 1.0 $g/cm^3$ or greater and more preferably 1.2 $g/cm^3$ to 4.5 $g/cm^3$. If the bulk density of the positive electrode active material layer is 1.2 $g/cm^3$ or greater, it will be possible to exhibit high energy density and to reduce the size of the power storage element. If the bulk density of the positive electrode active material layer is no higher than 4.5 $g/cm^3$, diffusion of the electrolytic solution in the pores in the positive electrode active material layer will be adequate, and a high output characteristic will be obtained.

[Positive Electrode Active Material Layer after Pre-Doping]

The positive electrode active material layer after pre-doping, according to this embodiment, comprises at least one compound selected from the group consisting of compounds represented by the following formulas (1) to (3), in an amount of $3.8 \times 10^{-9}$ mol/g to $3.0 \times 10^{-2}$ mol/g per unit weight of the positive electrode substance layer.

[Chem. 4]

$$LiX^1—OR^1O—X^2Li \quad (1)$$

{In formula (1), $R^1$ is an alkylene group of 1 to 4 carbon atoms or a halogenated alkylene group of 1 to 4 carbon atoms, and $X^1$ and $X^2$ respectively and independently represent —$(COO)_n$ (where n is 0 or 1)},

[Chem. 5]

$$LiX^1—OR^1O—X^2R^2 \quad (2)$$

{In formula (2), $R^1$ is an alkylene group of 1 to 4 carbon atoms or a halogenated alkylene group of 1 to 4 carbon atoms, $R^2$ is hydrogen, an alkyl group of 1 to 10 carbon atoms, a mono- or polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms, or an aryl group, and $X^1$ and $X^2$ respectively and independently represent —$(COO)_n$ (where n is 0 or 1)$_1$, and

[Chem. 6]

$$R^2X^1—OR^1O—X^2R^3 \quad (3)$$

{In formula (3), $R^1$ is an alkylene group of 1 to 4 carbon atoms or a halogenated alkylene group of 1 to 4 carbon atoms, $R^2$ and $R^3$ are each independently hydrogen, an alkyl group of 1 to 10 carbon atoms, a polyhydroxyalkyl group of 1 to 10 carbon atoms, an alkenyl group of 2 to 10 carbon atoms, a mono- or polyhydroxyalkenyl group of 2 to 10 carbon atoms, a cycloalkyl group of 3 to 6 carbon atoms or an aryl group, and $X^1$ and $X^2$ respectively and independently represent —$(COO)_n$ (where n is 0 or 1)}.

Particularly preferred as compounds of formula (1) are the compounds represented by $LiOC_2H_4OLi$, $LiOC_3H_6OLi$, $LiOC_2H_4OCOOLi$, $LiOCOOC_3H_6OLi$, $LiOCOOC_2H_4OCOOLi$ and $LiOCOOC_3H_6OCOOLi$, for example, with no restriction to these.

Particularly preferred as compounds of formula (2) are the compounds represented by $LiOC_2H_4OH$, $LiOC_3H_6OH$, $LiOC_2H_4OCOOH$, $LiOC_3H_6OCOOH$, $LiOCOOC_2H_4OCOOH$, $LiOCOOC_3H_6OCOOH$, $LiOC_2H_4OCH_3$, $LiOC_3H_6OCH_3$, $LiOC_2H_4OCOOCH_3$, $LiOC_3H_6OCOOCH_3$, $LiOCOOC_2H_4OCOOCH_3$, $LiOCOOC_3H_6OCOOCH_3$, $LiOC_2H_4OC_2H_5$, $LiOC_3H_6OC_2H_5$, $LiOC_2H_4OCOOC_2H_5$, $LiOC_3H_6OCOOC_2H_5$, $LiOCOOC_2H_4OCOOC_2H_5$ and $LiOCOOC_3H_6OCOOC_2H_5$, for example, with no restriction to these.

Particularly preferred as compounds of formula (3) are the compounds represented by $HOC_2H_4OH$, $HOC_3H_6OH$, $HOC_2H_4OCOOH$, $HOC_3H_6OCOOH$, $HOCOOC_2H_4OCOOH$, $HOCOOC_3H_6OCOOH$, $HOC_2H_4OCH_3$, $HOC_3H_6OCH_3$, $HOC_2H_4OCOOCH_3$, $HOC_3H_6OCOOCH_3$, $HOCOOC_2H_4OCOOCH_3$, $HOCOOC_3H_6OCOOCH_3$, $HOC_2H_4OC_2H_5$, $HOC_3H_6OC_2H_5$, $HOC_2H_4OCOOC_2H_5$, $HOC_3H_6OCOOC_2H_5$, $HOCOOC_2H_4OCOOC_2H_5$, $HOCOOC_3H_6OCOOC_2H_5$, $CH_3OC_2H_4OCH_3$, $CH_3OC_3H_6OCH_3$, $CH_3OC_2H_4OCOOCH_3$, $CH_3OC_3H_6OCOOCH_3$, $CH_3OCOOC_2H_4OCOOCH_3$, $CH_3OCOOC_3H_6OCOOCH_3$, $CH_3OC_2H_4OC_2H_5$, $CH_3OC_3H_6OC_2H_5$, $CH_3OC_2H_4OCOOC_2H_5$, $CH_3OC_3H_6OCOOC_2H_5$, $CH_3OCOOC_2H_4OCOOC_2H_5$, $CH_3OCOOC_3H_6OCOOC_2H_5$, $C_2H_5OC_2H_4OC_2H_5$, $C_2H_5OC_3H_6OC_2H_5$, $C_2H_5OC_2H_4OCOOC_2H_5$, $C_2H_5OC_3H_6OCOOC_2H_5$, $C_2H_5OCOOC_2H_4OCOOC_2H_5$ and $C_2H_5OCOOC_3H_6OCOOC_2H_5$, for example, with no restriction to these.

For this embodiment, methods for adding a compound of formulas (1) to (3) into the positive electrode active material layer include, for example, a method of mixing a compound of formulas (1) to (3) to the positive electrode active material layer; a method of adsorbing a compound of formulas (1) to (3) onto the positive electrode active material layer; and a method of electrochemically depositing a compound of formulas (1) to (3) onto the positive electrode active material layer.

As a preferred method of adding a compound of formulas (1) to (3) to the positive electrode active material layer, there is preferred a method of adding a precursor that can decompose to produce such compounds, into the nonaqueous electrolytic solution and decomposing the precursor during fabrication of the lithium ion secondary battery, to accumulate the compound in the positive electrode active material layer.

Precursors that decompose to form compounds represented by formulas (1) to (3) include one or more organic solvents selected from the group consisting of ethylene carbonate, propylene carbonate, butylene carbonate, vinylene carbonate and fluoroethylene carbonate, with ethylene carbonate and propylene carbonate being preferred.

The total amount of compounds of formulas (1) to (3) is preferably $3.8 \times 10^{-9}$ mol/g or greater and most preferably $2.0 \times 10^{-8}$ mol/g or greater, per unit weight of the positive electrode active material layer. If the total amount of compounds of formulas (1) to (3) is $3.8 \times 10^{-9}$ mol/g or greater per unit weight of the positive electrode active material layer, then the nonaqueous electrolytic solution will be less likely to come into contact with the positive electrode active material, and oxidative decomposition of the nonaqueous electrolytic solution can be more effectively suppressed.

The total amount of compounds of formulas (1) to (3) is preferably no greater than $3.0 \times 10^{-2}$ mol/g, more preferably no greater than $7.0 \times 10^{-3}$ mol/g and even more preferably no greater than $3.0 \times 10^{-5}$ mol/g, per unit weight of the positive electrode active material layer. If the total amount of compounds of formulas (1) to (3) is no greater than $3.0 \times 10^{-2}$ mol/g per unit weight of the positive electrode active material layer, diffusion of lithium (Li) ions will be less inhibited and a higher input/output characteristic can be exhibited.

[Pore Distribution of Positive Electrode Active Material Layer]

According to this embodiment, when the pore distribution of the positive electrode active material layer at the positive electrode after the pre-doping described below has been measured by mercury intrusion, the pore distribution curve for the relationship between the pore size and the log differential pore volume preferably has at least one peak with a peak value of 0.10 mL/g to 1.0 mL/g for the log differential pore volume in the pore size range of 0.3 µm to 50 µm. More preferably, it has at least two peaks with a peak value of 0.10 mL/g to 1.0 mL/g for the log differential pore volume in the pore size range of 0.1 µm to 50 µm.

The upper limit for the pore size range in which the pore distribution curve of the positive electrode active material layer at the positive electrode has at least one peak with a peak value of 0.10 mL/g to 1.0 mL/g for the log differential pore volume, is preferably no larger than 30 µm, more preferably no larger than 20 µm and most preferably no larger than 10 µm, and the lower limit for the pore size range is preferably 0.5 µm or larger and more preferably 0.7 µm or larger. The upper limit and lower limit for the pore size range may be combined as desired.

Having a peak, in this case, means having a peak with the peak top position in that pore size range. According to this embodiment, there is no particular restriction on the source of the peaks in the pore distribution curve of the positive electrode active material layer in the positive electrode, but preferably it has a peak due to gaps between the materials forming the positive electrode active material layer, such as the positive electrode active material and the conductive filler, and a peak due to, for example, pores remaining after the lithium compound in the positive electrode active material layer of the positive electrode precursor has undergone oxidative decomposition in the pre-doping. These peaks may also have overlapping pore sizes at the peak top positions and may be observed as a single peak.

If the pore size range in which the pore distribution curve of the positive electrode active material layer at the positive electrode has at least one peak with a peak value of 0.10 mL/g to 1.0 mL/g for the log differential pore volume, is 0.3 µm or larger, then satisfactory pores will be formed that can hold the electrolytic solution inside the positive electrode, the lithium ion conductivity will be high, and a high input/output characteristic will be exhibited when it is incorporated into a lithium ion secondary battery, while during repeated charge/discharge, and especially charge/discharge under high load, ions will be consistently supplied from the electrolytic solution in the pores formed near the positive electrode active material, so that the high-load charge/discharge cycle characteristic will be excellent.

On the other hand, if the pore size range in which the pore distribution curve of the positive electrode active material layer at the positive electrode has at least one peak with a peak value of 0.10 mL/g to 1.0 mL/g for the log differential pore volume, is no larger than 50 µm, then high energy density will be obtained when it is incorporated into a lithium ion secondary battery.

Moreover, although the pore distribution curve of the positive electrode active material layer at the positive electrode has at least one peak with a peak value of 0.10 mL/g to 1.0 mL/g for the log differential pore volume, in a pore size range of 0.3 µm to 50 µm, more preferably the lower limit for the peak value is 0.15 mL/g or greater for the log differential pore volume, and even more preferably it is 0.20 mL/g or greater for the log differential pore volume. If the peak value is 0.10 mL/g or greater for the log differential pore volume, pores capable of holding the electrolytic solution will be in sufficient number, and a high input/output characteristic and excellent high-load charge/discharge cycle characteristic will be obtained when it is incorporated into a lithium ion secondary battery. On the other hand, if the peak value is no greater than 1.0 mL/g for the log differential pore volume, high energy density will be obtained when it is incorporated into a lithium ion secondary battery.

For the pore distribution curve of the positive electrode active material layer at the positive electrode according to this embodiment, Vp is 0.03 mL/g to 0.2 mL/g, where Vp is the total cumulative pore volume in the pore size range of 0.3 µm to 50 Vp is more preferably 0.05 mL/g to 0.19 mL/g and even more preferably 0.07 mL/g to 0.18 mL/g. While not particularly restrictive, Vp may be considered to represent the total volume of gaps between the materials forming the positive electrode active material layer, such as the positive electrode active material and the conductive filler, and pores remaining after the lithium compound in the positive electrode active material layer of the positive electrode precursor has undergone oxidative decomposition in pre-doping, for example. If Vp is 0.03 mL/g or greater, the lithium ion diffusibility will be adequately ensured and a high input/output characteristic and an excellent high-load charge/discharge cycle characteristic will be obtained. On the other hand, if Vp is no greater than 0.2 mL/g, bonding between the constituent materials in the positive electrode will be ensured and sufficiently high positive electrode strength will be obtained, while high energy density will also be obtained.

—Measurement of Pore Distribution by Mercury Intrusion—

The total cumulative pore volume and log differential pore volume according to mercury intrusion for this embodiment are the values determined by the following respective methods.

A vessel containing the sample is filled with mercury after evacuation, pressure is applied to the mercury, and the intrusion of mercury with respect to the applied pressure is measured. The applied pressure is converted to pore size based on the following formula, and the amount of mercury intrusion is converted to pore volume, to obtain the pore distribution.

$$P \times D = -4 \times \sigma \times \cos \theta$$

{Here, P=pressure, D=pore size, σ=surface tension of mercury (485 mN/m), and θ=mercury contact angle (130°).}

From the cumulative pore volume distribution, with pore size (µm) on the abscissa and estimating pore volume (mL/g) on the ordinate, the total cumulative pore volume (Vp) in a given specified pore size range, such as 0.3 µm to 50 µm, is calculated by the following formula:

(Cumulative pore volume at pore size of 0.3 µm)–
(cumulative pore volume at pore size of 50 µm).

Also, the value dV/d(log D), of the pore volume difference value dV between measured points, divided by the logarithm of the pore size difference value between the measured points d(log D), is recorded as the log differential pore volume with respect to the mean pore size of the measured point interval.

The unit weight (g) of the total cumulative pore volume (mL/g) and log differential pore volume (mL/g) of the positive electrode active material layer of this embodiment is defined as the weight of the entire positive electrode active material layer.

[Mean Particle Diameter of Lithium Compound]

Usually with prolonged storage and use of a lithium ion secondary battery, the electrolyte in the electrolytic solution decomposes, generating fluorine ions. The generated fluorine ions form lithium fluoride primarily at the negative electrode, which is undesirable since it increases the internal resistance of the lithium ion secondary battery. On the other hand, because lithium compounds can adsorb fluorine ions, formation of lithium fluoride at the negative electrode can be suppressed. Therefore, a lithium compound is preferably present in the positive electrode active material layer as it will allow increase in the internal resistance of the lithium ion secondary battery to be suppressed.

The mean particle diameter of the lithium compound after pre-doping is preferably 0.1 µm to 10 µm and more preferably 0.5 µm to 5 µm. If the mean particle diameter of the lithium compound is 0.1 µm or greater, fluorine ions generated during high-temperature storage will be efficiently adsorbed, thus making it possible to suppress deterioration of properties and gas generation during high-temperature storage. If the mean particle diameter of the lithium compound is no greater than 10 µm, the reaction area with the fluorine ions generated by the high-load charge/discharge cycling will increase, thus allowing the fluorine ions to be adsorbed more efficiently.

The method for measuring the mean particle diameter of the lithium compound is not particularly restricted, and calculation may be from a SEM image and SEM-EDX image of the positive electrode cross-section. The method of forming the positive electrode cross-section may employ BIB processing in which an Ar beam is irradiated from above the positive electrode, and a smooth cross-section is created along the edges of a masking shield set directly above the sample. When the positive electrode comprises lithium carbonate, the carbonate ion distribution can be determined by measurement with Raman imaging of the positive electrode cross-section.

[Method of Identifying Lithium Compound]

The method of identifying a lithium compound in the positive electrode active material is not particularly restricted, and it may be identification by the following methods, for example. For identification of a lithium compound, it is preferred to carry out the identification by combining the different analysis methods described below.

For measurement by SEM-EDX, Raman spectroscopy or XPS described below, preferably the lithium ion secondary battery is disassembled in an argon box, the positive electrode is removed, and measurement is performed after washing the electrolyte adhering to the positive electrode surface. The solvent used to wash the positive electrode only needs to wash off the electrolyte adhering to the positive electrode surface, and a carbonate solvent such as dimethyl carbonate, ethyl methyl carbonate or diethyl carbonate may be suitably used. The washing method may be, for example, immersion of the positive electrode for 10 minutes or longer in a diethyl carbonate solvent in an amount of 50 to 100 times the weight of the positive electrode, and subsequent re-immersion of the positive electrode after exchange of the solvent. The positive electrode is then removed from the diethyl carbonate and vacuum dried, and then subjected to SEM-EDX, Raman spectroscopy and XPS analysis. The vacuum drying conditions are conditions such that the diethyl carbonate residue in the positive electrode is no greater than 1 weight % with a temperature of 0 to 200° C., a pressure of 0 to 20 kPa and a time of 1 to 40 hours. The diethyl carbonate residue can be quantified by GC/MS measurement of water after distilled water washing and liquid volume adjustment, based on a pre-drawn calibration curve.

In ion chromatography, described below, the water after washing of the positive electrode with distilled water is analyzed to allow identification of the anion.

When the lithium compound cannot be identified by this analysis method, $^7$Li-solid NMR, XRD (X-ray diffraction), TOF-SIMS (Time-Of-Flight Secondary Ion Mass Spectrometry), AES (Auger Electron Spectroscopy), TPD/MS (Temperature Programmed Desorption/Mass Spectrometry), DSC (Differential Scanning calorimetry) or the like may be used as an alternative analysis method to identify the lithium compound.

The following is an example of a method of identifying a lithium compound by SEM observation of a positive electrode cross-section. The lithium compound such as lithium carbonate, for example, can be discriminated by carbon mapping and oxygen mapping with an SEM-EDX image of the positive electrode cross-section measured at an observational magnification of 1000-4000×. For the SEM-EDX image measuring method, preferably the luminance and contrast are adjusted so that the brightness has no pixel reaching the maximum luminance, and the mean value of the brightness is a luminance in the range of 40% to 60%. In the obtained carbon mapping and oxygen mapping, if the regions containing a bright area equal to 50% or more of the area thereof when binarized based on the mean value of brightness are the carbon regions and oxygen regions, then the sections where these regions overlap may be discriminated as lithium carbonate.

[Method of Calculating Mean Particle Diameter]

The mean particle diameter of the lithium compound can be determined by measurement in the same visual field as SEM-EDX of the positive electrode cross-section, and analysis of the obtained image. The cross-sectional area S is determined for all of the lithium compound particles discriminated in the SEM image of the positive electrode cross-section, and the particle diameter d is calculated by the following formula 3. ($\pi$ is the circular constant.)

$$d = 2 \times (S/\pi)^{1/2} \quad (3)$$

The amount of lithium compound in the positive electrode after pre-doping is preferably 0.1 weight % to 18 weight %, more preferably 0.3 weight % to 15 weight % and even more preferably 0.5 weight % to 13 weight %, based on the total weight of the positive electrode active material layer in the positive electrode. If the amount of lithium compound is 0.1 weight % or greater, a sufficient amount of lithium compound will be present to adsorb fluorine ions formed in the high-load charge/discharge cycling, and therefore the high-load charge/discharge cycle characteristic will be improved. If the amount of lithium compound is no greater than 18 weight %, it will be possible to increase the energy density of the lithium ion secondary battery.

(High-Load Charge/Discharge Characteristic)

During charge/discharge of a lithium ion secondary battery, lithium ion in the electrolytic solution migrates as charge/discharge takes place, reacting with the active material. The activation energies are different for the insertion reaction and the desorption reaction of ions in the active material. Therefore, especially when the charge/discharge load is high, ions can no longer follow changes in charge/discharge. Since the electrolytic concentration in the bulk electrolytic solution falls as a result, the resistance of the lithium ion secondary battery is increased.

If a lithium compound is added to the positive electrode precursor, oxidative decomposition of the lithium compound forms satisfactory pores that can hold the electrolytic solution inside the positive electrode. Without being limited to theory, it is believed that, during charge/discharge, ions are constantly supplied to the positive electrode having such pores, from the electrolytic solution in the pores formed near the active material, and that the high-load charge/discharge cycle characteristic is therefore improved.

[b/a in Solid $^7$Li—NMR Spectrum of Positive Electrode Active Material Layer]

In the solid $^7$Li—NMR spectrum of the positive electrode active material layer, preferably $1.04 \leq b/a \leq 5.56$, more preferably $1.05 \leq b/a \leq 3.79$, even more preferably $1.09 \leq b/a \leq 3.32$ and yet more preferably $1.14 \leq b/a \leq 2.86$, where "a" is the peak area at −40 ppm to 40 ppm, obtained by measurement with a repeated latency of 10 seconds, and "b" is the peak area at −40 ppm to 40 ppm, obtained by measurement with a repeated latency of 3000 seconds.

The lithium ion secondary battery of this embodiment, having a b/a value adjusted to within a specified range, can maintain a high input/output characteristic while suppressing deterioration of properties and gas generation due to high-temperature storage. While the principle is not completely understood, and it is not our intention to be limited by theory, the following is conjectured. The peak area "a" is believed to be for peaks derived mainly from lithium ion intercalated in the positive electrode active material and from the adhering lithium-containing coating film, and presumably it is a relative representation of the positive electrode active material. On the other hand, the peak area "b" is considered to be for peaks derived from lithium compounds that have separated from the positive electrode active material, integrated with the peak area "a". Namely, b/a is considered to represent the amount of lithium compound that has separated from the positive electrode active material. The lithium compound that has separated from the positive electrode active material can maintain a high input/output characteristic without inhibiting electron conduction or ion diffusion between the positive electrode active material. Furthermore, active products such as fluorine ions generated by high-temperature storage are adsorbed by the lithium compound, thereby suppressing deterioration of properties and gas generation due to high-temperature storage.

If b/a is 1.04 or greater, the amount of lithium compound with respect to the positive electrode active material will be sufficient, and therefore active products such as fluorine ions generated by high-temperature storage will be adsorbed by the lithium compound, thereby suppressing deterioration of properties and gas generation due to high-temperature storage. If b/a is no greater than 5.56, the lithium compound will be able to maintain a high input/output characteristic without inhibiting electron conduction or ion diffusion between the positive electrode active material.

[Measurement of Solid $^7$Li—NMR Spectrum of Positive Electrode Active Material Layer]

The area ratio b/a of the peak area "a" at −40 ppm to 40 ppm, with a repeated latency of 10 seconds, and the peak area "b" at −40 ppm to 40 ppm, with a repeated latency of 3000 seconds, in the solid $^7$Li—NMR spectrum of the positive electrode active material layer, can be calculated by the following method.

The measuring apparatus used for solid $^7$Li—NMR may be a commercially available apparatus. Measurement is performed by the single pulse method in a room temperature environment, with a magic-angle spinning rotational speed of 14.5 kHz and an irradiation pulse width set to a 45° pulse. Measurement is performed with repeated latency of 10 seconds and 3000 seconds, to obtain a solid $^7$Li—NMR spectrum. When obtaining the solid $^7$Li—NMR spectrum, the measuring conditions other than the repeated latency, such as the number of scans and receiver gain, are all identical. A 1 mol/L aqueous lithium chloride solution is used as the shift reference, and the shift position measured separately as an external standard is defined as 0 ppm. During measurement of the aqueous lithium chloride solution, the single pulse method is used with an irradiation pulse width set to a 45° pulse, without rotation of the sample.

The peak areas "a" and "b" at −40 ppm to 40 ppm are read off from the solid $^7$Li—NMR spectrum of the positive electrode active material layer obtained by the method described above, and b/a is calculated.

[Evaluation of Power Storage Element Properties]

Evaluation of the properties of nonaqueous alkali metal-type power storage elements containing lithium ion secondary batteries of the invention will now be described, but since the operating voltage varies depending on the combination of the positive electrode active material and negative electrode active material, the set value for the voltage during charge/discharge must be changed depending on the nonaqueous alkali metal-type power storage element. The following exemplary charge/discharge voltages for evaluation of the properties are not intended to be limitative.

(Service Capacity)

For the purpose of the present specification, the capacitance Q (Ah) is the value obtained by the following method.

First, in a thermostatic bath set to 25° C., a cell corresponding to the nonaqueous alkali metal-type power storage element is subjected to constant-current charge at the 0.1C current value until 4.2 V is reached, and then constant-voltage charge is carried out for 30 minutes with application of a constant voltage of 4.2 V. Next, the electric capacitance after constant-current discharge to 3.0 V at the 0.1C current value is recorded as Q (Ah).

[Volume]

The volume of the nonaqueous alkali metal-type power storage element containing the lithium ion secondary battery is the volume of the portion of the electrode laminated body or wound electrode in which the region where the positive electrode active material layer and negative electrode active material layer are stacked is housed by the casing.

For example, in the case of an electrode laminated body or wound electrode housed by a laminate film, typically the region of the electrode laminated body or wound electrode where the positive electrode active material layer and negative electrode active material layer are present is housed in a cup-shaped laminate film. The volume ($V_1$) of the nonaqueous alkali metal-type power storage element containing the lithium ion secondary battery is calculated by $V_1=l_1 \times w_1 \times t_1$, using the outer length ($l_1$) and outer width ($w_1$) of the cup-shaped section, and the thickness (ti) of the nonaqueous alkali metal-type power storage element including the laminate film.

In the case of an electrode laminated body or wound electrode housed in a rectilinear metal can, the volume of the outer dimensions of the metal can are simply used as the volume of the nonaqueous alkali metal-type power storage element. Namely, the volume ($V_2$) of the lithium ion secondary battery is calculated by $V_2=l_2 \times w_2 \times t_2$, based on the outer length ($l_2$) and outer width ($w_2$), and outer thickness ($t_2$), of the rectilinear metal can.

In the case of a wound electrode housed in a cylindrical metal can, the volume of the outer dimensions of the metal can are used as the volume of the nonaqueous alkali metal-type power storage element. Namely, the volume ($V_3$) of the nonaqueous alkali metal-type power storage element is calculated by $V_3=3.14 \times r \times r \times l_3$, using the outer radius (r) and outer length ($l_3$) of the bottom face or top face of the cylindrical metal can.

[Energy Density]

Throughout the present specification, the energy density is the value obtained by the formula $Q/V_i$ (Ah/L), using the electric capacitance Q and volume $V_i$ (i=1, 2, 3) of the nonaqueous alkali metal-type power storage element containing the lithium ion secondary battery.

(Internal Resistance at Ordinary Temperature)

Throughout the present specification, the internal resistance Ra ($\Omega$) at ordinary temperature is the value obtained by the following method.

First, in a thermostatic bath set to 25° C., a cell corresponding to the nonaqueous alkali metal-type power storage element is subjected to constant-current charge at the 0.1C current value until 4.2 V is reached, and then constant-voltage charge is carried out for 30 minutes with application of a constant voltage of 4.2 V. Next, constant-current discharge is carried out to 3.0 V at the 5C current value, to obtain a discharge curve (time-voltage). From the discharge curve, with a voltage of Eo at discharge time=0 seconds, obtained by extrapolating by linear approximation from the voltage values at discharge time points of 2 seconds and 4 seconds, the value calculated from voltage drop $\Delta E=4.2-Eo$ and $Ra=\Delta E/(5C$ (current value A)) is the internal resistance Ra ($\Omega$) at ordinary temperature.

[Durability Test]

(Gas Generation Volume and Internal Resistance after High-Temperature Storage Test)

For the purpose of the present specification, the gas generation volume in the high-temperature storage test is measured by the following method.

First, in a thermostatic bath set to 25° C., a cell corresponding to the nonaqueous alkali metal-type power storage element is subjected to constant-current charge at the 0.1C current value until 4.2 V is reached, and then constant-voltage charge is carried out for 30 minutes with application of a constant voltage of 4.2 V. The cell is then stored in a 60° C. environment, and every 2 weeks it is removed out from the 60° C. environment, the cell voltage is charged to 4.2 V by the charging procedure described above, and the cell is again stored in a 60° C. environment. This procedure is repeated, and the cell volume Va (cc) before the start of storage and the cell volume Vb (cc) after two months of the storage test are measured by Archimedes' method. (Vb−Va)/Q is the gas quantity (cc/Ah) generated during storage for 2 months at a cell voltage of 4.2 V and an environmental temperature of 60° C.

The resistance value obtained for the cell after the high-temperature storage test, using the same measuring method as for the internal resistance at ordinary temperature, is recorded as the internal resistance Rb ($\Omega$) after the high-temperature storage test.

The value of the gas quantity (Vb−Va) generated upon storage for 2 months at a cell voltage of 4.2 V and an environmental temperature of 60° C., divided by the capacitance Q, or (Vb−Va)/Q, is preferably no greater than 2.7 cc/Ah, more preferably no greater than 2.0 cc/Ah and even more preferably no greater than 1.5 cc/Ah, as the value measured at 25° C., from the viewpoint of minimizing reduction in properties of the element due to generated gas. If the gas quantity measured at 25° C. is no greater than 2.7 cc/Ah, then the risk of expansion of the cell by gas generation will be minimal, even when the nonaqueous alkali metal-type power storage element has been exposed to high temperature for a prolonged period. It will thus be possible to obtain a power storage element having sufficient safety and durability.

The change in internal resistance before and after high-temperature storage testing is expressed as Rb/Ra·From the viewpoint of allowing sufficient charge capacity and service capacity to be exhibited for high current after exposure to high-temperature environmental conditions for a prolonged period, Rb/Ra is preferably no greater than 3.0, more preferably no greater than 2.0 and even more preferably no greater than 1.5. If Rb/Ra is no greater than 3.0, an excellent output characteristic can be obtained stably for prolonged periods, leading to a longer usable life for the nonaqueous alkali metal-type power storage element.

(High-Load Charge/Discharge Cycle Test)

For the present specification, the resistance increase rate (Rd/Ra) after the high-load charge/discharge cycle test is measured by the following method.

First, a cell corresponding to the nonaqueous alkali metal-type power storage element is subjected to constant-current charge in a thermostatic bath set to 25° C., until reaching 4.2 V at the 1C current value, and then constant-current discharge is carried out at the 1C current value until reaching 3.0 V. The charge/discharge procedure is repeated 500 times, measuring the internal resistance before start of the test and after completion of the test, and the resistance increase rate after the high-load charge/discharge cycle test with respect to before start of the test is calculated as Rd/Ra, with Ra (Ω) as the internal resistance before start of the test and Rd (Q) as the internal resistance after completion of the test.

EXAMPLES

Examples and comparative examples for the first embodiment of the invention will now be described. However, the invention is not limited in any way by these examples and comparative examples.

Examples 1-1 to 1-21, Comparative Examples 1-1 to 1-3

[Production of Positive Electrode Precursor]

There were mixed 86.5 parts by weight of $LiCoO_2$ powder (product of Nichia Corp.) as a positive electrode active material, 5.0 parts by weight of acetylene black, 3.5 parts by weight of lithium carbonate as a lithium compound, 5.0 parts by weight of PVdF (polyvinylidene fluoride) and NMP (N-methylpyrrolidone), to obtain a positive electrode slurry with a solid concentration of 45 weight %. The mean particle diameter of the lithium carbonate was as listed in Table 1. The obtained positive electrode slurry was coated and dried onto one or both sides of a 15 μm-thick aluminum foil as a positive electrode power collector, and then pressed, to obtain a positive electrode precursor (hereunder referred to as "single-sided positive electrode precursor" and "double-sided positive electrode precursor", respectively). The thickness of the positive electrode active material layer of the positive electrode precursor was approximately 65 μm per side, though with slight differences depending on the mean particle diameter of the lithium carbonate.

[Fabrication of Negative Electrode]

There were mixed 85.4 parts by weight of commercially available hard carbon (product of Kureha Corp.), 8.3 parts by weight of acetylene black, 6.3 parts by weight of PVdF (polyvinylidene fluoride) and NMP (N-methylpyrrolidone), to obtain a negative electrode slurry. The obtained negative electrode slurry was coated and dried onto both sides of a 10 μm-thick electrolytic copper foil as the negative electrode power collector and pressed to obtain a negative electrode (hereunder referred to as "double-sided negative electrode"). The thickness per side of the negative electrode active material layer of the obtained negative electrode was 115 μm.

[Assembly]

The obtained double-sided negative electrode and double-sided positive electrode precursor were cut to 10 cm×10 cm (100 $cm^2$). Using a single-sided positive electrode precursor for the uppermost side and lowermost side, 21 double-sided negative electrodes and 20 double-sided positive electrode precursors were stacked, sandwiching microporous film separators each with a thickness of 15 μm between the negative electrodes and positive electrode precursors. Next, a negative electrode terminal and positive electrode terminal were connected to the negative electrodes and positive electrode precursors, respectively, by ultrasonic welding to obtain an electrode laminated body. The electrode laminated body was housed in a casing composed of an aluminum laminate package material, and 3 sides of the casing at the electrode terminal section and bottom section were heat sealed under conditions with a temperature of 180° C., a seal time of 20 sec and a seal pressure of 1.0 MPa. It was vacuum dried under conditions with a temperature of 80° C., a pressure of 50 Pa and a drying time of 60 hr.

[Preparation of Electrolytic Solution]

As an organic solvent there was used a mixed solvent of ethylene carbonate (EC):methyl ethyl carbonate (EMC)=33:67 (volume ratio), each electrolyte salt was dissolved so that the concentration ratio of $LiN(SO_2F)_2$ and $LiPF_6$ was 75:25 (molar ratio) with respect to the total electrolytic solution and the total concentration of $LiN(SO_2F)_2$ and $LiPF_6$ was 1.2 mol/L, and the obtained solution was used as a nonaqueous electrolytic solution.

The concentrations of $LiN(SO_2F)_2$ and $LiPF_6$ in the prepared electrolytic solution were 0.9 mol/L and 0.3 mol/L, respectively.

[Filling, Impregnation and Sealing]

Approximately 80 g of the nonaqueous electrolytic solution was injected into the electrode laminated body housed in the aluminum laminate package material, in a dry air environment at atmospheric pressure, a temperature of 25° C. and a dew point of no higher than −40° C. Next, it was placed in a pressure reduction chamber and the pressure was reduced from atmospheric pressure to −87 kPa, after which it was restored to atmospheric pressure and allowed to stand for 5 minutes. The procedure of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. A procedure of pressure reduction and restoration to atmospheric pressure in the same manner was repeated 7 times. (Pressure reduction from atmospheric pressure to −95, −96, −97, −81, −97, −97 and −97 kPa). The electrode laminated body was impregnated with the nonaqueous electrolytic solution by this procedure.

Next, the electrode laminated body housed in the aluminum laminate package material and impregnated with the nonaqueous electrolytic solution was placed in a pressure-reducing sealing machine, and with pressure reduction to −95 kPa, it was sealed at 180° C. for 10 seconds at a pressure of 0.1 MPa to seal the aluminum laminate package material and fabricate a lithium ion secondary battery.

[Pre-Doping]

The obtained lithium ion secondary battery was subjected to initial charging by a method of constant-current charging using a charge/discharge apparatus (TOSCAT-3100U) by Toyo System Co., Ltd., in an environment of 45° C. with a current value of 0.5 A until reaching a voltage of 4.5 V, followed by constant-voltage charge at 4.5 V continued for an arbitrary time period, for pre-doping of the negative electrode. Table 1 shows a summary of the 4.5 V constant-voltage charge times.

[Aging]

The pre-doped lithium ion secondary battery was subjected to constant-current discharge in an environment of 25° C. at 0.5 A until reaching a voltage of 3.0 V, and then constant-current discharge at 3.0 V for 1 hour, to adjust the voltage to 3.0 V. The lithium ion secondary battery was then stored for 5 hours in a thermostatic bath at 60° C.

[Degassing]

A portion of the aluminum laminate package material of the aged lithium ion secondary battery was unsealed in a dry air environment with a temperature of 25° C. and a dew point of −40° C. Next, the lithium ion secondary battery was placed in a pressure reduction chamber, and a procedure of pressure reduction over a period of 3 minutes from atmospheric pressure to −80 kPa, followed by restoration to atmospheric pressure over a period of 3 minutes, was repeated 3 times. Next, the lithium ion secondary battery was placed in a pressure-reducing sealing machine, and after pressure reduction to −90 kPa, it was sealed at 200° C. for 10 seconds at a pressure of 0.1 MPa to seal the aluminum laminate package material.

[Quantitation of Compounds of Formulas (1) to (3) in Positive Electrode Active Material Layer]

After adjusting the obtained lithium ion secondary battery to 2.9 V, it was disassembled in an argon (Ar) box set in a room at 23° C. and controlled to a dew point of no higher than −90° C. and an oxygen concentration of no greater than 1 ppm, and the positive electrode body was removed. The removed positive electrode body was immersed and rinsed in dimethyl carbonate (DMC), and then vacuum dried in a side box while maintaining a state of non-exposure to air.

The dried positive electrode was transferred from the side box to an Ar box while maintaining a state of non-exposure to air and was immersed and extracted in heavy water to obtain a positive electrode liquid extract. Analysis of the liquid extract was by (i) IC and (ii) $^1$H-NMR, and the abundance per unit weight of the positive electrode active material layer (mol/g) for each compound accumulated on the positive electrode body was determined by the following formula (4):

Abundance per unit weight (mol/g)=A×B÷C    (4)

from the concentration of each compound in the positive electrode liquid extract A (mol/ml), the volume of heavy water used for extraction B (ml) and the weight of active material of the positive electrode active material layer used for extraction C (g).

The active material weight in the positive electrode active material layer used for extraction was determined by the following method. The mixture (positive electrode active material layer) was peeled off from the power collector of the positive electrode body remaining after heavy water extraction, and the peeled mixture was rinsed with water and vacuum dried. The mixture obtained by vacuum drying was washed with NMP or DMF. Next, the obtained positive electrode active material layer was again vacuum dried and weighed to determine the weight of the positive electrode active material layer used for extraction.

The positive electrode liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and $^1$H NMR measurement was performed by the double tube method. The 7.1 ppm (m, 2H) signal of 1,2,4,5-tetrafluorobenzene was normalized, and the integral of each observed compound was calculated.

Deuterated chloroform containing dimethyl sulfoxide at known concentration was placed in a 3 mmφ NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and $^1$H NMR measurement was performed by the double tube method. In the same manner as above, the 7.1 ppm (m, 2H) signal of 1,2,4,5-tetrafluorobenzene was normalized, and the integral of the 2.6 ppm (s, 6H) signal of dimethyl sulfoxide was calculated. The concentration A of each compound in the positive electrode liquid extract was determined based on the relationship between the dimethyl sulfoxide concentration used and the integral.

Assignment for the $^1$H NMR spectrum was as follows.

[For XOCH$_2$CH$_2$OX]

CH$_2$ in XOCH$_2$CH$_2$OX: 3.7 ppm (s, 4H)

CH$_3$OX: 3.3 ppm (s, 3H)

CH$_3$ in CH$_3$CH$_2$OX: 1.2 ppm (t, 3H)

CH$_2$O in CH$_3$CH$_2$OX: 3.7 ppm (q, 2H)

As mentioned above, the signal for CH$_2$ in XOCH$_2$CH$_2$OX (3.7 ppm) overlaps with the signal of CH$_2$O in CH$_3$CH$_2$OX (3.7 ppm), and therefore the amount of the compound of formulas (1) to (3) was calculated by excluding the portion corresponding to CH$_2$O in CH$_3$CH$_2$OX calculated from the signal for CH$_3$ in CH$_3$CH$_2$OX (1.2 ppm).

Here, X is —(COO)$_n$Li or —(COO)$_n$R$^1$ (where n is 0 or 1, and R$^1$ is an alkyl group of 1 to 4 carbon atoms or a halogenated alkyl group of 1 to 4 carbon atoms).

The amount of each of the compounds of formulas (1) to (3) in the positive electrode active material layer was measured from the concentration of each compound in the liquid extract determined by the aforementioned analyses (i) and (ii), and also the volume of the heavy water used for extraction and the weight of the positive electrode active material layer used for extraction, and the results are summarized in Table 1. As shown here, in Comparative Example 1-1 wherein lithium carbonate was not added to the positive electrode precursor, virtually no compound of formulas (1) to (3) was present in the positive electrode active material layer, but in the other examples, compounds of formulas (1) to (3) were present in proportion to the time for constant-voltage charging at 4.5 V in pre-doping.

[Measurement of Mean Particle Diameter of Lithium Compound]

The obtained lithium ion secondary battery was disassembled in an argon box with a dew point temperature of −72° C., the positive electrode coated on both sides with the positive electrode active material layer was cut out to a size of 10 cm×5 cm, and its weight was measured to be 0.512 g. The obtained positive electrode was immersed in 30 g of a diethyl carbonate solvent and was washed for 10 minutes while occasionally moving the positive electrode with a pincette. The positive electrode was then removed out and air-dried for 5 minutes in an argon box, and then immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain positive electrode sample 1.

[Identification of Lithium Compound by SEM-EDX]

A small 1 cm×1 cm piece was cut out from positive electrode sample 1, and the surface was coated by sputtering of gold in a vacuum of 10 Pa. Next, the positive electrode surface was measured by SEM and EDX under atmospheric exposure, under the conditions described below.

(SEM-EDX Measuring Conditions)

Measuring apparatus: FE-SEM S-4700 Electrolytic emission scanning electron microscope by Hitachi High-Technologies Corp.
Acceleration voltage: 10 kV
Emission current: 1 µA
Measurement magnification: 2000×
Electron beam incident angle: 90°
X-ray take-off angle: 30°
Dead time: 15%
Mapping elements: C, O
Measurement pixel count 256×256 pixels
Measuring time: 60 secs
Number of scans: 50
The luminance and contrast were adjusted so that the brightness had no pixel reaching the maximum luminance, and the mean value of the brightness was a luminance in the range of 40% to 60%.

Since the sections where the obtained carbon mapping and oxygen mapping overlapped were confirmed to be interspersed in a particulate manner, it was concluded that lithium carbonate was interspersed in a particulate manner in the positive electrode active material layer. The cross-sectional area S was determined for all of the lithium carbonate particles in an SEM image in the same visual field, and the particle diameters d were calculated by formula 3 above, as summarized in Table 1.

Except for Comparative Example 1-1, the mean particle diameter of the lithium carbonate was reduced after fabrication of the lithium ion secondary battery, compared to the mean particle diameter of the lithium carbonate that was added during fabrication of the positive electrode precursor. This means that the lithium carbonate had functioned as a dopant source.

[Solid $^7$Li—NMR Measurement]

The positive electrode of the obtained lithium ion secondary battery was used for solid $^7$Li—NMR measurement of the positive electrode active material layer.

First, the lithium ion secondary battery fabricated as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 2 hours.

The positive electrode active material layer was then sampled under an argon atmosphere. The lithium ion secondary battery was disassembled under an argon atmosphere, and the positive electrode was removed. Next, the obtained positive electrode was immersed in diethyl carbonate for 2 minutes or longer to remove the lithium salt. After immersion once more in diethyl carbonate under the same conditions, it was air-dried. The positive electrode active material layer was then sampled from the positive electrode.

The obtained positive electrode active material layer was used as a sample for solid $^7$Li—NMR measurement. Measurement was performed by the single pulse method, using an ECA700 ($^7$Li—NMR resonance frequency: 272.1 MHz) by JEOL RESONANCE Inc. as the measuring apparatus, in a room temperature environment, with a magic-angle spinning rotational speed of 14.5 kHz and the irradiation pulse width set to a 45° pulse. The observation range was −400 ppm to 400 ppm, and the number of points was 4096. Measurement was performed with repeated latency of 10 seconds and 3000 seconds, using the same measuring conditions other than the repeated latency, such as the same number of scans and receiver gain, and an NMR spectrum was obtained. A 1 mol/L aqueous lithium chloride solution was used as the shift reference, and the shift position measured separately as an external standard was defined as 0 ppm. During measurement of the aqueous lithium chloride solution, the single pulse method was used with an irradiation pulse width set to a 45° pulse, without rotation of the sample.

The value of b/a was calculated by the method described above, from the solid $^7$Li—NMR spectrum of the positive electrode active material layer obtained by the method described above. The results are shown in Table 1.

[Measurement of Service Capacity]

The obtained lithium ion secondary battery was subjected to constant-current charge using a charge/discharge apparatus by Fujitsu Telecom Networks, Ltd. in a thermostatic bath set to 25° C., at the 0.1C current value until reaching 4.2 V, and then constant-voltage charge was carried out with application of a constant voltage of 4.2 V for a total of 30 minutes. Next, the service capacity Q after constant-current discharge to 3.0 V at the 0.1C current value was recorded, as shown in Table 1.

[Calculation of Ra]

The obtained lithium ion secondary battery was subjected to constant-current charge using a charge/discharge apparatus by Fujitsu Telecom Networks, Ltd. in a thermostatic bath set to 25° C., at the 5C current value until reaching 4.2 V, and then constant-voltage charge was carried out with application of a constant voltage of 4.2 V for a total of 30 minutes, after which constant-current discharge was carried out at the 5C current value to 3.0 V, to obtain a discharge curve (time-voltage). From the discharge curve, with a voltage of Eo at discharge time=0 seconds, obtained by extrapolating by linear approximation from the voltage values at discharge time points of 2 seconds and 4 seconds, the internal resistance Ra at ordinary temperature was calculated from the voltage drop $\Delta E=4.2-Eo$ and $R=\Delta E/(5C$ (current value A)). The internal resistance Ra at 25° C. is listed in Table 1.

[Gas Generation Volume after High-Temperature Storage Test]

The obtained lithium ion secondary battery was subjected to constant-current charge using a charge/discharge apparatus by Fujitsu Telecom Networks, Ltd. in a thermostatic bath set to 25° C., at the 0.1C current value until reaching 4.2 V, and constant-voltage charge was continued with application of a constant voltage of 4.2 V for a total of 30 minutes. The cell was then stored in a 60° C. environment, and every 2 weeks it was removed out from the 60° C. environment, the cell voltage was charged to 4.2 V by the same charging procedure, and the cell was again stored in a 60° C. environment. This procedure was repeatedly carried out for 2 months, and the cell volume Va before the start of the storage test and the cell volume Vb after two months of the storage test were measured by Archimedes' method. The gas generation volume determined by (Vb−Va)/Q is listed in Table 1.

[Calculation of Rb/Ra]

The internal resistance Rb at ordinary temperature after the high-temperature storage test was calculated for the power storage element after the high-temperature storage test, in the same manner as [Calculation of Ra] above.

The value of Rb (Ω) was divided by the internal resistance Ra (Ω) before the high-temperature storage test, as calculated above under [Calculation of Ra·F], to obtain the ratio Rb/Ra which is listed in Table 1.

Examples 1-22 to 1-37, Comparative Examples 1-4 to 1-6

[Production of Positive Electrode Precursor]

There were mixed 77 parts by weight of $LiFePO_4$ powder as a positive electrode active material, 13 parts by weight of acetylene black, 6.5 parts by weight of lithium carbonate as a lithium compound, 3.5 parts by weight of PVdF (polyvinylidene fluoride) and NMP (N-methylpyrrolidone), to obtain a positive electrode slurry with a solid concentration of 35 weight %. The mean particle diameter of the lithium carbonate was as listed in Table 2. The obtained positive electrode slurry was coated onto one or both sides of a 15 μm-thick aluminum foil as a positive electrode power collector, dried and then pressed, to obtain a positive electrode precursor (hereunder referred to as "single-sided positive electrode precursor" and "double-sided positive electrode

TABLE 1

| | Positive electrode active material | Charge time/hr | Mean particle diameter of lithium carbonate added to positive electrode precursor/μm | Amount of compound in positive electrode active material layer/mol g$^{-1}$ | Mean particle diameter of lithium carbonate after lithium doping/μm | $^7$Li-NMR b/a | Initial properties | | High-temperature storage properties | |
|---|---|---|---|---|---|---|---|---|---|---|
| | | | | | | | Q/Ah | Ra/mΩ | (Vb−Va)/ Q/cc Ah$^{-1}$ | Rb/Ra |
| Example 1-1 | $LiCoO_2$ | 6 | 2.30 | $8.7 \times 10^{-9}$ | 1.99 | 3.45 | 7.5 | 19.4 | 0.69 | 2.3 |
| Example 1-2 | | 7 | 2.21 | $6.3 \times 10^{-8}$ | 1.72 | 3.36 | 7.7 | 17.8 | 0.66 | 2.2 |
| Example 1-3 | | 8 | 2.02 | $3.2 \times 10^{-6}$ | 1.52 | 3.23 | 8.0 | 15.3 | 0.60 | 2.1 |
| Example 1-4 | | 9 | 2.29 | $2.9 \times 10^{-5}$ | 1.85 | 3.10 | 8.2 | 15.5 | 0.57 | 1.8 |
| Example 1-5 | | 14 | 2.04 | $3.2 \times 10^{-4}$ | 1.33 | 2.93 | 7.9 | 16.3 | 0.66 | 1.7 |
| Example 1-6 | | 24 | 2.56 | $5.1 \times 10^{-3}$ | 1.92 | 2.83 | 7.9 | 18.5 | 0.74 | 2.0 |
| Example 1-7 | | 32 | 2.01 | $2.9 \times 10^{-2}$ | 1.66 | 2.79 | 7.7 | 19.7 | 0.82 | 2.5 |
| Example 1-8 | | 8 | 10.23 | $4.1 \times 10^{-6}$ | 9.31 | 2.98 | 7.7 | 15.1 | 0.57 | 2.1 |
| Example 1-9 | | 8 | 8.78 | $3.8 \times 10^{-6}$ | 7.85 | 3.10 | 7.9 | 14.9 | 0.54 | 1.9 |
| Example 1-10 | | 8 | 6.87 | $4.2 \times 10^{-6}$ | 5.44 | 2.90 | 8.0 | 14.3 | 0.53 | 1.7 |
| Example 1-11 | | 8 | 4.81 | $3.7 \times 10^{-6}$ | 3.81 | 2.93 | 7.9 | 15.2 | 0.59 | 1.8 |
| Example 1-12 | | 8 | 1.98 | $3.9 \times 10^{-6}$ | 0.20 | 2.77 | 7.7 | 16.6 | 0.66 | 2.2 |
| Example 1-13 | | 8 | 12.91 | $4.0 \times 10^{-6}$ | 11.84 | 2.91 | 7.2 | 20.9 | 0.78 | 2.6 |
| Example 1-14 | | 8 | 0.72 | $3.9 \times 10^{-6}$ | 0.09 | 2.76 | 7.1 | 19.9 | 0.80 | 2.8 |
| Example 1-15 | | 7 | 2.34 | $2.6 \times 10^{-8}$ | 2.12 | 5.50 | 7.9 | 16.0 | 0.73 | 2.0 |
| Example 1-16 | | 8 | 2.43 | $1.8 \times 10^{-7}$ | 2.22 | 3.37 | 7.5 | 14.7 | 0.57 | 1.9 |
| Example 1-17 | | 9 | 2.56 | $3.1 \times 10^{-7}$ | 2.20 | 2.39 | 7.3 | 14.3 | 0.54 | 1.8 |
| Example 1-18 | | 15 | 2.88 | $5.9 \times 10^{-5}$ | 2.34 | 1.14 | 7.4 | 14.5 | 0.57 | 1.9 |
| Example 1-19 | | 32 | 3.03 | $3.3 \times 10^{-3}$ | 1.95 | 1.06 | 7.2 | 15.5 | 0.95 | 2.1 |
| Example 1-20 | | 48 | 4.53 | $2.1 \times 10^{-3}$ | 1.95 | 1.01 | 8.0 | 20.5 | 0.51 | 2.5 |
| Example 1-21 | | 7 | 2.45 | $3.5 \times 10^{-8}$ | 2.29 | 5.68 | 7.0 | 21.4 | 1.11 | 2.8 |
| Comp. Example 1-1 | | 6 | 0 | $3.5 \times 10^{-10}$ | 0.00 | 1.01 | 6.0 | 28.8 | 3.93 | 7.3 |
| Comp. Example 1-2 | | 6 | 3.85 | $3.6 \times 10^{-9}$ | 3.80 | 5.63 | 6.0 | 27.8 | 3.36 | 6.2 |
| Comp. Example 1-3 | | 48 | 2.55 | $3.1 \times 10^{-2}$ | 0.30 | 1.03 | 6.2 | 25.4 | 2.86 | 4.7 |

From Table 1 it is seen that if the amount of compounds of formulas (1) to (3) in the positive electrode active material layer is between $3.8 \times 10^{-9}$ mol/g and $3.0 \times 10^{-2}$ mol/g, then a lithium ion secondary battery is provided with a small Ra, low internal resistance, small (Vb−Va)/Q and Rb/Ra, and excellent durability during high-temperature storage. Without being limited to theory, the reason for this is believed to be that compounds of formulas (1) to (3) in the positive electrode active material layer present in the coating film on the surface of the positive electrode active material act as satisfactory ionic conductors, performing the role of reducing internal resistance, while they also cover the reactive sites on the positive electrode active material, thereby preventing decomposition of the electrolytic solution during high-temperature storage.

precursor", respectively). The thickness of the positive electrode active material layer of the positive electrode precursor was approximately 95 μm per side, though with slight differences depending on the mean particle diameter of the lithium carbonate.

[Fabrication of Negative Electrode]

There were mixed 85.4 parts by weight of commercially available hard carbon (product of Kureha Corp.), 8.3 parts by weight of acetylene black, 6.3 parts by weight of PVdF (polyvinylidene fluoride) and NMP (N-methylpyrrolidone), to obtain a negative electrode slurry. The obtained negative electrode slurry was coated onto both sides of a 10 μm-thick electrolytic copper foil as the negative electrode power collector, dried and pressed to obtain a negative electrode (hereunder referred to as "double-sided negative electrode"). The thickness per side of the negative electrode active material layer of the obtained negative electrode was 85 μm.

[Assembly]

Double-sided negative electrodes similar to Examples 1-1 to 1-21 and Comparative Examples 1-1 to 1-3, and double-sided positive electrode precursors obtained as described above, were cut to 10 cm×10 cm (100 cm$^2$). Using a single-sided positive electrode precursor for the uppermost side and lowermost side, 21 double-sided negative electrodes and 20 double-sided positive electrode precursors were stacked, sandwiching microporous film separators each with a thickness of 15 μm between the negative electrodes and positive electrode precursors. Next, a negative electrode terminal and positive electrode terminal were connected to the negative electrodes and positive electrode precursors, respectively, by ultrasonic welding to form an electrode laminated body. The electrode laminated body was housed in a casing composed of an aluminum laminate package material, and 3 sides of the casing at the electrode terminal section and bottom section were heat sealed under conditions with a temperature of 180° C., a seal time of 20 sec and a seal pressure of 1.0 MPa. It was vacuum dried under conditions with a temperature of 80° C., a pressure of 50 Pa and a drying time of 60 hr.

[Filling, Impregnation and Sealing]

The electrode laminated body housed in the aluminum laminate package material was filled with approximately 80 g of nonaqueous electrolytic solution under atmospheric pressure, in the same manner as Examples 1-1 to 1-16 and Comparative Examples 1-1 to 1-3, in a dry air environment with a temperature of 25° C. and a dew point of no higher than −40° C. Next, it was placed in a pressure reduction chamber and the pressure was reduced from atmospheric pressure to −87 kPa, after which it was restored to atmospheric pressure and allowed to stand for 5 minutes. The procedure of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. The procedure of pressure reduction and restoration to atmospheric pressure in the same manner was repeated a total of 7 times (pressure reduction from atmospheric pressure to −95, −96, −97, −81, −97, −97 and −97 kPa, respectively). The electrode laminated body was impregnated with the nonaqueous electrolytic solution by this procedure.

Next, the electrode laminated body housed in the aluminum laminate package material and impregnated with the nonaqueous electrolytic solution was placed in a pressure-reducing sealing machine, and with pressure reduction to −95 kPa, it was sealed at 180° C. for 10 seconds at a pressure of 0.1 MPa to seal the aluminum laminate package material and fabricate a lithium ion secondary battery.

[Pre-Doping]

The obtained lithium ion secondary battery was subjected to initial charging by a method of constant-current charging using a charge/discharge apparatus (TOSCAT-3100U) by Toyo System Co., Ltd., in an environment of 45° C. with a current value of 0.5 A until reaching a voltage of 4.6 V, followed by constant-voltage charge at 4.6 V continued for an arbitrary time period, for pre-doping of the negative electrode. Table 2 shows a summary of the 4.6 V constant-voltage charge times.

[Aging]

The pre-doped lithium ion secondary battery was subjected to constant-current discharge in an environment of 25° C. at 0.5 A until reaching a voltage of 3.0 V, and then constant-current discharge at 3.0 V for 1 hour, to adjust the voltage to 3.0 V. The lithium ion secondary battery was then stored for 5 hours in a thermostatic bath at 60° C.

[Degassing]

A portion of the aluminum laminate package material of the aged lithium ion secondary battery was unsealed in a dry air environment with a temperature of 25° C. and a dew point of −40° C. Next, the lithium ion secondary battery was placed in a pressure reduction chamber, and a procedure of pressure reduction over a period of 3 minutes from atmospheric pressure to −80 kPa, followed by restoration to atmospheric pressure over a period of 3 minutes, was repeated 3 times. Next, the lithium ion secondary battery was placed in a pressure-reducing sealing machine, and after pressure reduction to −90 kPa, it was sealed at 200° C. for 10 seconds at a pressure of 0.1 MPa to seal the aluminum laminate package material.

Quantitation of compounds of formulas (1) to (3) in the positive electrode active material layer, measurement of the mean particle diameter of the lithium compound, and solid $^7$Li—NMR measurement were carried out in the same manner as in Examples 1-1 to 1-21 and Comparative Examples 1-1 to 1-3. The results are summarized in Table 2.

[Measurement of Service Capacity]

The obtained lithium ion secondary battery was subjected to constant-current charge using a charge/discharge apparatus by Fujitsu Telecom Networks, Ltd. in a thermostatic bath set to 25° C., at the 0.1C current value until reaching 4.0 V, and constant-voltage charge was continued with application of a constant voltage of 4.0 V for a total of 30 minutes. Next, the capacitance after constant-current discharge to 3.0 V at the 0.1C current value was recorded, as shown in Table 2.

[Calculation of Ra]

The obtained lithium ion secondary battery was subjected to constant-current charge using a charge/discharge apparatus by Fujitsu Telecom Networks, Ltd. in a thermostatic bath set to 25° C., at the 5C current value until reaching 4.0 V, and then constant-voltage charge was carried out with application of a constant voltage of 4.0 V for a total of 30 minutes, after which constant-current discharge was carried out at the 5C current value to 3.0 V, to obtain a discharge curve (time-voltage). From the discharge curve, with a voltage of Eo at discharge time=0 seconds, obtained by extrapolating by linear approximation from the voltage values at discharge time points of 2 seconds and 4 seconds, the internal resistance Ra at ordinary temperature was calculated from the voltage drop $\Delta E=4.0-Eo$ and $R=\Delta E/(5C$ (current value A)). The internal resistance Ra at 25° C. is listed in Table 2.

[Gas Generation Volume after High-Temperature Storage Test]

The obtained lithium ion secondary battery was subjected to constant-current charge using a charge/discharge apparatus by Fujitsu Telecom Networks, Ltd. in a thermostatic bath set to 25° C., at the 0.1C current value until reaching 4.0 V, and constant-voltage charge was continued with application of a constant voltage of 4.0 V for a total of 30 minutes. The cell was then stored in a 60° C. environment, and every 2 weeks it was removed out from the 60° C. environment, the cell voltage was charged to 4.0 V by the same charging procedure, and the cell was again stored in a 60° C. environment. This procedure was repeatedly carried out for 2 months, and the cell volume Va before the start of the storage test and the cell volume Vb after two months of the storage test were measured by Archimedes' method. The gas generation volume determined by (Vb−Va)/Q is listed in Table 2.
[Calculation of Rb/Ra]

The internal resistance Rb at ordinary temperature after the high-temperature storage test was calculated for the lithium ion secondary battery after the high-temperature storage test, in the same manner as [Calculation of Ra] above.

The value of Rb (Ω) was divided by the internal resistance Ra (Ω) before the high-temperature storage test, as calculated above under [Calculation of Ra·F], to obtain the ratio Rb/Ra which is listed in Table 2.

storage. Without being limited to theory, the reason for this is believed to be that an effect similar to Examples 1-1 to 1-16 and Comparative Examples 1-1 to 1-3, which used $LiCoO_2$ as the positive electrode active material, was also exhibited in lithium ion secondary batteries using $LiFePO_4$ as a different positive electrode active material. Namely, it is suggested that the effect is not dependent on the type of positive electrode active material.

Example 1-38

A lithium ion secondary battery was fabricated by the same procedure as Examples 1-1 to 1-21 and Comparative Examples 1-1 to 1-3, except for using lithium oxide with a mean particle diameter of 2.15 μm as the lithium compound added to the positive electrode precursor for production of the positive electrode precursor, and the different evaluations were conducted. The results are listed in Table 3.

Example 1-39

A lithium ion secondary battery was fabricated by the same procedure as Examples 1-1 to 1-21 and Comparative

TABLE 2

| | Positive electrode active material | Charge time/hr | Mean particle diameter of lithium carbonate added to positive electrode precursor/μm | Amount of compound in positive electrode composite layer/mol g$^{-1}$ | Mean particle diameter of lithium carbonate after lithium doping/μm | $^7$Li-NMR b/a | Initial properties | | High-temperature storage properties | |
|---|---|---|---|---|---|---|---|---|---|---|
| | | | | | | | Q/Ah | Ra/mΩ | (Vb − Va)/Q/ cc Ah$^{-1}$ | Rb/Ra |
| Example 1-22 | LiFePO$_4$ | 6 | 2.43 | 4.2 × 10$^{-9}$ | 2.08 | 3.39 | 5.3 | 25.1 | 1.05 | 2.5 |
| Example 1-23 | | 8 | 2.01 | 2.8 × 10$^{-6}$ | 1.49 | 3.29 | 5.7 | 20.9 | 0.89 | 2.2 |
| Example 1-24 | | 9 | 2.10 | 8.9 × 10$^{-5}$ | 1.75 | 3.09 | 5.6 | 20.3 | 0.93 | 1.8 |
| Example 1-25 | | 14 | 2.29 | 5.8 × 10$^{-4}$ | 1.29 | 3.01 | 5.3 | 21.3 | 1.07 | 1.7 |
| Example 1-26 | | 24 | 2.67 | 1.6 × 10$^{-3}$ | 1.80 | 2.72 | 5.1 | 24.4 | 1.26 | 2.1 |
| Example 1-27 | | 32 | 1.99 | 1.5 × 10$^{-2}$ | 1.56 | 2.74 | 5.0 | 26.0 | 1.37 | 2.2 |
| Example 1-28 | | 8 | 10.55 | 3.0 × 10$^{-6}$ | 9.21 | 3.31 | 5.3 | 20.1 | 0.88 | 2.3 |
| Example 1-29 | | 8 | 6.91 | 2.8 × 10$^{-6}$ | 5.32 | 2.97 | 5.5 | 18.5 | 0.85 | 1.8 |
| Example 1-30 | | 8 | 2.29 | 3.2 × 10$^{-6}$ | 0.19 | 2.61 | 5.7 | 21.6 | 0.98 | 2.3 |
| Example 1-31 | | 8 | 13.10 | 3.1 × 10$^{-6}$ | 10.51 | 2.86 | 5.0 | 27.4 | 1.23 | 2.5 |
| Example 1-32 | | 8 | 1.08 | 3.2 × 10$^{-6}$ | 0.08 | 2.64 | 5.2 | 26.5 | 1.25 | 2.9 |
| Example 1-33 | | 7 | 2.28 | 7.1 × 10$^{-8}$ | 2.09 | 5.54 | 5.3 | 21.1 | 1.18 | 2.1 |
| Example 1-34 | | 9 | 2.69 | 3.0 × 10$^{-7}$ | 2.38 | 2.62 | 5.1 | 18.4 | 0.87 | 1.8 |
| Example 1-35 | | 32 | 2.98 | 4.8 × 10$^{-3}$ | 1.86 | 1.05 | 5.0 | 20.1 | 1.51 | 2.2 |
| Example 1-36 | | 48 | 4.69 | 7.1 × 10$^{-3}$ | 1.89 | 1.02 | 5.6 | 27.8 | 0.77 | 2.6 |
| Example 1-37 | | 7 | 2.58 | 2.9 × 10$^{-8}$ | 2.37 | 5.69 | 4.7 | 27.9 | 1.82 | 2.9 |
| Comp. Example 1-4 | | 6 | 0.00 | 7.1 × 10$^{-10}$ | 0.00 | 1.01 | 4.1 | 37.7 | 6.32 | 7.8 |
| Comp. Example 1-5 | | 6 | 4.12 | 3.7 × 10$^{-9}$ | 4.10 | 5.59 | 4.1 | 36.6 | 5.41 | 6.2 |
| Comp. Example 1-6 | | 48 | 2.68 | 3.5 × 10$^{-2}$ | 0.29 | 1.02 | 3.8 | 34.3 | 5.04 | 5.0 |

From Table 2 it is seen that if the abundance of compounds of formulas (1) to (3) in the positive electrode active material layer is between $3.8 \times 10^{-9}$ mol/g and $3.0 \times 10^{-2}$ mol/g, then a lithium ion secondary battery is provided with a small Ra, low internal resistance, small (Vb−Va)/Q and Rb/Ra, and excellent durability during high-temperature Examples 1-1 to 1-3, except for using lithium hydroxide with a mean particle diameter of 2.29 μm as the lithium compound added to the positive electrode precursor for production of the positive electrode precursor, and the different evaluations were conducted. The results are listed in Table 3.

TABLE 3

| | Lithium compound | Charge time/hr | Mean particle diameter of lithium carbonate added to positive electrode precursor/μm | Amount of compound in positive electrode composite layer/mol g⁻¹ | Mean particle diameter of lithium carbonate after lithium doping/μm | $^7$Li-NMR b/a | Initial properties Q/Ah | Initial properties Ra/mΩ | High-temperature storage properties (Vb-Va)/Q/ cc Ah$^{-1}$ | High-temperature storage properties Rb/Ra |
|---|---|---|---|---|---|---|---|---|---|---|
| Example 1-38 | Lithium oxide | 8 | 2.15 | $4.5 \times 10^{-6}$ | 1.89 | 3.60 | 8.1 | 15.9 | 0.51 | 2.3 |
| Example 1-39 | Lithium hydroxide | 8 | 2.29 | $2.0 \times 10^{-6}$ | 1.90 | 3.11 | 8.0 | 15.1 | 0.56 | 2.2 |

Examples 1-38 and 1-39 in Table 3 suggest that lithium oxide and lithium hydroxide can both be used as dopant sources for the lithium compounds used in lithium ion secondary batteries, and that satisfactory properties can be exhibited.

Examples and comparative examples for the second embodiment of the invention will now be described. However, the invention is not limited in any way by these examples and comparative examples.

Example 2-1

[Production of Positive Electrode Precursor]
(Production of Positive Electrode Precursor 1)

There were mixed 87.0 parts by weight of LiCoO$_2$ powder (product of Nichia Corp.) having a mean particle diameter of 4 μm, as a positive electrode active material, 5.0 parts by weight of acetylene black, 3.0 parts by weight of an optional lithium compound, 5.0 parts by weight of PVdF (polyvinylidene fluoride) and NMP (N-methylpyrrolidone), to obtain a positive electrode slurry with a solid concentration of 42 weight %. The type and mean particle diameter of the lithium compound was as shown in Table 4. The obtained positive electrode slurry was coated onto one or both sides of an aluminum foil with a thickness of 15 μm, as the positive electrode power collector, and dried and pressed, to obtain positive electrode precursor 1. The thickness of the positive electrode active material layer of positive electrode precursor 1 was approximately 70 μm per side, though with a slight difference depending on the type and mean particle diameter of the lithium compound.

(Production of Positive Electrode Precursor 2)

There were mixed 74.5 parts by weight of LiFePO$_4$ powder having a mean particle diameter of 2 μm, as a positive electrode active material, 13.0 parts by weight of acetylene black, 9.0 parts by weight of an optional lithium compound, 3.5 parts by weight of PVdF (polyvinylidene fluoride) and NMP (N-methylpyrrolidone), to obtain a positive electrode slurry with a solid concentration of 32 weight %. The type and mean particle diameter of the lithium compound was as shown in Table 5. The obtained positive electrode slurry was coated onto one or both sides of an aluminum foil with a thickness of 15 μm, as the positive electrode power collector, and dried and pressed, to obtain positive electrode precursor 2. The thickness of the positive electrode active material layer of positive electrode precursor 2 was approximately 100 μm per side, though with a slight difference depending on the type and mean particle diameter of the lithium compound.

[Fabrication of Negative Electrode]
(Preparation of Negative Electrode 1)

There were mixed 84.0 parts by weight of commercially available hard carbon (product of Kureha Corp.), 8.0 parts by weight of acetylene black, 6.0 parts by weight of PVdF (polyvinylidene fluoride) and NMP (N-methylpyrrolidone), to obtain a negative electrode slurry. The obtained negative electrode slurry was coated onto both sides of a 10 μm-thick electrolytic copper foil as the negative electrode power collector, dried and pressed to obtain negative electrode 1. The thickness per side of the negative electrode active material layer of the obtained negative electrode 1 was 120 μm.

(Preparation of Negative Electrode 2)

There were mixed 84.0 parts by weight of commercially available hard carbon (product of Kureha Corp.), 8.0 parts by weight of acetylene black, 6.0 parts by weight of PVdF (polyvinylidene fluoride) and NMP (N-methylpyrrolidone), to obtain a negative electrode slurry. The obtained negative electrode slurry was coated onto both sides of a 10 μm-thick electrolytic copper foil as the negative electrode power collector, dried and pressed to obtain negative electrode 2. The thickness per side of the negative electrode active material layer of the obtained negative electrode 2 was 90 μm.

[Preparation of Nonaqueous Electrolytic Solution]

As an organic solvent there was used a mixed solvent of ethylene carbonate (EC):methyl ethyl carbonate (EMC)=33:67 (volume ratio), each electrolyte salt was dissolved so that the concentration ratio of LiN(SO$_2$F)$_2$ and LiPF$_6$ was 75:25 (molar ratio) with respect to the total electrolytic solution and the total concentration of LiN(SO$_2$F)$_2$ and LiPF$_6$ was 1.2 mol/L, and the obtained solution was used as a nonaqueous electrolytic solution.

The concentrations of LiN(SO$_2$F)$_2$ and LiPF$_6$ in the prepared electrolytic solution were 0.9 mol/L and 0.3 mol/L, respectively.

[Fabrication of Lithium Ion Secondary Battery]
(Assembly and Drying of Power Storage Element)

The obtained double-sided positive electrode precursor 1 and double-sided negative electrode 1 were cut to 10 cm×10 cm (100 cm$^2$). Using the single-sided positive electrode precursor 1 for the uppermost side and lowermost side, 21 double-sided negative electrodes and 20 double-sided positive electrode precursors were stacked, sandwiching microporous film separators each with a thickness of 15 μm between the negative electrodes and positive electrode precursors. Next, a negative electrode terminal and positive electrode terminal were connected to the negative electrodes and positive electrode precursors, respectively, by ultrasonic welding to form an electrode laminated body. The electrode laminated body was housed in a casing composed of an aluminum laminate package material, and 3 sides of the casing at the electrode terminal section and bottom section were heat sealed under conditions with a temperature of 180° C., a seal time of 20 sec and a seal pressure of 1.0 MPa. It was vacuum dried under conditions with a temperature of 80° C., a pressure of 50 Pa and a drying time of 60 hr.

(Filling, Impregnation and Sealing)

Approximately 80 g of the nonaqueous electrolytic solution was injected into the electrode laminated body housed in the aluminum laminate package material under atmospheric pressure, in a dry air environment with a temperature of 25° C. and a dew point of no higher than −40° C., to form a lithium ion secondary battery before pre-doping. Next, the lithium ion secondary battery was placed in a pressure reduction chamber and the pressure was reduced from ordinary pressure to −87 kPa, after which it was restored to atmospheric pressure and allowed to stand for 5 minutes. The procedure of reducing the pressure from ordinary pressure to −87 kPa and then restoring to atmospheric pressure was subsequently repeated 4 times, and the battery was then allowed to stand for 15 minutes. The pressure was again reduced from ordinary pressure to −91 kPa, and then restored to atmospheric pressure. A procedure of pressure reduction and restoration to atmospheric pressure in the same manner was repeated 7 times. (The pressure reduction was to −95, −96, −97, −81, −97, −97 and −97 kPa, respectively). The electrode laminated body was impregnated with the nonaqueous electrolytic solution by this procedure.

Next, the lithium ion secondary battery was placed in a pressure-reducing sealing machine, and in a state with pressure reduction to −95 kPa, it was sealed at 180° C. for 10 seconds at a pressure of 0.1 MPa to seal the aluminum laminate package material.

(Pre-doping)

The obtained lithium ion secondary battery was subjected to initial charging by a method of constant-current charging using a charge/discharge apparatus (TOSCAT-3100U) by Toyo System Co., Ltd., in an environment of 25° C. with a current value of 0.5 A until reaching a voltage of 4.5 V, followed by constant-voltage charge at 4.5 V continued for 24 hours, for pre-doping of the negative electrode.

(Aging)

The pre-doped lithium ion secondary battery was subjected to constant-current discharge in an environment of 25° C. at 0.5 A until reaching a voltage of 3.0 V, and then constant-current discharge at 3.0 V for 1 hour, to adjust the voltage to 3.0 V. The lithium ion secondary battery was then stored for 6 hours in a thermostatic bath at 60° C.

(Degassing)

A portion of the aluminum laminate package material of the aged lithium ion secondary battery was unsealed in a dry air environment with a temperature of 25° C. and a dew point of −40° C. Next, the lithium ion secondary battery was placed in a pressure reduction chamber, and a procedure of pressure reduction over a period of 3 minutes from atmospheric pressure to −80 kPa, followed by restoration to atmospheric pressure over a period of 3 minutes, was repeated 3 times. Next, the lithium ion secondary battery was placed in a pressure-reducing sealing machine, and after pressure reduction to −90 kPa, it was sealed at 200° C. for 10 seconds at a pressure of 0.1 MPa to seal the aluminum laminate package material.

At least two lithium ion secondary batteries were completed by this procedure.

<Evaluation of Lithium Ion Secondary Battery>

One of the obtained lithium ion secondary batteries was subjected to service capacity and Ra measurement and a high-load charge/discharge cycle test, as described below. The other one was then subjected to pore distribution measurement of the positive electrode by mercury intrusion and positive electrode cross-sectional SEM-EDX measurement, as described below.

[Measurement of Service Capacity]

The obtained lithium ion secondary battery was subjected to constant-current charge using a charge/discharge apparatus by Fujitsu Telecom Networks, Ltd. in a thermostatic bath set to 25° C., at the 0.1C current value until reaching 4.2 V, and then constant-voltage charge was carried out with application of a constant voltage of 4.2 V for a total of 30 minutes. Next, the service capacity Q after constant-current discharge to 3.0 V at the 0.1C current value was recorded, as shown in Table 4.

[Calculation of Ra]

The obtained lithium ion secondary battery was subjected to constant-current charge using a charge/discharge apparatus by Fujitsu Telecom Networks, Ltd. in a thermostatic bath set to 25° C., at the 5C current value until reaching 4.2 V, and then constant-voltage charge was carried out with application of a constant voltage of 4.2 V for a total of 30 minutes, after which constant-current discharge was carried out at the 5C current value to 3.0 V, to obtain a discharge curve (time-voltage). From the discharge curve, with a voltage of Eo at discharge time=0 seconds, obtained by extrapolating by linear approximation from the voltage values at discharge time points of 2 seconds and 4 seconds, the internal resistance Ra at ordinary temperature was calculated from the voltage drop $\Delta E=4.2-Eo$ and $R=\Delta E/(5C$ (current value A)). The results are shown in Table 4.

[High-Load Charge/Discharge Cycle Test]

The obtained lithium ion secondary battery was subjected to constant-current charge using a charge/discharge apparatus (5 V, 360 A) by Fujitsu Telecom Networks, Ltd. in a thermostatic bath set to 25° C., at the 1C current value until reaching 4.2 V, followed by constant-current discharge at the 1C current value until reaching 3.0 V, as a charge/discharge procedure that was repeated 500 times, and the internal resistance Rd at ordinary temperature after the high-load charge/discharge cycle test was calculated, to obtain Rd/Ra. The results are shown in Table 4.

[Preparation of Positive Electrode Sample]

The obtained lithium ion secondary battery was disassembled in an argon box with a dew point temperature of −72° C., and the positive electrode coated on both sides with the positive electrode active material layer was cut out to a size of 10 cm×5 cm and immersed in 30 g of a diethyl carbonate solvent, occasionally moving the positive electrode with a pincette, and was washed for 10 minutes. The positive electrode was then removed out and air-dried for 5 minutes in an argon box, and the positive electrode was immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

[Pore Distribution Measurement of Positive Electrode by Mercury Intrusion]

A small piece with a size of 4 cm×5 cm was cut out from the positive electrode sample, and a mercury porosimeter (Autopore Model IV9510 by Micromeritics, Japan) was used to measure the pore distribution by mercury intrusion, in a pore size measurement range of 400 µm to 0.01 µm. The Vp value was calculated by the method described above, and the obtained results are shown in Table 4. The pore sizes and the log differential pore volumes at the peak top positions are shown together in Table 4, the peaks having a peak value of 0.01 mL/g or greater for the log differential pore volume in the pore size range of 0.1 µm to 100 µm being designated as P1 and P2, in order from smaller pore size.

[SEM-EDX Measurement of Positive Electrode Cross-Section (Identification of Lithium Compound)]

A small 1 cm×1 cm piece was cut out from the positive electrode sample, and an SM-09020CP by JEOL Ltd. was used to create a cross-section perpendicular to the in-plane direction of the positive electrode sample using argon gas, under conditions with an acceleration voltage of 4 kV and a beam diameter of 500 µm. The surface was then coated by sputtering of gold in a vacuum of 10 Pa. Next, the cut out positive electrode surface was measured by SEM and EDX under atmospheric exposure, under the conditions described below.

(SEM-EDX Measuring Conditions)

Measuring apparatus: FE-SEM S-4700 Electrolytic emission scanning electron microscope by Hitachi High-Technologies Corp.
Acceleration voltage: 10 kV
Emission current: 1 µA
Measurement magnification: 2000×
Electron beam incident angle: 90°
X-ray take-off angle: 30°
Dead time: 15%
Mapping elements: C, O
Measurement pixel count 256×256 pixels
Measuring time: 60 secs
Number of scans: 50

The luminance and contrast were adjusted so that the brightness had no pixel reaching the maximum luminance, and the mean value of the brightness was a luminance in the range of 40% to 60%.

Since the overlapping sections of the obtained carbon mapping and oxygen mapping were confirmed to be interspersed in a particulate manner, it was concluded that lithium carbonate was interspersed in a particulate manner in the positive electrode active material layer. The cross-sectional area S was determined for all of the lithium carbonate particles in an SEM image in the same visual field, and the particle diameters d were calculated by formula (1) above, with the results shown in Table 4.

Examples 2-2 to 2-10 and Comparative Example 2-1

Lithium ion secondary batteries for Examples 2-2 to 2-10 and Comparative Example 2-1 were fabricated in the same manner as Example 2-1, except that the types of lithium compounds and their mean particle diameters were changed as shown in Table 4, and the different evaluations were conducted. The evaluation results for the obtained lithium ion secondary batteries are shown in Table 4.

Comparative Example 2-2

A lithium ion secondary battery for Comparative Example 2-2 was fabricated in the same manner as Example 2-1, except that the composition of the positive electrode precursor was 81.0 parts by weight of $LiCoO_2$ powder with a mean particle diameter of 4 µm (product of Nichia Corp.) as the positive electrode active material, 5.0 parts by weight of acetylene black, 9.0 parts by weight of lithium carbonate with a mean particle diameter of 2.4 µm as the lithium compound, and 5.0 parts by weight of PVdF (polyvinylidene fluoride) (represented as "positive electrode precursor 1'" in Table 1), and the different evaluations were conducted. The evaluation results for the obtained lithium ion secondary batteries are shown in Table 4.

Comparative Example 2-3

A lithium ion secondary battery for Comparative Example 2-3 was fabricated in the same manner as Example 2-1, except that the composition of the positive electrode precursor was 90.0 parts by weight of $LiCoO_2$ powder with a mean particle diameter of 4 µm (product of Nichia Corp.) as the positive electrode active material, 5.0 parts by weight of acetylene black and 5.0 parts by weight of PVdF (polyvinylidene fluoride), and the different evaluations were conducted. The evaluation results for the obtained lithium ion secondary batteries are shown in Table 4.

TABLE 4

| | Positive electrode precursor | | | | Positive electrode | | | | | | Lithium ion secondary battery properties | | |
|---|---|---|---|---|---|---|---|---|---|---|---|---|---|
| | Type | Lithium compound | Mean particle diameter of lithium compound (µm) | Negative electrode | Mean particle diameter of lithium compound (µm) | Vp (mL/g) | P1 pore size (µm) | P1 Log differential pore volume (mL/g) | P2 pore size (µm) | P2 Log differential pore volume (mL/g) | Q (Ah) | Ra (mΩ) | Rd/Ra |
| Example 2-1 | Positive electrode precursor 1 | Lithium carbonate | 0.6 | Negative electrode 1 | 0.2 | 0.072 | 0.15 | 0.15 | 0.34 | 0.81 | 8.9 | 16.2 | 1.4 |
| Example 2-2 | Positive electrode precursor 1 | Lithium carbonate | 1.1 | Negative electrode 1 | 0.6 | 0.064 | 0.16 | 0.18 | 0.42 | 0.72 | 8.6 | 16.9 | 1.6 |

TABLE 4-continued

| | | Positive electrode precursor | | | Positive electrode | | | | | | Lithium ion secondary battery properties | | |
|---|---|---|---|---|---|---|---|---|---|---|---|---|---|
| | Type | Lithium compound | Mean particle diameter of lithium compound (μm) | Negative electrode | Mean particle diameter of lithium compound (μm) | Vp (mL/g) | P1 pore size (μm) | P1 Log differential pore volume (mL/g) | P2 pore size (μm) | P2 Log differential pore volume (mL/g) | Q (Ah) | Ra (mΩ) | Rd/Ra |
| Example 2-3 | Positive electrode precursor 1 | Lithium carbonate | 2.4 | Negative electrode 1 | 1.7 | 0.057 | 0.17 | 0.23 | 0.67 | 0.68 | 8.4 | 17.2 | 1.8 |
| Example 2-4 | Positive electrode precursor 1 | Lithium oxide | 2.4 | Negative electrode 1 | 1.6 | 0.055 | 0.16 | 0.22 | 0.78 | 0.66 | 8.3 | 18.1 | 2.0 |
| Example 2-5 | Positive electrode precursor 1 | Lithium hydroxide | 2.4 | Negative electrode 1 | 1.5 | 0.053 | 0.15 | 0.24 | 0.81 | 0.64 | 9.2 | 18.8 | 1.9 |
| Example 2-6 | Positive electrode precursor 1 | Lithium carbonate | 4.8 | Negative electrode 1 | 2.1 | 0.053 | 0.14 | 0.27 | 2.56 | 0.64 | 8.1 | 17.8 | 1.9 |
| Example 2-7 | Positive electrode precursor 1 | Lithium carbonate | 7.1 | Negative electrode 1 | 3.6 | 0.048 | 0.15 | 0.3 | 3.34 | 0.53 | 7.8 | 18.5 | 2.1 |
| Example 2-8 | Positive electrode precursor 1 | Lithium carbonate | 9.5 | Negative electrode 1 | 5.2 | 0.043 | 0.15 | 0.32 | 4.17 | 0.43 | 7.5 | 19.2 | 2.2 |
| Example 2-9 | Positive electrode precursor 1 | Lithium carbonate | 12.6 | Negative electrode 1 | 7.1 | 0.038 | 0.16 | 0.35 | 5.39 | 0.32 | 7.3 | 21.1 | 2.4 |
| Example 2-10 | Positive electrode precursor 1 | Lithium carbonate | 18.9 | Negative electrode 1 | 11.1 | 0.032 | 0.17 | 0.37 | 7.21 | 0.24 | 7.1 | 23.8 | 2.6 |
| Comp. Example 2-1 | Positive electrode precursor 1 | Lithium carbonate | 35.6 | Negative electrode 1 | 32.1 | 0.021 | 0.16 | 0.41 | 3.12 | 0.08 | 6.6 | 25.3 | 3.4 |
| Comp. Example 2-2 | Positive electrode precursor 1' | Lithium carbonate | 2.4 | Negative electrode 1 | 0.5 | 0.225 | 0.14 | 0.12 | 1.78 | 1.32 | 7.6 | 16.3 | 4.5 |
| Comp. Example 2-3 | Positive electrode precursor 1 | None | — | Negative electrode 1 | — | 0.016 | 0.15 | 0.45 | — | — | 6.2 | 29.8 | 4.3 |

As seen from Table 4, except for Comparative Example 2-3, the mean particle diameter of the lithium carbonate was reduced after fabrication of the lithium ion secondary battery, compared to the mean particle diameter of the lithium carbonate that was added during fabrication of the positive electrode precursor. This means that the lithium carbonate had functioned as a dopant source.

It is also seen that if the pore distribution of the positive electrode has at least one peak with a peak value of 0.10 mL/g to 1.0 mL/g for the log differential pore volume in the pore size range of 0.3 μm to 50 μm, and the total cumulative pore volume Vp is 0.03 mL/g to 0.2 mL/g in the pore size range of 0.3 μm to 50 μm, then the Ra value is small (the internal resistance is low, or in other words, the input/output characteristic is high), the service capacity is high, the Rd/Ra value is small, and the element has an excellent high-load charge/discharge cycle characteristic. It is believed that these results are obtained because pores remaining after oxidative decomposition of the lithium compound in the positive electrode precursor in the pre-doping procedure are formed in the interior of the positive electrode, resulting in satisfactory lithium ion conductivity and playing a role in reducing the internal resistance, while satisfactory pores capable of holding electrolytic solution are formed in the interior of the positive electrode, such that during high-load charge/discharge cycling, ions are constantly supplied from the electrolytic solution in the pores formed near the positive electrode active material.

Examples 2-11 to 2-20 and Comparative Example 2-4

[Fabrication of Lithium Ion Secondary Batteries]

At least two of the lithium ion secondary batteries of Examples 2-11 to 2-20 and Comparative Example 2-4 were fabricated for each of Examples 2-11 to 2-20 and Comparative Example 2-4 in the same manner as Example 2-1, except that the positive electrode precursors, the types of lithium compounds, their mean particle diameters and the negative electrodes were as shown in Table 5.

<Evaluation of Lithium Ion Secondary Batteries>

One of the obtained lithium ion secondary batteries was subjected to service capacity and Ra measurement and a high-load charge/discharge cycle test, as described below. The other one was then used for pore distribution measurement by mercury intrusion of the positive electrode in the same manner as Example 2-1 and SEM-EDX measurement of the positive electrode cross-section, and the obtained evaluation results are shown in Table 5.

[Measurement of Service Capacity]

The obtained lithium ion secondary battery was subjected to constant-current charge using a charge/discharge apparatus by Fujitsu Telecom Networks, Ltd. in a thermostatic bath set to 25° C., at the 0.1C current value until reaching 4.0 V, and then constant-voltage charge was carried out with application of a constant voltage of 4.0 V for a total of 30 minutes.

Next, the service capacity Q after constant-current discharge to 3.0 V at the 0.1C current value was recorded, as shown in Table 5.

[Calculation of Ra]

The obtained lithium ion secondary battery was subjected to constant-current charge using a charge/discharge apparatus by Fujitsu Telecom Networks, Ltd. in a thermostatic bath set to 25° C., at the 5C current value until reaching 4.0 V, and then constant-voltage charge was carried out with application of a constant voltage of 4.0 V for a total of 30 minutes, after which constant-current discharge was carried out at the 5C current value to 3.0 V, to obtain a discharge curve (time-voltage). From the discharge curve, with a voltage of Eo at discharge time=0 seconds, obtained by extrapolating by linear approximation from the voltage values at discharge time points of 2 seconds and 4 seconds, the internal resistance Ra at ordinary temperature was calculated from the voltage drop ΔE=4.0−Eo and R=ΔE/(5C (current value A)). The results are shown in Table 5.

[High-Load Charge/Discharge Cycle Test]

The obtained lithium ion secondary battery was subjected to constant-current charge using a charge/discharge apparatus (5 V, 360 A) by Fujitsu Telecom Networks, Ltd. in a thermostatic bath set to 25° C., at the 1C current value until reaching 4.0 V, followed by constant-current discharge at the 1C current value until reaching 3.0 V, as a charge/discharge procedure that was repeated 500 times, and the internal resistance Rd at ordinary temperature after the high-load charge/discharge cycle test was calculated, to obtain Rd/Ra. The results are shown in Table 5.

Comparative Example 2-5

Lithium ion secondary batteries for Comparative Example 2-5 were each fabricated in the same manner as Example 2-11, except that the composition of the positive electrode precursor was 69.5 parts by weight of LiFePO$_4$ powder with a mean particle diameter of 2 μm as the positive electrode active material, 13.0 parts by weight of acetylene black, 14.0 parts by weight of lithium carbonate with a mean particle diameter of 2.4 μm as the lithium compound and 3.5 parts by weight of PVdF (polyvinylidene fluoride) (represented as "positive electrode precursor 2'" in Table 5), and the different evaluations were conducted. The evaluation results for the obtained lithium ion secondary batteries are shown in Table 5.

Comparative Example 2-6

Lithium ion secondary batteries for Comparative Example 2-6 was each fabricated in the same manner as Example 2-11, except that the composition of the positive electrode precursor was 83.5 parts by weight of LiFePO$_4$ powder with a mean particle diameter of 2 μm as the positive electrode active material, 13.0 parts by weight of acetylene black and 3.5 parts by weight of PVdF (polyvinylidene fluoride), and the different evaluations were conducted. The evaluation results for the obtained lithium ion secondary batteries are shown in Table 5.

TABLE 5

| | Positive electrode precursor | | | | Positive electrode | | | | | | Lithium ion secondary battery properties | | |
|---|---|---|---|---|---|---|---|---|---|---|---|---|---|
| | Type | Lithium compound | Mean particle diameter of lithium compound (μm) | Negative electrode | Mean Particle diameter of lithium compound (μm) | Vp (mL/g) | P1 pore size (μm) | P1 Log differential pore volume (mL/g) | P2 pore size (μm) | P2 Log differential pore volume (mL/g) | Q (Ah) | Ra (mΩ) | Rd/Ra |
| Example 2-11 | Positive electrode precursor 2 | Lithium carbonate | 0.6 | Negative electrode 2 | 0.2 | 0.192 | 0.34 | 0.92 | — | — | 6.2 | 22.7 | 1.6 |
| Example 2-12 | Positive electrode precursor 2 | Lithium carbonate | 2.4 | Negative electrode 2 | 1.1 | 0.173 | 1.19 | 0.79 | — | — | 6 | 23.3 | 1.9 |
| Example 2-13 | Positive electrode precursor 2 | Lithium oxide | 2.4 | Negative electrode 2 | 1.3 | 0.167 | 1.02 | 0.75 | — | — | 5.8 | 24.1 | 2.3 |
| Example 2-14 | Positive electrode precursor 2 | Lithium hydroxide | 2.4 | Negative electrode 2 | 1.4 | 0.159 | 0.95 | 0.71 | — | — | 5.7 | 25.9 | 2.5 |
| Example 2-15 | Positive electrode precursor 2 | Lithium carbonate | 7.1 | Negative electrode 2 | 3.2 | 0.151 | 3.61 | 0.64 | — | — | 5.7 | 23.8 | 2.2 |
| Example 2-16 | Positive electrode precursor 2 | Lithium carbonate | 12.6 | Negative electrode 2 | 6.1 | 0.123 | 6.32 | 0.52 | — | — | 5.3 | 24.2 | 2.3 |
| Example 2-17 | Positive electrode precursor 2 | Lithium carbonate | 18.9 | Negative electrode 2 | 9.9 | 0.104 | 8.72 | 0.41 | — | — | 5.1 | 24.8 | 2.5 |
| Example 2-18 | Positive electrode precursor 2 | Lithium carbonate | 25.2 | Negative electrode 2 | 15.2 | 0.088 | 9.76 | 0.32 | — | — | 5 | 25.2 | 2.6 |
| Example 2-19 | Positive electrode precursor 2 | Lithium carbonate | 35.6 | Negative electrode 2 | 21.5 | 0.069 | 13.2 | 0.26 | — | — | 4.8 | 25.7 | 2.8 |
| Example 2-20 | Positive electrode precursor 2 | Lithium carbonate | 48.2 | Negative electrode 2 | 32.6 | 0.042 | 14.4 | 0.15 | — | — | 4.5 | 26.1 | 2.9 |
| Comp. Example 2-4 | Positive electrode precursor 2 | Lithium carbonate | 59.2 | Negative electrode 2 | 50.7 | 0.025 | 8.2 | 0.05 | — | — | 3.5 | 28.4 | 4 |

TABLE 5-continued

| | Positive electrode precursor | | | Positive electrode | | | | | | | Lithium ion secondary battery properties | | |
|---|---|---|---|---|---|---|---|---|---|---|---|---|---|
| | Type | Lithium compound | Mean particle diameter of lithium compound (μm) | Negative electrode | Mean Particle diameter of lithium compound (μm) | Vp (mL/g) | P1 pore size (μm) | P1 Log differential pore volume (mL/g) | P2 pore size (μm) | P2 Log differential pore volume (mL/g) | Q (Ah) | Ra (mΩ) | Rd/Ra |
| Comp. Example 2-5 | Positive electrode precursor 2' | Lithium carbonate | 2.4 | Negative electrode 2 | 0.3 | 0.265 | 1.9 | 1.25 | — | — | 5.5 | 21.1 | 4.4 |
| Comp. Example 2-6 | Positive electrode precursor 2 | None | — | Negative electrode 2 | — | 0.011 | — | — | — | — | 3.2 | 32.1 | 5.1 |

As seen from Table 5, if the pore distribution of the positive electrode has at least one peak with a peak value of 0.10 mL/g to 1.0 mL/g for the log differential pore volume in the pore size range of 0.3 μm to 50 μm, and the total cumulative pore volume Vp is 0.03 mL/g to 0.2 mL/g in the pore size range of 0.3 μm to 50 μm, then the Ra value is small (the internal resistance is low, or in other words, the input/output characteristic is high) and the service capacity is also high, while the Rd/Ra value is small and the element has an excellent high-load charge/discharge cycle characteristic. This means that an effect similar to Examples 2-1 to 2-10 and Comparative Examples 2-1 to 2-3, which are lithium ion secondary batteries using $LiCoO_2$ as the positive electrode active material, was also exhibited in lithium ion secondary batteries using $LiFePO_4$ as a different positive electrode active material. Namely, it is suggested that the effect is not dependent on the type of positive electrode active material.

Examples and comparative examples for the third embodiment of the invention will now be described. However, the invention is not limited in any way by these examples and comparative examples.

Example 3-1

<Production of Positive Electrode Precursor>

There were mixed 86.5 parts by weight of $LiCoO_2$ powder (product of Nichia Corp.) as a positive electrode active material, 5.0 parts by weight of acetylene black, 3.5 parts by weight of lithium carbonate as a lithium compound, 5.0 parts by weight of PTFE (polytetrafluoroethylene) and NMP (N-methylpyrrolidone), to obtain a positive electrode slurry with a solid concentration of 45 weight %. The mean particle diameter of the lithium carbonate was as listed in Table 6. The obtained positive electrode slurry was coated onto one or both sides of a 15 μm-thick aluminum foil as a positive electrode power collector, and then dried and pressed, to obtain a positive electrode precursor (hereunder referred to as "single-sided positive electrode precursor" and "double-sided positive electrode precursor", respectively). The film thickness of the positive electrode active material layer of positive electrode precursor was 67 μm per side.

<Preparation of Negative Electrode Active Material>

Preparation Example 3-1

A 100 g portion of silicon with a mean particle diameter of 0.9 μm was placed into a stainless-steel mesh basket and placed on a stainless-steel vat containing 30 g of coal pitch (softening point: 50° C.), and both were set in an electric furnace (furnace inner usable dimension: 300 mm×300 mm×300 mm). This was increased in temperature to 1000° C. for 15 hours and kept at the same temperature for 6 hours for thermal reaction to obtain composite material 1. The obtained composite material 1 was cooled to 60° C. by natural cooling, and then removed out from the electric furnace. The mean particle diameter of the obtained composite material 1 was 1.1 μm.

Preparation Example 3-2

Composite material 2 was produced in the same manner as Preparation Example 1, except that silicon monoxide with a mean particle diameter of 1.0 μm was used instead of silicon. The mean particle diameter of the obtained composite material 2 was 1.2 μm.

Preparation Example 3-3

Composite material 3 was produced in the same manner as Preparation Example 1, except that tin with a mean particle diameter of 0.8 μm was used instead of silicon. The mean particle diameter of the obtained composite material 3 was 1.0 μm.

Preparation Example 3-4

Composite material 4 was produced in the same manner as Preparation Example 1, except that tin dioxide with a mean particle diameter of 1.1 μm was used instead of silicon. The mean particle diameter of the obtained composite material 4 was 1.3 μm.

<Production of Negative Electrode>

After mixing 75 parts by weight of silicon with a mean particle diameter of 0.9 μm, 10 parts by weight of Ketchen black, 15 parts by weight of a polyimide binder and NMP (N-methylpyrrolidone), the mixture was dispersed using a FILMIX thin-film spinning high-speed mixer by PRIMIX Corp., under conditions with a circumferential speed of 15 m/s, to obtain a coating solution. The coating solution was coated onto both sides of an electrolytic copper foil with a thickness of 10 μm and a $R_{zjis}$ of 1.5 μm using a die coater by Toray Engineering Co., Ltd. under conditions with a coating speed of 1 m/s and dried at a drying temperature of 85° C. to obtain a negative electrode (hereunder also referred to as "double-sided negative electrode"). The obtained negative electrode was pressed using a roll press under conditions with a pressure of 4 kN/cm and a pressed portion surface temperature of 25° C. The total thickness of the obtained negative electrode was measured at 10 arbitrary locations of the negative electrode, using a Linear Gauge Sensor GS-551 by Ono Sokki Co., Ltd. The total thickness of the copper foil was subtracted from the mean value of the measured film thickness, to determine the film thickness of the negative electrode active material layer of the negative electrode. As a result, the film thickness of the negative electrode active material layer of the negative electrode was 25 μm per side.

<Preparation of Nonaqueous Electrolytic Solution>

As an organic solvent there was used a mixed solvent of ethylene carbonate (EC):methyl ethyl carbonate (EMC)=33:67 (volume ratio), each electrolyte salt was dissolved so that the concentration ratio of $LiN(SO_2F)_2$ and $LiPF_6$ was 75:25 (molar ratio) with respect to the total nonaqueous electrolytic solution and the total concentration of $LiN(SO_2F)_2$ and $LiPF_6$ was 1.2 mol/L, and the obtained solution was used as a nonaqueous electrolytic solution.

The concentrations of $LiN(SO_2F)_2$ and $LiPF_6$ in the prepared nonaqueous electrolytic solution were 0.9 mol/L and 0.3 mol/L, respectively.

<Production of Lithium Ion Secondary Battery>

The obtained positive electrode precursor and negative electrode were used to produce a plurality of lithium ion secondary batteries under the conditions described below.

[Assembly]

The obtained double-sided negative electrode and double-sided positive electrode precursor were cut to 10 cm×10 cm (100 cm$^2$). Using the single-sided positive electrode precursor for the uppermost side and lowermost side, 21 double-sided negative electrodes and 20 double-sided positive electrode precursors were stacked, sandwiching microporous film separators each with a thickness of 15 μm between the negative electrodes and positive electrode precursors. Next, a negative electrode terminal and positive electrode terminal were connected to the negative electrodes and positive electrode precursors, respectively, by ultrasonic welding to obtain an electrode laminated body. The electrode laminated body was housed in a casing composed of an aluminum laminate package material, and 3 sides of the casing at the electrode terminal section and bottom section were heat sealed under conditions with a temperature of 180° C., a seal time of 20 sec and a seal pressure of 1.0 MPa. It was vacuum dried under conditions with a temperature of 80° C., a pressure of 50 Pa and a drying time of 60 hr.

[Filling, Impregnation and Sealing]

Approximately 80 g of the nonaqueous electrolytic solution was injected into the electrode laminated body housed in the aluminum laminate package material, in a dry air environment at atmospheric pressure, a temperature of 25° C. and a dew point of no higher than −40° C. Next, it was placed in a pressure reduction chamber and the pressure was reduced from atmospheric pressure to −87 kPa, after which it was restored to atmospheric pressure and allowed to stand for 5 minutes. The procedure of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. A procedure of pressure reduction and restoration to atmospheric pressure in the same manner was repeated 7 times. (Pressure reduction from atmospheric pressure to −95, −96, −97, −81, −97, −97 and −97 kPa). The electrode laminated body was impregnated with the nonaqueous electrolytic solution by this procedure.

Next, the electrode laminated body housed in the aluminum laminate package material and impregnated with the nonaqueous electrolytic solution was placed in a pressure-reducing sealing machine, and with pressure reduction to −95 kPa, it was sealed at 180° C. for 10 seconds at a pressure of 0.1 MPa to seal the aluminum laminate package material and fabricate a lithium ion secondary battery.

[Pre-Doping]

The obtained lithium ion secondary battery was subjected to initial charging by a method of constant-current charging using a charge/discharge apparatus (TOSCAT-3100U) by Toyo System Co., Ltd., in an environment of 45° C. with a current value of 0.5 A until reaching a voltage of 4.5 V, followed by constant-voltage charge at 4.5 V continued for 5 hours, for pre-doping of the negative electrode.

[Aging]

The pre-doped lithium ion secondary battery was subjected to constant-current discharge in an environment of 45° C. at 0.5 A until reaching a voltage of 3.0 V, and then constant-current discharge at 3.0 V for 1 hour, to adjust the voltage to 3.0 V. The lithium ion secondary battery was then stored for 12 hours in a thermostatic bath at 60° C.

[Degassing]

A portion of the aluminum laminate package material of the aged lithium ion secondary battery was unsealed in a dry air environment with a temperature of 25° C. and a dew point of −40° C. Next, the lithium ion secondary battery was placed in a pressure reduction chamber, and a procedure of pressure reduction over a period of 3 minutes from atmospheric pressure to −80 kPa, followed by restoration to atmospheric pressure over a period of 3 minutes, was repeated 3 times. Next, the lithium ion secondary battery was placed in a pressure-reducing sealing machine, and after pressure reduction to −90 kPa, it was sealed at 200° C. for 10 seconds at a pressure of 0.1 MPa to seal the aluminum laminate package material.

<Evaluation of Lithium Ion Secondary Battery>

One of the obtained lithium ion secondary batteries was subjected to the following [Measurement of service capacity and internal resistance at ordinary temperature] and [High-temperature storage test]. The remaining lithium ion secondary battery was used for the following [Solid $^7Li$—NMR measurement], [Quantitation of compounds in positive electrode active material layer] and [Measurement of mean particle diameter of lithium compound].

[Measurement of Service Capacity and Internal Resistance at Ordinary Temperature]

The service capacity Q and internal resistance Ra at ordinary temperature of the obtained lithium ion secondary battery were measured by the method described above using a charge/discharge apparatus by Fujitsu Telecom Networks, Ltd., in a thermostatic bath set to 25° C., with $V_{max}$=4.0 V and $V_{min}$=2.7 V. The obtained energy density $Q/V_1$ values are shown in Table 6.

[Calculation of Gas Generation Volume and Rb/Ra after High-Temperature Storage Test]

The gas generation volume (Vb−Va) after 2 months and the change in resistance Rb/Ra before and after high-temperature storage testing, for each obtained lithium ion secondary battery, were measured by the methods described above using a charge/discharge apparatus by Fujitsu Telecom Networks, Ltd., in a thermostatic bath set to 25° C., with $V_{max}$=4.0 V and $V_{min}$=2.7 V. The results are shown in Table 6.

[Solid $^7Li$—NMR Measurement]

The positive electrode of the obtained lithium ion secondary battery was used for solid $^7Li$—NMR measurement of the positive electrode active material layer.

First, the lithium ion secondary battery fabricated as described above was subjected to constant-current charge to 2.9 V with a current of 50 mA, using a charge/discharge apparatus (ACD-01) by Aska Electronic Co., Ltd., at an environmental temperature of 25° C., and then to constant-current/constant-voltage charge with application of a constant voltage of 2.9 V for 2 hours.

The positive electrode active material layer was then sampled under an argon atmosphere. The lithium ion secondary battery was disassembled under an argon atmosphere, and the positive electrode was removed. Next, the obtained positive electrode was immersed in diethyl carbonate for 2 minutes or longer to remove the lithium salt. After immersion once more in diethyl carbonate under the same conditions, it was air-dried. The positive electrode active material layer was then sampled from the positive electrode.

The obtained positive electrode active material layer was used as a sample for solid $^7$Li—NMR measurement. Measurement was performed by the single pulse method, using an ECA700 ($^7$Li—NMR resonance frequency: 272.1 MHz) by JEOL RESONANCE Inc. as the measuring apparatus, in a room temperature environment, with a magic-angle spinning rotational speed of 14.5 kHz and the irradiation pulse width set to a 45° pulse. The observation range was −400 ppm to 400 ppm, and the number of points was 4096. Measurement was performed with repeated latency of 10 seconds and 3000 seconds, using the same measuring conditions other than the repeated latency, such as the same number of scans and receiver gain, and an NMR spectrum was obtained. A 1 mol/L aqueous lithium chloride solution was used as the shift reference, and the shift position measured separately as an external standard was defined as 0 ppm. During measurement of the aqueous lithium chloride solution, the single pulse method was used with an irradiation pulse width set to a 45° pulse, without rotation of the sample.

The value of b/a was calculated by the method described above, from the solid $^7$Li—NMR spectrum of the positive electrode active material layer obtained by the method described above. The results are shown in Table 6.

[Quantitation of Compounds of Formulas (1) to (3) in Positive Electrode Active Material Layer]

After adjusting the obtained lithium ion secondary battery to 2.9 V, it was disassembled in an argon (Ar) box set in a room at 23° C. and controlled to a dew point of no higher than −90° C. and an oxygen concentration of no greater than 1 ppm, and the positive electrode body was removed. The removed positive electrode body was immersed and rinsed in dimethyl carbonate (DMC), and then vacuum dried in a side box while maintaining a state of non-exposure to air.

The dried positive electrode was transferred from the side box to an Ar box while maintaining a state of non-exposure to air and was immersed and extracted in heavy water to obtain a positive electrode liquid extract. Analysis of the liquid extract was by (i) IC and (ii) $^1$H-NMR, and the abundance per unit weight of the positive electrode active material layer (mol/g) for each compound accumulated on the positive electrode body was determined by the following formula (4):

Abundance per unit weight (mol/g)=A×B÷C (4)

from the concentration of each compound in the positive electrode liquid extract A (mol/ml), the volume of heavy water used for extraction B (ml) and the weight of active material of the positive electrode active material layer used for extraction C (g).

The active material weight in the positive electrode active material layer used for extraction was determined by the following method. The mixture (positive electrode active material layer) was peeled off from the power collector of the positive electrode remaining after heavy water extraction, and the peeled mixture was rinsed with water and vacuum dried. The mixture obtained by vacuum drying was washed with NMP or DMF. Next, the obtained positive electrode active material layer was again vacuum dried and weighed to determine the weight of the positive electrode active material layer used for extraction.

The positive electrode liquid extract was placed in a 3 mmφ NMR tube (PN-002 by Shigemi Corp.) and inserted into a 5 mmφ NMR tube (N-5 by Nihon Seimitsu Kagaku Co., Ltd.) containing 1,2,4,5-tetrafluorobenzene-added deuterated chloroform, and $^1$H NMR measurement was performed by the double tube method. The 7.1 ppm (m, 2H) signal of 1,2,4,5-tetrafluorobenzene was normalized, and the integral of each observed compound was calculated.

Deuterated chloroform containing dimethyl sulfoxide at known concentration was placed in a 3 lump NMR tube (PN-002 by Shigemi Corp.) and inserted into a 5 mmφ NMR tube (N-5 by Nihon Seimitsu Kagaku Co., Ltd.) containing the same 1,2,4,5-tetrafluorobenzene-added deuterated chloroform as above, and $^1$H NMR measurement was performed by the double tube method. In the same manner as above, the 7.1 ppm (m, 2H) signal of 1,2,4,5-tetrafluorobenzene was normalized, and the integral of the 2.6 ppm (s, 6H) signal of dimethyl sulfoxide was calculated. The concentration A of each compound of formulas (1) to (3) in the positive electrode body liquid extract was determined based on the relationship between the dimethyl sulfoxide concentration used and the integral.

Assignment for the $^1$H NMR spectrum was as follows.
[For XOCH$_2$CH$_2$OX]
 CH$_2$ in XOCH$_2$CH$_2$OX: 3.7 ppm (s, 4H)
 CH$_3$OX: 3.3 ppm (s, 3H)
 CH$_3$ in CH$_3$CH$_2$OX: 1.2 ppm (t, 3H)
 CH$_2$O in CH$_3$CH$_2$OX: 3.7 ppm (q, 2H)

As mentioned above, the signal for CH$_2$ in XOCH$_2$CH$_2$OX (3.7 ppm) overlaps with the signal of CH$_2$O in CH$_3$CH$_2$OX (3.7 ppm), and therefore the amount of XOCH$_2$CH$_2$OX was calculated by excluding the portion corresponding to CH$_2$O in CH$_3$CH$_2$OX calculated from the signal for CH$_3$ in CH$_3$CH$_2$OX (1.2 ppm).

Here, X is —(COO)$_n$Li or —(COO)$_n$R$^1$ (where n is 0 or 1, and R$^1$ is an alkyl group of 1 to 4 carbon atoms or a halogenated alkyl group of 1 to 4 carbon atoms).

The abundance of each of the compounds of formulas (1) to (3) in the positive electrode active material layer was obtained from the concentration of each compound in the liquid extract determined by the aforementioned analyses (i) and (ii), and also the volume of the heavy water used for extraction and the amount of the positive electrode active material layer used for extraction. The results are shown in Table 6.

[Measurement of Mean Particle Diameter of Lithium Compound]

The obtained lithium ion secondary battery was disassembled in an argon box with a dew point temperature of −72° C., and the positive electrode coated on both sides with the positive electrode active material layer was cut out to a size of 10 cm×5 cm. The obtained positive electrode was immersed in 30 g of a diethyl carbonate solvent and was washed for 10 minutes while occasionally moving the positive electrode with a pincette. The positive electrode was then removed out and air-dried for 5 minutes in an argon box, and then immersed in 30 g of freshly prepared diethyl carbonate solvent and washed for 10 minutes by the same method as described above. The positive electrode was removed from the argon box, and a vacuum dryer (DP33 by Yamato Scientific Co., Ltd.) was used for drying for 20 hours at a temperature of 25° C. and a pressure of 1 kPa, to obtain a positive electrode sample.

A small 1 cm×1 cm piece was cut out from the positive electrode sample, and the surface was coated by sputtering of gold in a vacuum of 10 Pa. Next, the positive electrode surface was measured by SEM and EDX under atmospheric exposure, under the conditions described below.

(SEM-EDX measuring conditions)

Measuring apparatus: FE-SEM S-4700 Electrolytic emission scanning electron microscope by Hitachi High-Technologies Corp.
   Acceleration voltage: 10 kV
   Emission current: 1 μA
   Measurement magnification: 2000×
   Electron beam incident angle: 90°
   X-ray take-off angle: 30°
   Dead time: 15%
   Mapping elements: O, C
   Measurement pixel count 256×256 pixels
   Measuring time: 60 secs
   Number of scans: 50
   The luminance and contrast were adjusted so that the brightness had no pixel reaching the maximum luminance, and the mean value of the brightness was a luminance in the range of 40% to 60%.

From the obtained carbon mapping and oxygen mapping it was seen that particulate lithium carbonate was interspersed in the positive electrode active material layer. In an SEM image in the same visual field, the particle diameter d of the lithium carbonate after pre-doping was determined, by the method described above. The results are shown in Table 6.

Examples 3-2 to 3-27 and Comparative Examples 3-1 to 3-3

<Production of Positive Electrode Precursors>

Positive electrode precursors were produced in the same manner as Example 3-1, except that the positive electrode active materials, the mean particle diameters of the lithium carbonate, the positive electrode active materials, and the parts by weight of the lithium carbonate were as shown in Tables 6 and 7.

<Production of Negative Electrodes>

Negative electrodes were produced in the same manner as Example 3-1, except that the negative electrode active materials and the film thicknesses on each side of the negative electrode active material layers were as shown in Tables 6 and 7.

<Production and Evaluation of Lithium Ion Secondary Batteries>

Lithium ion secondary batteries were produced and evaluated in the same manner as Example 3-1, except that the constant-voltage charge times for pre-doping were as shown in Tables 6 and 7. The results are shown in Tables 6 and 7.

Comparative Examples 3-4 to 3-8

<Production of Positive Electrode Precursors>

Positive electrode precursors were produced in the same manner as Example 3-1, except that the positive electrode active materials, the mean particle diameters of the lithium carbonate, the positive electrode active materials, and the parts by weight of the lithium carbonate were as shown in Table 7.

<Production of Negative Electrodes>

After mixing 80 parts by weight of the negative electrode active material, using artificial graphite with a mean particle diameter of 4.9 μm or natural graphite with a mean particle diameter of 6.7 μm as the negative electrode active material, 5 parts by weight of Ketchen black, 15 parts by weight of PVdF (polyvinylidene fluoride) and NMP (N-methylpyrrolidone), the mixture was dispersed using a FILMIX® thin-film spinning high-speed mixer by PRIMIX Corp., under conditions with a circumferential speed of 15 m/s, to obtain a coating solution. A negative electrode was produced in the same manner as Example 3-1, except that this coating solution was used, and the film thickness per side of the negative electrode active material layer was adjusted to the values listed in Table 7.

<Production and Evaluation of Lithium Ion Secondary Batteries>

Lithium ion secondary batteries were produced and evaluated in the same manner as Example 3-1, except that the constant-voltage charge times for pre-doping were as shown in Table 7. The results are shown in Table 7.

TABLE 6

| | Positive electrode precursor | | | | Negative electrode | Positive electrode | | | | | |
| | | | | | Film thickness of negative electrode active material layer per side (μm) | Lithium doping step constant voltage charge time (hr) | Amount of compound of formula (1)-(3) (mol/g) | Mean particle diameter d of lithium carbonate after lithium doping (μm) | Solid $^7$Li- NMR b/a | Initial properties Q/V1 (Ah/L) | High-temperature storage properties | |
| Positive electrode | Positive electrode active material | Mean particle diameter of lithium carbonate (μm) | Positive electrode active material (parts by weight) | Lithium carbonate (parts by weight) | Negative electrode active material | | | | | | | Vb-Va (cc) | Rb/Ra |
| Example 3-1 | LiCoO$_2$ | 2.0 | 86.5 | 3.5 | Silicon | 25 | 5 | $7.2 \times 10^{-9}$ | 1.56 | 1.71 | 168 | 6.2 | 2.9 |
| Example 3-2 | | 2.0 | 86.5 | 3.5 | Silicon | 25 | 8 | $1.8 \times 10^{-6}$ | 1.52 | 1.99 | 168 | 5.8 | 2.7 |
| Example 3-3 | | 2.0 | 86.5 | 3.5 | Silicon | 25 | 14 | $3.5 \times 10^{-4}$ | 1.44 | 1.70 | 168 | 3.7 | 2.2 |
| Example 3-4 | | 2.5 | 86.5 | 3.5 | Silicon | 25 | 20 | $5.1 \times 10^{-5}$ | 1.97 | 1.63 | 168 | 4.2 | 2.3 |

TABLE 6-continued

| | Positive electrode precursor | | | Negative electrode | | Positive electrode | | | | |
|---|---|---|---|---|---|---|---|---|---|---|
| | | | | | Film thickness of negative electrode active material layer per side (μm) | Lithium doping step constant voltage charge time (hr) | Amount of compound of formula (1)-(3) (mol/g) | Mean particle diameter d of lithium carbonate after lithium doping (μm) | | Initial properties | High-temperature storage properties |
| Positive electrode active material | Mean particle diameter of lithium carbonate (μm) | Positive electrode active material (parts by weight) | Lithium carbonate (parts by weight) | Negative electrode active material | | | | | Solid $^7$Li-NMR b/a | Q/V1 (Ah/L) | Vb-Va (cc) | Rb/Ra |
| Example 3-5 | | 2.5 | 86.5 | 3.5 | Silicon | 25 | 24 | $2.4 \times 10^{-3}$ | 1.92 | 1.56 | 168 | 4.9 | 2.5 |
| Example 3-6 | | 2.5 | 86.5 | 3.5 | Silicon | 25 | 48 | $2.9 \times 10^{-2}$ | 1.86 | 1.74 | 168 | 5.5 | 2.6 |
| Example 3-7 | | 2.0 | 86.5 | 3.5 | Silicon | 11 | 14 | $2.1 \times 10^{-4}$ | 1.53 | 1.89 | 96 | 3.9 | 2.3 |
| Example 3-8 | | 2.0 | 86.5 | 3.5 | Silicon | 40 | 14 | $3.6 \times 10^{-4}$ | 1.45 | 1.69 | 137 | 4.0 | 2.1 |
| Example 3-9 | | 2.0 | 86.5 | 3.5 | Silicon | 70 | 14 | $4.4 \times 10^{-4}$ | 1.37 | 1.65 | 100 | 4.2 | 1.9 |
| Example 3-10 | | 2.0 | 86.5 | 3.5 | Silicon monoxide | 35 | 14 | $5.0 \times 10^{-4}$ | 1.62 | 1.98 | 146 | 3.1 | 1.7 |
| Example 3-11 | | 2.0 | 86.5 | | Tin | 60 | 14 | $1.9 \times 10^{-4}$ | 1.55 | 1.82 | 110 | 4.3 | 2.6 |
| Example 3-12 | | 2.0 | 86.5 | 3.5 | Tin dioxide | 70 | 14 | $9.3 \times 10^{-3}$ | 1.69 | 1.76 | 99 | 3.9 | 2.3 |
| Example 3-13 | | 2.0 | 86.5 | 3.5 | Composite material 1 | 35 | 14 | $7.1 \times 10^{-4}$ | 1.56 | 1.91 | 145 | 2.8 | 1.8 |
| Example 3-14 | | 2.0 | 86.5 | 3.5 | Composite material 2 | 55 | 5 | $4.1 \times 10^{-9}$ | 1.72 | 1.86 | 122 | 4.3 | 2.8 |
| Example 3-15 | | 2.0 | 86.5 | 3.5 | Composite material 2 | 55 | 8 | $5.3 \times 10^{-6}$ | 1.69 | 1.83 | 122 | 3.4 | 2.2 |
| Example 3-16 | | 2.0 | 86.5 | 3.5 | Composite material 2 | 55 | 14 | $6.8 \times 10^{-4}$ | 1.65 | 1.93 | 122 | 2.3 | 1.5 |

TABLE 7

| | Positive electrode precursor | | | Negative electrode | | Positive electrode | | | | |
|---|---|---|---|---|---|---|---|---|---|---|
| | | | | | Film thickness of negative electrode active material layer per side (μm) | Lithium doping step constant voltage charge time (hr) | Amount of compound of formula (1)-(3) (mol/g) | Mean particle diameter d of lithium carbonate after lithium doping (μm) | | Initial properties | High-temperature storage properties |
| Positive electrode active material | Mean particle diameter of lithium carbonate (μm) | Positive electrode active material (parts by weight) | Lithium carbonate (parts by weight) | Negative electrode active material | | | | | Solid $^7$Li-NMR b/a | Q/V1 (Ah/L) | Vb-Va (cc) | Rb/Ra |
| Example 3-17 | LiCoO$_2$ | 2.5 | 86.5 | 3.5 | Composite material 2 | 55 | 20 | $4.3 \times 10^{-5}$ | 2.29 | 1.83 | 122 | 2.7 | 1.7 |
| Example 3-18 | | 2.5 | 86.5 | 3.5 | Composite material 2 | 55 | 24 | $3.7 \times 10^{-3}$ | 2.20 | 1.85 | 122 | 3.1 | 2.0 |
| Example 3-19 | | 2.5 | 86.5 | 3.5 | Composite material 2 | 55 | 48 | $1.9 \times 10^{-2}$ | 2.17 | 1.87 | 122 | 3.8 | 2.4 |
| Example 3-20 | | 1.0 | 86.5 | 3.5 | Composite material 2 | 55 | 30 | $4.1 \times 10^{-3}$ | 0.32 | 1.75 | 122 | 3.0 | 2.1 |
| Example 3-21 | | 8.0 | 86.5 | 3.5 | Composite material 2 | 55 | 20 | $5.3 \times 10^{-5}$ | 6.27 | 1.81 | 122 | 2.7 | 1.9 |
| Example 3-22 | | 9.5 | 86.5 | 3.5 | Composite material 2 | 55 | 6 | $4.7 \times 10^{-8}$ | 9.61 | 1.77 | 122 | 2.9 | 2.6 |
| Example 3-23 | | 2.0 | 88.5 | 1.5 | Composite material 2 | 55 | 14 | $6.2 \times 10^{-4}$ | 1.42 | 1.05 | 131 | 3.2 | 1.8 |
| Example 3-24 | | 2.0 | 83.0 | 7.0 | Composite material 2 | 55 | 14 | $3.5 \times 10^{-4}$ | 1.65 | 3.23 | 120 | 2.2 | 1.6 |
| Example 3-25 | | 2.0 | 76.0 | 14.0 | Composite material 2 | 55 | 14 | $5.5 \times 10^{-4}$ | 1.82 | 5.49 | 114 | 2.7 | 1.9 |

TABLE 7-continued

| | Positive electrode precursor | | | Negative electrode | | | Positive electrode | | | | |
|---|---|---|---|---|---|---|---|---|---|---|---|
| | | | | | Film thickness of negative electrode active material layer per side (μm) | Lithium doping step constant voltage charge time (hr) | Amount of compound of formula (1)-(3) (mol/g) | Mean particle diameter d of lithium carbonate after lithium doping (μm) | Solid $^7$Li-NMR b/a | Initial properties Q/V1 (Ah/L) | High-temperature storage properties | |
| Positive electrode active material | Mean particle diameter of lithium carbonate (μm) | Positive electrode active material (parts by weight) | Lithium carbonate (parts by weight) | Negative electrode active material | | | | | | | Vb−Va (cc) | Rb/Ra |
| Example 3-26 | 2.0 | 86.5 | 3.5 | Composite material 3 | 70 | 14 | $3.8 \times 10^{-4}$ | 1.68 | 1.80 | 99 | 3.5 | 2.4 |
| Example 3-27 | 2.0 | 86.5 | 3.5 | Composite material 4 | 75 | 14 | $4.0 \times 10^{-4}$ | 1.73 | 1.79 | 93 | 3.2 | 2.2 |
| Comp. Example 3-1 | 2.0 | 89.5 | 0.5 | Composite material 2 | 55 | 5 | $1.9 \times 10^{-9}$ | 1.82 | 1.02 | 132 | 25.2 | 7.2 |
| Comp. Example 3-2 | None | 90.0 | 0.0 | Composite material 2 | 55 | 14 | $9.4 \times 10^{-10}$ | None | 1.00 | 133 | 32.2 | 8.9 |
| Comp. Example 3-3 | 2.5 | 86.5 | 3.5 | Composite material 2 | 55 | 72 | $3.2 \times 10^{-2}$ | 2.05 | 1.72 | 122 | 8.9 | 4.7 |
| Comp. Example 3-4 | 2.0 | 86.5 | 3.5 | Artificial graphite | 80 | 14 | $4.2 \times 10^{-4}$ | 1.87 | 1.42 | 85 | 2.4 | 3.1 |
| Comp. Example 3-5 | None | 90.0 | 0.0 | Artificial graphite | 60 | 14 | $6.7 \times 10^{-10}$ | None | 1.00 | 82 | 16.4 | 4.3 |
| Comp. Example 3-6 | None | 90.0 | 0.0 | Artificial graphite | 80 | 14 | $8.2 \times 10^{-10}$ | None | 1.00 | 91 | 18.2 | 5.2 |
| Comp. Example 3-7 | None | 90.0 | 0.0 | Artificial graphite | 100 | 14 | $9.6 \times 10^{-10}$ | None | 1.00 | 79 | 21.8 | 7.0 |
| Comp. Example 3-8 | 2.0 | 86.5 | 3.5 | Natural graphite | 80 | 14 | $5.7 \times 10^{-4}$ | 1.84 | 1.58 | 87 | 2.5 | 3.4 |

Example 3-28

<Production of Positive Electrode Precursors>

There were mixed 86.5 parts by weight of LiFePO$_4$ powder (product of Nichia Corp.) as a positive electrode active material, 5.0 parts by weight of acetylene black, 3.5 parts by weight of lithium carbonate as a lithium compound, 5.0 parts by weight of PTFE (polytetrafluoroethylene) and NMP (N-methylpyrrolidone), to obtain a positive electrode slurry with a solid concentration of 45 weight %. The mean particle diameter of the lithium carbonate was as listed in Table 8. The obtained positive electrode slurry was coated onto one or both sides of a 15 μm-thick aluminum foil as a positive electrode power collector, dried and then pressed, to obtain a positive electrode precursor (hereunder referred to as "single-sided positive electrode precursor" and "double-sided positive electrode precursor", respectively). The film thickness of the positive electrode active material layer of positive electrode precursor was 97 μm.

<Production of Negative Electrodes>

Negative electrodes were produced in the same manner as Example 3-1, except that the negative electrode active materials and the film thicknesses on each side of the negative electrode active material layers were as shown in Table 8.

<Production and Evaluation of Lithium Ion Secondary Batteries>

Lithium ion secondary batteries were produced in the same manner as Example 3-1, except that the constant-voltage charge times for pre-doping were as shown in Table 8. The obtained lithium ion secondary batteries were evaluated in the same manner as Example 3-1, except that $V_{max}$=3.1 V and $V_{min}$=2.3 V. The results are shown in Table 8.

Examples 3-29 to 3-53 and Comparative Examples 3-9 to 3-11

<Production of Positive Electrode Precursors>

Positive electrode precursors were produced in the same manner as Example 3-28, except that the positive electrode active materials, the mean particle diameters of the lithium carbonate, the positive electrode active materials, and the parts by weight of the lithium carbonate were as shown in Tables 8 and 9.

<Production of Negative Electrodes>

Negative electrodes were produced in the same manner as Example 3-28, except that the negative electrode active materials and the film thicknesses on each side of the negative electrode active material layers were as shown in Tables 8 and 9.

<Production and Evaluation of Lithium Ion Secondary Batteries>

Lithium ion secondary batteries were produced and evaluated in the same manner as Example 3-28, except that the constant-voltage charge times for pre-doping were as shown in Tables 8 and 9. The results are shown in Table 9.

Comparative Examples 3-12 to 3-16

<Production of Positive Electrode Precursors>

Positive electrode precursors were produced in the same manner as Example 3-28, except that the positive electrode active materials, the mean particle diameters of the lithium carbonate, the positive electrode active materials, and the parts by weight of the lithium carbonate were as shown in Table 9.

<Production of Negative Electrodes>

Negative electrodes were produced in the same manner as Comparative Example 3-4, except that the negative electrode active materials and the film thicknesses on each side of the negative electrode active material layers were as shown in Table 9.

<Production and Evaluation of Lithium Ion Secondary Batteries>

Lithium ion secondary batteries were produced and evaluated in the same manner as Example 3-28, except that the constant-voltage charge times for pre-doping were as shown in Table 9. The results are shown in Table 9.

TABLE 8

| | Positive electrode precursor | | | Negative electrode | | Positive electrode | | | | Initial properties | High-temperature storage properties | |
|---|---|---|---|---|---|---|---|---|---|---|---|---|
| Positive electrode active material | Mean particle diameter of lithium carbonate (μm) | Positive electrode active material (parts by weight) | Lithium carbonate (parts by weight) | Negative electrode active material | Film thickness of negative electrode active material layer per side (μm) | Lithium doping step constant voltage charge time (hr) | Amount of compound of formula (1)-(3) (mol/g) | Mean particle diameter d of lithium carbonate after lithium doping (μm) | Solid $^7$Li-NMR b/a | Q/V1 (Ah/L) | Vb-Va (cc) | Rb/Ra |
| Example 3-28 | LiFePO$_4$ 2.0 | 86.5 | 3.5 | Silicon | 20 | 5 | 6.3 × 10$^{-9}$ | 1.67 | 1.57 | 107 | 5.5 | 2.1 |
| Example 3-29 | 2.0 | 86.5 | 3.5 | Silicon | 20 | 8 | 3.2 × 10$^{-6}$ | 1.64 | 1.62 | 107 | 4.7 | 1.7 |
| Example 3-30 | 2.0 | 86.5 | 3.5 | Silicon | 20 | 14 | 5.6 × 10$^{-4}$ | 1.56 | 1.46 | 107 | 4.0 | 1.4 |
| Example 3-31 | 2.5 | 86.5 | 3.5 | Silicon | 20 | 20 | 3.3 × 10$^{-5}$ | 2.01 | 1.53 | 107 | 4.4 | 1.5 |
| Example 3-32 | 2.5 | 86.5 | 3.5 | Silicon | 20 | 24 | 4.6 × 10$^{-3}$ | 1.99 | 1.58 | 107 | 5.0 | 1.8 |
| Example 3-33 | 2.5 | 86.5 | 3.5 | Silicon | 20 | 48 | 1.7 × 10$^{-2}$ | 1.93 | 1.49 | 107 | 5.2 | 1.9 |
| Example 3-34 | 2.0 | 86.5 | 3.5 | Silicon | 11 | 14 | 6.6 × 10$^{-4}$ | 1.67 | 1.60 | 78 | 3.4 | 1.5 |
| Example 3-35 | 2.0 | 86.5 | 3.5 | Silicon | 50 | 14 | 2.1 × 10$^{-4}$ | 1.56 | 1.61 | 76 | 3.6 | 1.3 |
| Example 3-36 | 2.0 | 86.5 | 3.5 | Silicon monoxide | 25 | 14 | 6.3 × 10$^{-4}$ | 1.71 | 1.57 | 101 | 2.7 | 1.4 |
| Example 3-37 | 2.0 | 86.5 | 3.5 | Tin | 40 | 14 | 2.6 × 10$^{-4}$ | 1.87 | 1.66 | 80 | 4.0 | 1.8 |
| Example 3-38 | 2.0 | 86.5 | 3.5 | Tin dioxide | 50 | 14 | 1.2 × 10$^{-4}$ | 1.75 | 1.58 | 76 | 3.5 | 1.7 |
| Example 3-39 | 2.0 | 86.5 | 3.5 | Composite material 1 | 25 | 14 | 6.7 × 10$^{-4}$ | 1.63 | 1.56 | 101 | 2.3 | 1.4 |
| Example 3-40 | 2.0 | 86.5 | 3.5 | Composite material 2 | 35 | 5 | 5.9 × 10$^{-9}$ | 1.66 | 1.53 | 89 | 3.9 | 1.9 |

TABLE 8-continued

| | Positive electrode precursor | | | Negative electrode | Negative electrode Film thickness of negative electrode active material layer per side (μm) | Lithium doping step constant voltage charge time (hr) | Positive electrode Amount of compound of formula (1)-(3) (mol/g) | Positive electrode Mean particle diameter d of lithium carbonate after lithium doping (μm) | Solid $^7$Li-NMR b/a | Initial properties Q/V1 (Ah/L) | High-temperature storage properties Vb-Va (cc) | High-temperature storage properties Rb/Ra |
|---|---|---|---|---|---|---|---|---|---|---|---|---|
| | Positive electrode active material | Mean particle diameter of lithium carbonate (μm) | Positive electrode active material (parts by weight) | Lithium carbonate (parts by weight) | Negative electrode active material | | | | | | | | |
| Example 3-41 | | 2.0 | 86.5 | 3.5 | Composite material 2 | 35 | 8 | $4.5 \times 10^{-6}$ | 1.73 | 1.49 | 89 | 3.2 | 1.7 |
| Example 3-42 | | 2.0 | 86.5 | 3.5 | Composite material 2 | 35 | 14 | $6.1 \times 10^{-4}$ | 1.70 | 1.60 | 89 | 2.1 | 1.2 |
| Example 3-43 | | 2.5 | 86.5 | 3.5 | Composite material 2 | 35 | 20 | $4.4 \times 10^{-5}$ | 2.38 | 1.56 | 89 | 2.5 | 1.3 |
| Example 3-44 | | 2.5 | 86.5 | 3.5 | Composite material 2 | 35 | 24 | $4.1 \times 10^{-3}$ | 2.34 | 1.58 | 89 | 2.7 | 1.5 |

TABLE 9

| | Positive electrode precursor | | | | Negative electrode Film thickness of negative electrode active material layer per side (μm) | Lithium doping step constant voltage charge time (hr) | Positive electrode Amount of compound of formula (1)-(3) (mol/g) | Positive electrode Mean particle diameter d of lithium carbonate after lithium doping (μm) | Solid $^7$Li-NMR b/a | Initial properties Q/V1 (Ah/L) | High-temperature storage properties Vb-Va (cc) | High-temperature storage properties Rb/Ra |
|---|---|---|---|---|---|---|---|---|---|---|---|---|
| | Positive electrode active material | Mean particle diameter of lithium carbonate (μm) | Positive electrode active material (parts by weight) | Lithium carbonate (parts by weight) | Negative electrode active material | | | | | | | | |
| Example 3-45 | LiFePO$_4$ | 2.5 | 86.5 | 3.5 | Composite material 2 | 35 | 48 | $2.4 \times 10^{-2}$ | 2.22 | 1.59 | 89 | 3.5 | 1.7 |
| Example 3-46 | | 1.0 | 86.5 | 3.5 | Composite material 2 | 35 | 30 | $3.2 \times 10^{-3}$ | 0.54 | 1.57 | 89 | 2.7 | 1.5 |
| Example 3-47 | | 8.0 | 86.5 | 3.5 | Composite material 2 | 35 | 20 | $6.5 \times 10^{-5}$ | 6.59 | 1.55 | 89 | 2.4 | 1.5 |
| Example 3-48 | | 9.5 | 86.5 | 3.5 | Composite material 2 | 35 | 6 | $5.7 \times 10^{-8}$ | 9.75 | 1.52 | 89 | 2.5 | 1.8 |
| Example 3-49 | | 2.0 | 88.5 | 1.5 | Composite material 2 | 35 | 14 | $7.8 \times 10^{-4}$ | 1.56 | 1.04 | 92 | 3.0 | 1.4 |
| Example 3-50 | | 2.0 | 83.0 | 7.0 | Composite material 2 | 35 | 14 | $3.9 \times 10^{-4}$ | 1.77 | 3.03 | 88 | 2.1 | 1.3 |
| Example 3-51 | | 2.0 | 76.0 | 14.0 | Composite material 2 | 35 | 14 | $4.7 \times 10^{-4}$ | 1.93 | 5.21 | 85 | 2.4 | 1.5 |
| Example 3-52 | | 2.0 | 86.5 | 3.5 | Composite material 3 | 50 | 14 | $5.3 \times 10^{-4}$ | 1.74 | 1.45 | 76 | 3.2 | 1.7 |
| Example 3-53 | | 2.0 | 86.5 | 3.5 | Composite material 4 | 60 | 14 | $3.5 \times 10^{-4}$ | 1.79 | 1.68 | 73 | 2.7 | 1.7 |
| Comp. Example 3-9 | | 2.0 | 89.5 | 0.5 | Composite material 2 | 35 | 5 | $1.4 \times 10^{-9}$ | 1.91 | 1.01 | 92 | 24.3 | 7.1 |
| Comp. Example 3-10 | | None | 90.0 | 0.0 | Composite material 2 | 35 | 14 | $7.8 \times 10^{-10}$ | None | 1.00 | 93 | 30.9 | 7.8 |
| Comp. Example 3-11 | | 2.5 | 86.5 | 3.5 | Composite material 2 | 35 | 72 | $3.7 \times 10^{-2}$ | 2.06 | 1.62 | 84 | 8.3 | 3.9 |
| Comp. Example 3-12 | | 2.0 | 86.5 | 3.5 | Artificial graphite | 60 | 14 | $6.2 \times 10^{-4}$ | 1.93 | 1.38 | 63 | 2.1 | 3.2 |
| Comp. Example 3-13 | | None | 90.0 | 0.0 | Artificial graphite | 40 | 14 | $4.2 \times 10^{-10}$ | None | 1.00 | 59 | 15.7 | 4.4 |
| Comp. Example 3-14 | | None | 90.0 | 0.0 | Artificial graphite | 60 | 14 | $6.5 \times 10^{-10}$ | None | 1.00 | 70 | 17.3 | 4.9 |

TABLE 9-continued

| | Positive electrode precursor | | | | Negative electrode | | Positive electrode | | | | | |
|---|---|---|---|---|---|---|---|---|---|---|---|---|
| | | | | | Film thickness of negative electrode active material layer per side (μm) | Lithium doping step constant voltage charge time (hr) | | | | | High-temperature storage properties | |
| | Mean particle diameter of lithium carbonate (μm) | Positive electrode active material (parts by weight) | Lithium carbonate (parts by weight) | Negative electrode active material | | | Amount of compound of formula (1)-(3) (mol/g) | d of lithium carbonate after lithium doping (μm) | Solid $^7$Li-NMR b/a | Initial properties Q/V1 (Ah/L) | | |
| Positive electrode active material | | | | | | | | | | | Vb−Va (cc) | Rb/Ra |
| Comp. Example 3-15 | None | 90.0 | 0.0 | Artificial graphite | 80 | 14 | $7.6 \times 10^{-10}$ | None | 1.00 | 59 | 20.1 | 5.3 |
| Comp. Example 3-16 | 2.0 | 86.5 | 3.5 | Natural graphite | 60 | 14 | $4.2 \times 10^{-4}$ | 1.89 | 1.46 | 65 | 2.2 | 3.3 |

From Tables 6 and 7 it is seen that if the negative electrode active material has an alloy-type negative electrode material that forms an alloy with lithium, then the energy density is increased above that obtained when commonly used graphite or the like is used in the negative electrode. Moreover, it is seen that if the abundance of compounds of formulas (1) to (3) in the positive electrode active material layer is between $3.8 \times 10^{-9}$ mol/g and $3.0 \times 10^{-2}$ mol/g, then Vb−Va and Rb/Ra are small, and it has excellent durability during high-temperature storage. This is believed to be because when the compound in the positive electrode active material layer is present on the coating film on the surface of the positive electrode active material, it covers the reactive sites on the positive electrode active material and prevents decomposition of the nonaqueous electrolytic solution during high-temperature storage.

Examples and comparative examples for the fourth embodiment of the invention will now be described. However, the invention is not limited in any way by these examples and comparative examples.

Example 4-1

[Fabrication of Positive Electrode Precursor]

There were mixed 86.5 parts by weight of $LiCoO_2$ powder (product of Nichia Corp.) as a positive electrode active material, 5.0 parts by weight of acetylene black, 3.5 parts by weight of lithium carbonate with a mean particle diameter of 5.1 μm as a lithium compound, 5.0 parts by weight of PTFE (polytetrafluoroethylene) and NMP (N-methylpyrrolidone), to obtain a positive electrode slurry with a solid concentration of 21 weight %. The obtained positive electrode slurry was coated onto one side of an aluminum foil with a thickness of 15 μm, as the positive electrode power collector, and dried and pressed to obtain a positive electrode precursor. The thickness of the positive electrode active material layer in the obtained positive electrode precursor was 67 μm. The amount of lithium oxide $A_1$ per unit area of the positive electrode precursor was 6.3 g/m², and $A_1/C_1$ was 0.036.

The obtained positive electrode precursor was cut out to a single size of 1.4 cm×2.0 cm (2.8 cm²) for use as the working electrode, and lithium metal was used as the counter electrode and reference electrode, to fabricate an electrochemical cell in an argon box, using a nonaqueous solution of $LiPF_6$ dissolved to a concentration of 1.0 mol/L in propylene carbonate (PC) as the electrolytic solution.

The initial charging capacitance of the electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm² until reaching a voltage value of 4.2 V, and then to constant-voltage charge for 2 hours. Next, constant-current discharge was carried out at a current value of 0.5 mA/cm² until the voltage value reached 3.0 V. The service capacity during constant-current discharge was measured to be 8.4 mAh.

[Fabrication of Negative Electrode]

There were mixed 85.4 parts by weight of commercially available hard carbon (product of Kureha Corp.), 8.3 parts by weight of acetylene black, 6.3 parts by weight of PVdF (polyvinylidene fluoride) and NMP (N-methylpyrrolidone), to obtain a negative electrode slurry. The obtained negative electrode slurry was coated onto one side of a 10 μm-thick electrolytic copper foil as the negative electrode power collector, dried and pressed to obtain negative electrode. The thickness of the negative electrode active material layer in the obtained negative electrode was 117 μm.

[Measurement of Capacitance Per Unit Weight of Negative Electrode]

The obtained negative electrode was cut out to a single size of 1.4 cm×2.0 cm (2.8 cm²) for use as the working electrode, and lithium metal was used as the counter electrode and reference electrode, to fabricate an electrochemical cell in an argon box, using a nonaqueous solution of $LiPF_6$ dissolved to a concentration of 1.0 mol/L in propylene carbonate (PC) as the electrolytic solution.

The initial charging capacitance of the obtained electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm² until reaching a voltage value of 0.01 V, and then to constant-voltage charge until the current value reached 0.01 mA/cm². Upon evaluating the charge capacity during constant-current charge and constant-voltage charge as the initial charge capacity, it was found to be 7.4 mAh, and the capacitance Bi per unit area of the negative electrode was 25.5 Ah/m².

[Fabrication of Lithium Ion Secondary Battery]

The positive electrode precursor fabricated as described above was cut out to a single size of 2.0 cm×2.0 cm (4.0 cm²). The negative electrode fabricated as described above was cut out to a single size of 2.1 cm×2.1 cm (4.4 cm²). A polyethylene separator (product of Asahi Kasei E-Materials Corp., thickness: 20 µm) was also prepared. These were used to fabricate an electrode laminated body by lamination in the order: positive electrode precursor, separator, negative electrode. For this electrode laminated body, $A_1$ was 6.3 g/m² and $B_1$ was 25.5 Ah/m², and therefore the value of $A_1/B_1$ was 0.25 g/Ah, confirming that the condition of the invention was satisfied.

The laminated body was placed in a vessel formed of a laminate film comprising polypropylene and an aluminum foil and was filled with an electrolytic solution comprising $LiPF_6$ dissolved to a concentration of 1.2 mol/L in propylene carbonate (PC), to fabricate an electrochemical cell.

The obtained electrochemical cell was subjected to constant-current charge using a charge/discharge apparatus (TOSCAT-3100U) by Toyo System Co., Ltd., in an environment of 25° C. with a current value of 2 mA until reaching a voltage of 4.5 V, and then to constant-voltage charge at 4.5 V continued for 72 hours, for lithium ion pre-doping of the negative electrode, to fabricate a lithium ion secondary battery for Example 4-1.

A total of three lithium ion secondary batteries were fabricated for Example 4-1, by the same method.

[Initial Properties]

One of the fabricated lithium ion secondary batteries was discharged to 3.0 V in a thermostatic bath set to 25° C. Next, after reaching a voltage of 4.2 V at a charging current of 2 mA, constant-voltage charge was carried out for 1 hour at the same voltage, and constant-current discharge was carried out with a discharge current of 2 mA until the set voltage reached 3.0 V.

The service capacity during this time was 8.1 mAh.

[Initial Equivalent Series Resistance]

After measurement of the initial properties, a Battery HiTester (3561) by Hioki E.E. Corp. was used to measure the equivalent series resistance (ESR) at a frequency of 1 kHz, to be 12.3Ω.

[Presence of Lithium Metal Deposition]

After measurement of the initial equivalent series resistance, the lithium ion secondary battery was disassembled in an argon box and it was confirmed that lithium metal had not been deposited on the surface of the negative electrode.

[High-Load Charge/Discharge Cycle Characteristic]

Using a charge/discharge apparatus (ACD-01) by Aska Electronic Co., Ltd. in a thermostatic bath set to 25° C., the second lithium ion secondary battery was subjected to 500 repeated high-load charge/discharge cycles each with constant-current charge and constant-current discharge at a charge current of 20 mA and a discharge current of 20 mA, between a minimum voltage of 3.0 V and a maximum voltage of 4.2 V. Upon completion of the high-load charge/discharge cycling, the service capacity and ESR were measured by the same method as above.

[High-Temperature Storage Characteristic]

Using a charge/discharge apparatus (ACD-01) by Aska Electronic Co., Ltd. in a thermostatic bath set to 25° C., the third lithium ion secondary battery was subjected to constant-current/constant-voltage charging for 4 hours at a maximum current of 4 mA and a maximum voltage of 4.2 V. Next, the lithium ion secondary battery was immersed in FLUORINERT FC40 (trade name of 3M Corp., fluorine-based inert liquid) having a temperature adjusted to 25° C. to measure the volume, and was then stored for 30 days in a thermostatic bath set to 60° C. After 30 days had elapsed, it was stored for 2 hours in a thermostatic bath adjusted to 25° C., and then the volume of the lithium ion secondary battery was measured by the same method as above.

The volumes before and after storage at 60° C. for 30 days were compared, to confirm that the gas generation volume during storage had not exceeded 0.3 cc.

Comparative Example 4-1

[Fabrication of Positive Electrode 2]

A positive electrode precursor was fabricated by the same method as Example 4-1, except that no lithium carbonate was added. The thickness of the positive electrode active material layer in the obtained positive electrode precursor was 63 µm. The obtained positive electrode precursor was cut out to a single size of 1.4 cm×2.0 cm (2.8 cm²), and the service capacity of the positive electrode precursor was measured by the same method as Example 4-1, to be 8.5 mAh.

[Fabrication of Lithium Ion Secondary Battery]

A total of three lithium ion secondary batteries were fabricated by the same method as Example 4-1, except for using the positive electrode fabricated as described above.

[Evaluation of Lithium Ion Secondary Batteries]

One of the fabricated lithium ion secondary batteries was used for measurement of the initial properties. The service capacity was 6.2 mAh, and the ESR was 12.1Ω. After measurement of the ESR, the lithium ion secondary battery was disassembled in an argon box and it was confirmed that lithium metal had not been deposited on the surface of the negative electrode.

The second lithium ion secondary battery was used for evaluation of the high-load charge/discharge cycle characteristic. The service capacity after high-load charge/discharge cycling was 4.5 Ah, and the ESR was 15.9Ω.

The gas generation volume after high-temperature storage, measured for the third lithium ion secondary battery, was 0.4 cc.

Examples 4-2 to 4-9 and Comparative Examples 4-2 to 4-9

Positive electrode precursors for lithium ion secondary batteries were fabricated in the same manner as Example 4-1, except that the amount of lithium carbonate in the positive electrode precursor and the amount of positive electrode slurry coating the positive electrode power collector were changed.

Negative electrodes for lithium ion secondary batteries were fabricated in the same manner as Example 4-1, except that the amount of negative electrode slurry coating the negative electrode power collector was adjusted.

Lithium ion secondary batteries were fabricated and evaluated by the same method as Example 4-1, except for using the positive electrode precursors and negative electrodes obtained above. The evaluation results are shown in Table 10.

TABLE 10

| | Positive electrode precursor and negative electrode | | | | | Power storage element | | | | | |
|---|---|---|---|---|---|---|---|---|---|---|---|
| | Positive electrode | Positive electrode precursor | | | | Initial properties | | | High-load Charge/discharge property | High-temperature storage properties | |
| | precursor Li compound amount $A_1$ [g/m$^2$] | Negative electrode Capacitance $B_1$ [Ah/m$^2$] | Active material weight $C_1$ [g/m$^2$] | $A_1/B_1$ | $A_1/C_1$ | Initial discharge capacity [mAh] | ESR [Ω] | Metal Li deposition | Discharge capacity after charge/discharge [mAh] | After storage ESR [Ω] | Gas generation [cc] |
| Example 4-1 | 6.3 | 25.5 | 180 | 0.25 | 0.035 | 8.1 | 12.3 | No | 7.3 | 14.1 | 0.3 |
| Example 4-2 | 4.2 | 25.5 | 180 | 0.16 | 0.023 | 7.7 | 12.2 | No | 6.8 | 14.3 | 0.4 |
| Example 4-3 | 2.5 | 25.5 | 181 | 0.10 | 0.014 | 7.5 | 12.1 | No | 6.6 | 14.6 | 0.3 |
| Example 4-4 | 1.8 | 25.5 | 184 | 0.07 | 0.010 | 7.2 | 12.2 | No | 6.1 | 14.7 | 0.2 |
| Example 4-5 | 7.1 | 25.5 | 174 | 0.28 | 0.041 | 7.9 | 12.3 | No | 7.1 | 14.2 | 0.4 |
| Example 4-6 | 8.9 | 32.1 | 176 | 0.28 | 0.051 | 8.2 | 12.0 | No | 7.3 | 14.4 | 0.4 |
| Example 4-7 | 6.5 | 32.1 | 175 | 0.20 | 0.037 | 7.9 | 11.9 | No | 7.1 | 14.5 | 0.3 |
| Example 4-8 | 4.2 | 32.1 | 183 | 0.13 | 0.023 | 7.9 | 12.0 | No | 7.0 | 14.7 | 0.2 |
| Example 4-9 | 2.7 | 32.1 | 183 | 0.08 | 0.015 | 7.4 | 11.9 | No | 6.7 | 14.6 | 0.2 |
| Comp. Example 4-1 | 0.0 | 25.5 | 183 | 0.00 | 0.000 | 6.2 | 12.1 | No | 4.5 | 15.9 | 0.4 |
| Comp. Example 4-2 | 0.5 | 25.5 | 181 | 0.02 | 0.003 | 6.4 | 12.4 | No | 5.1 | 15.8 | 0.3 |
| Comp. Example 4-3 | 1.0 | 25.5 | 174 | 0.04 | 0.006 | 6.5 | 12.1 | No | 5.2 | 15.7 | 0.4 |
| Comp. Example 4-4 | 0.5 | 32.1 | 176 | 0.02 | 0.003 | 6.0 | 12.3 | No | 4.6 | 16.2 | 0.2 |
| Comp. Example 4-5 | 1.0 | 32.1 | 178 | 0.03 | 0.006 | 6.2 | 12.0 | No | 4.8 | 15.4 | 0.3 |
| Comp. Example 4-6 | 8.6 | 25.5 | 181 | 0.34 | 0.048 | 8.2 | 12.5 | Yes | 6.6 | 15.3 | 0.5 |
| Comp. Example 4-7 | 9.2 | 25.5 | 175 | 0.36 | 0.053 | 8.1 | 12.7 | Yes | 6.6 | 15.8 | 0.4 |
| Comp. Example 4-8 | 10.2 | 32.1 | 176 | 0.32 | 0.058 | 8.2 | 12.8 | Yes | 6.9 | 15.5 | 0.5 |
| Comp. Example 4-9 | 14.1 | 32.1 | 178 | 0.44 | 0.079 | 8.1 | 13.2 | Yes | 6.3 | 16.6 | 0.6 |

As seen in Table 10, the service capacity was low when $A_1/C_1$ was less than 0.05. Presumably, this was due to formation of a solid electrolyte film by decomposition of the electrolytic solution on the negative electrode, which resulted in consumption of the lithium ion in the lithium ion secondary battery. When $A_1/C_1$ exceeded 0.30, the service capacity was low, and the resistance value was high. Presumably, in this case, it was due to deposition of lithium metal on the negative electrode, and growth of deposited lithium metal after high-load charge/discharge cycling.

In contrast, it was verified that the service capacity was increased when $A_1/C_1$ was 0.05 to 0.30. Presumably this is because the consumption of lithium ion was offset by oxidation reaction of the lithium compound.

Example 4-10

A lithium ion secondary battery was fabricated by the same method as Example 4-1, except that the conditions for pre-doping of lithium ion into the negative electrode were constant-voltage charge at 4.2 V for 168 hours in a 60° C. environment.

The service capacity of the obtained lithium ion secondary battery was 8.2 mAh.

Comparative Example 4-10

A lithium ion secondary battery was fabricated by the same method as Example 4-2, except that the conditions for pre-doping of lithium ion into the negative electrode were constant-voltage charge at 4.1 V for 168 hours in a 60° C. environment.

The service capacity of the obtained lithium ion secondary battery was 6.7 mAh.

The results of Example 4-10 and Comparative Example 4-10 demonstrated that it is necessary to apply a voltage of 4.2 V or higher in order to decompose the lithium compound added to the positive electrode of the lithium ion secondary battery and pre-dope lithium ion into the negative electrode.

Examples 4-11 to 4-21 and Comparative Examples 4-11 to 4-21

Positive electrode precursors were fabricated, and lithium ion secondary batteries were fabricated using the positive electrode precursors, and evaluated, by the same method as Example 4-1, except for using the types of lithium-containing transition metal oxides listed in Table 11 as the positive electrode active materials and using lithium hydroxide with a mean particle diameter of 3.3 μm as the lithium compound. The amounts of each component used were adjusted so that the values of $A_1$, $B_1$ and $C_1$ were the respective values listed in Table 11.

The evaluation results are shown in Table 11.

TABLE 11

| | Positive electrode precursor and negative electrode | | | | | Power storage element | | | | | |
|---|---|---|---|---|---|---|---|---|---|---|---|
| | | Positive electrode precursor | Positive electrode precursor | | | Initial properties | | | High-load charge/discharge properties | High-temperature storage properties | |
| | Positive electrode active material Type | Li compound $A_1$ [g/m$^2$] | Negative electrode Capacitance $B_1$ [Ah/m$^2$] | Active material weight $C_1$ [g/m$^2$] | $A_1/B_1$  $A_1/C_1$ | Initial discharge capacity [mAh] | ESR [Ω] | Metal Li deposition | Discharge capacity after charge/discharge [mAh] | After storage ESR [Ω] | Gas generation [cc] |
| Example 4-11 | LiCoO$_2$ | 5.5 | 25.5 | 176 | 0.22  0.031 | 8.1 | 12.3 | No | 7.3 | 14.4 | 0.2 |
| Example 4-12 | LiCoO$_2$ | 2.3 | 25.5 | 181 | 0.09  0.013 | 8.2 | 12.1 | No | 7.2 | 14.5 | 0.3 |
| Example 4-13 | LiCoO$_2$ | 1.9 | 25.5 | 178 | 0.07  0.011 | 7.8 | 12.3 | No | 6.8 | 14.8 | 0.2 |
| Comp. Example 4-11 | LiCoO$_2$ | 0.5 | 25.5 | 178 | 0.02  0.003 | 6.5 | 12.5 | No | 5.2 | 15.8 | 0.3 |
| Comp. Example 4-12 | LiCoO$_2$ | 8.9 | 25.5 | 177 | 0.35  0.050 | 8.1 | 12.8 | Yes | 6.6 | 16.5 | 0.4 |
| Comp. Example 4-13 | LiCoO$_2$ | 12.2 | 25.5 | 186 | 0.48  0.066 | 8.3 | 13.3 | Yes | 6.2 | 17.1 | 0.5 |
| Example 4-14 | LiNiO$_2$ | 2.6 | 25.5 | 180 | 0.10  0.014 | 8.0 | 12.2 | No | 7.3 | 14.2 | 0.3 |
| Example 4-15 | LiNiO$_2$ | 5.1 | 25.5 | 180 | 0.20  0.028 | 8.2 | 11.9 | No | 7.5 | 14.1 | 0.2 |
| Example 4-16 | LiNiO$_2$ | 6.2 | 25.5 | 186 | 0.24  0.033 | 8.3 | 12.1 | No | 7.5 | 14.0 | 0.3 |
| Example 4-17 | LiNiO$_2$ | 7.5 | 25.5 | 176 | 0.29  0.043 | 8.1 | 12.5 | No | 7.4 | 14.5 | 0.3 |
| Comp. Example 4-14 | LiNiO$_2$ | 0.0 | 25.5 | 183 | 0.00  0.000 | 6.1 | 12.6 | No | 4.2 | 17.2 | 0.4 |
| Comp. Example 4-15 | LiNiO$_2$ | 0.6 | 25.5 | 175 | 0.02  0.003 | 6.5 | 12.2 | No | 4.8 | 16.6 | 0.3 |
| Comp. Example 4-16 | LiNiO$_2$ | 10.1 | 25.5 | 186 | 0.40  0.054 | 8.3 | 13.0 | Yes | 6.6 | 16.1 | 0.5 |
| Comp. Example 4-17 | LiNiO$_2$ | 13.4 | 25.5 | 176 | 0.53  0.076 | 8.1 | 13.4 | Yes | 6.3 | 16.8 | 0.6 |
| Example 4-18 | LiMnO$_2$ | 2.2 | 25.5 | 188 | 0.09  0.012 | 8.3 | 12.5 | No | 6.9 | 15.1 | 0.2 |
| Example 4-19 | LiMnO$_2$ | 4.6 | 25.5 | 181 | 0.18  0.025 | 8.2 | 12.6 | No | 7.0 | 14.8 | 0.4 |
| Example 4-20 | LiMnO$_2$ | 5.3 | 25.5 | 178 | 0.21  0.030 | 8.1 | 12.7 | No | 7.2 | 15.1 | 0.3 |
| Example 4-21 | LiMnO$_2$ | 7.2 | 25.5 | 183 | 0.28  0.039 | 8.4 | 12.9 | No | 7.1 | 15.2 | 0.3 |
| Comp. Example 4-18 | LiMnO$_2$ | 0.0 | 25.5 | 177 | 0.00  0.000 | 6.3 | 13.1 | No | 4.0 | 17.4 | 0.3 |
| Comp. Example 4-19 | LiMnO$_2$ | 0.4 | 25.5 | 185 | 0.02  0.002 | 6.7 | 13.0 | No | 5.0 | 17.1 | 0.4 |
| Comp. Example 4-20 | LiMnO$_2$ | 9.8 | 25.5 | 176 | 0.38  0.056 | 8.1 | 12.8 | Yes | 6.4 | 16.5 | 0.4 |
| Comp. Example 4-21 | LiMnO$_2$ | 12.7 | 25.5 | 180 | 0.50  0.071 | 8.2 | 12.9 | Yes | 6.2 | 16.9 | 0.5 |

Example 4-22

Positive electrode precursors were fabricated and a total of three lithium ion secondary batteries were fabricated using the positive electrode precursors, and evaluated, by the same method as Example 4-1, except for using LiCoO$_2$ as the positive electrode active material, and using lithium oxide with a mean particle diameter of 7.3 μm as the lithium compound. The amounts of each component used were adjusted so that $A_1$ was 3.2 g/m$^2$, $B_1$ was 25.5 Ah/m$^2$ and $C_1$ was 181 g/m$^2$. The value of $A_1/B_1$ was 0.13 g/Ah and the value of $A_1/C_1$ was 0.018, confirming that the condition of the invention was satisfied.

One of the fabricated lithium ion secondary batteries was used for measurement of the initial properties. The service capacity was 7.9 mAh, and the ESR was 12.2Ω. After measurement of the ESR, the lithium ion secondary battery was disassembled in an argon box and it was confirmed that lithium metal had not been deposited on the surface of the negative electrode.

The second lithium ion secondary battery was used for evaluation of the high-load charge/discharge cycle characteristic. The service capacity after high-load charge/discharge cycling was 7.1 Ah, and the ESR was 14.2Ω.

The gas generation volume after high-temperature storage, measured for the third lithium ion secondary battery, was 0.2 cc.

Example 4-23

After dissolving LiPF$_6$ to a concentration of 1.5 mol/L in a mixed solvent comprising ethylene carbonate (EC) and methyl ethyl carbonate (EMC) in a weight ratio of 1:2, ferrocene was added to 3 weight % as an additive, to prepare an electrolytic solution.

A lithium ion secondary battery was fabricated by the same method as Example 4-1, except that this electrolytic solution was used, and the conditions for pre-doping of lithium ion into the negative electrode were constant-voltage charge at 4.2 V for 168 hours in a 45° C. environment.

The service capacity of the obtained lithium ion secondary battery was 8.5 mAh, and progression of pre-doping of lithium ion in the negative electrode was verified.

Example 4-24

A lithium ion secondary battery was fabricated by the same method as Example 4-23, except for using 3 weight % of titanocene dichloride as an additive in the electrolytic solution.

The service capacity of the obtained lithium ion secondary battery was 8.4 mAh, and progression of pre-doping of lithium ion in the negative electrode was verified.

Example 4-25

A lithium ion secondary battery was fabricated by the same method as Example 4-23, except for using 5 weight % of 12-crown 4-ether as an additive in the electrolytic solution.

The service capacity of the obtained lithium ion secondary battery was 8.5 mAh, and progression of pre-doping of lithium ion in the negative electrode was verified.

The results of Examples 4-23 to 4-25 demonstrated that addition of a Lewis acid or Lewis base to the electrolytic solution lowers the activation energy in the oxidation reaction of the lithium compound, and lowers the temperature required for pre-doping of lithium ion.

Reference Example 4-1

The positive electrode obtained in Example 4-1 was cut out to a single size of 1.4 cm×2.0 cm (2.8 cm$^2$) for use as the working electrode, and lithium metal was used as the counter electrode and reference electrode, to fabricate an electrochemical cell in an argon box, in the same manner as Example 4-1, using a nonaqueous electrolytic solution of LiPF$_6$ dissolved to a concentration of 1.0 mol/L in propylene carbonate (PC) as the electrolytic solution.

The initial charging capacitance of the electrochemical cell was measured by the following procedure using a charge/discharge apparatus (TOSCAT-3100U) by Toyo System Co., Ltd.

The electrochemical cell was subjected to constant-current charge at a temperature of 25° C., with a current value of 0.5 mA/cm$^2$ until reaching a voltage value of 4.2 V, and then to constant-voltage charge for 2 hours. Next, constant-current discharge was carried out at a current value of 0.5 mA/cm$^2$ until the voltage value reached 3.0 V. The service capacity during constant-current discharge was 8.4 mAh.

Examples and comparative examples for the fifth embodiment of the invention will now be described. However, the invention is not limited in any way by these examples and comparative examples.

Example 5-1

[Pulverization of Lithium Carbonate]

Using a rotating/revolving pulverizer (NP-100) by Thinky, Inc., 20 g of lithium carbonate with a mean particle diameter of 53 μm, allowed to stand for 2 hours in an environment with a temperature of 60° C. and a humidity of 80% RH, was cooled to −20° C., and then φ0.1 mm zirconia beads were used for pulverization for 20 minutes at 1700 rpm, to obtain lithium carbonate 1 having a mean particle diameter of 0.5 μm.

[Fabrication of Positive Electrode Precursor]

There were mixed 86.5 parts by weight of LiCoO$_2$ powder (product of Nichia Corp.) as a positive electrode active material, 5.0 parts by weight of lithium carbonate 1, 5.0 parts by weight of acetylene black, 3.5 parts by weight of PVdF (polyvinylidene fluoride) and a mixed solvent comprising NMP (N-methylpyrrolidone) and purified water in a weight ratio of 99:1, to obtain a positive electrode slurry with a solid concentration of 38 weight %. The obtained positive electrode slurry was coated onto one side of an aluminum foil with a thickness of 15 μm, as the positive electrode power collector, and dried to obtain positive electrode precursor 1.

The obtained positive electrode precursor 1 was pressed using a roll press under conditions with a pressure of 6 kN/cm and a pressed portion surface temperature of 25° C. The film thickness of the positive electrode active material layer of the obtained positive electrode precursor 1 was determined by subtracting the thickness of the aluminum foil from the average thickness measured at 10 arbitrary locations of positive electrode precursor 1 using a Linear Gauge Sensor GS-551 by Ono Sokki Co., Ltd. As a result, the film thickness of the positive electrode active material layer was 65 μm.

[Calculation of X]

The weight ratio X of the alkali metal carbonate in the positive electrode active material layer of the positive electrode precursor was calculated by the method described above to be 4.97 weight %.

[Calculation of $A_2$ and $A_3$]

(Sample Preparation)

A small 1 cm×1 cm piece was cut out from positive electrode precursor 1 and used as a sample for microscopic Raman spectroscopy of the positive electrode precursor surface. A small 1 cm×1 cm piece was also cut out from the positive electrode precursor 1, and an SM-09020CP by JEOL Ltd. was used to create a cross-section perpendicular to the in-plane direction of positive electrode precursor 1 using argon gas, under conditions with an acceleration voltage of 4 kV and a beam diameter of 500 μm, as a sample for microscopic Raman spectroscopy of a cross-section of the positive electrode precursor.

(Measurement)

Carbonate ion mapping was performed using an inVia Reflex Raman microscope by Renishaw Co. The excitation light laser wavelength was 532 nm and focusing was to a power of approximately 0.7 mW at the sample position, using a long-working-distance 50× objective lens. Point scanning was performed at 1 μm intervals in a range of 90 μm in the thickness direction of the positive electrode cross-section and 30 μm in the direction perpendicular to the thickness direction, and a Raman spectrum was obtained for each measurement point. For the peak due to carbonate ion observed at 1086 cm$^{-1}$ in the Raman spectrum, a straight baseline was drawn for 1071 cm$^{-1}$ to 1104 cm$^{-1}$, and the area appearing in the positive region from the baseline and the area appearing on the negative side of the baseline were each calculated as peak areas. A negative sign was assigned to the area appearing on the negative side of the baseline. This was traced as the space distribution for the carbonate ion peak area, and an imaging representation for carbonate ion was obtained.

(Calculation of Areas $A_2$ and $A_3$ in Carbonate Ion Mapping)

The area $A_2$ in carbonate ion mapping was calculated as follows. A straight-line baseline was set at positions of 1071 and 1104 cm$^{-1}$ in the Raman spectrum for 2700 points obtained at each measurement position on the surface of the positive electrode precursor, setting the area at the portions higher than the baseline as positive and the areas of the lower portions as negative, to construct the mapping data area (a). Next, the region from the maximum value to the minimum value of the area (a) was divided into 100 zones to construct histogram A, and the portion on the negative side from the area value giving the maximum frequency was fitted by the least square method using a Gaussian function, thereby approximating the noise component by a Gaussian function B. The difference obtained by subtracting the fitted Gaussian function B from the original histogram A was used as histogram C for the peak area of $CO_3^{2-}$. In histogram C, the cumulative frequency greater than the area (b) giving the maximum frequency was determined to be 87, as the mapping frequency for $CO_3^{2-}$ ion. This was divided by the total frequency of 2700 to calculate the area $A_2$ of carbonate ion mapping, which was $A_2=3.02\%$. When the area $A_3$ of carbonate ion mapping of the cross-section of the positive electrode precursor was calculated in the same manner, the result was $A_3=2.91\%$.

[Fabrication of Negative Electrode]

After mixing 84 parts by weight of commercially available hard carbon (CARBOTRON P, product of Kureha Corp.), 10 parts by weight of acetylene black, 6 parts by weight of PVdF (polyvinylidene fluoride) and NMP (N-methylpyrrolidone), the mixture was dispersed using a FILMIX thin-film spinning high-speed mixer by PRIMIX Corp., under conditions with a circumferential speed of 17 m/s, to obtain a coating solution. The coating solution was coated onto one side of a 10 μm-thick electrolytic copper foil using an automatic coating machine by Tester Sangyo Co., Ltd. with an applicator clearance of 200 μm, at a coating speed of 1 m/min, and dried at a drying temperature of 120° C. to obtain negative electrode 1. The obtained negative electrode 1 was pressed using a roll press under conditions with a pressure of 5 kN/cm and a pressed portion surface temperature of 25° C. The film thickness of the negative electrode active material layer of the obtained negative electrode 1 was 88 μm.

[Fabrication of Nonaqueous Alkali Metal-Type Power Storage Element]

(Assembly, Filling, Impregnation and Sealing)

The positive electrode precursor 1 was cut out to a single positive electrode active material layer size of 2.0 cm×2.0 cm and the negative electrode 1 was cut out to a single negative electrode active material layer size of 2.1 cm×2.1 cm, and one 2.3 cm×2.3 cm polyethylene separator (product of Asahi Kasei Corp., thickness: 15 μm) was prepared. These were laminated in the order: positive electrode precursor 1, separator, negative electrode 1, to obtain an electrode laminated body. A positive electrode terminal and negative electrode terminal were ultrasonically welded to the obtained electrode laminated body and placed in a vessel formed of an aluminum laminate package material, and 3 sides including the electrode terminal section were sealed by heat sealing. The electrode laminated body housed in the aluminum laminate package material was filled with 2.0 g of a PC solution of $LiPF_6$ at an electrolytic concentration of 1.2 M, as a nonaqueous electrolytic solution, in a dry air environment with a temperature of 25° C. and a dew point of no higher than −40° C., at atmospheric pressure. Next, the electrode laminated body was placed in a pressure reduction chamber and the pressure was reduced from atmospheric pressure to −87 kPa, after which it was restored to atmospheric pressure and allowed to stand for 5 minutes. The procedure of reducing the pressure from atmospheric pressure to −87 kPa and then restoring to atmospheric pressure was subsequently repeated 4 times, and it was then allowed to stand for 15 minutes. The pressure was again reduced from atmospheric pressure to −91 kPa, and then restored to atmospheric pressure. A procedure of pressure reduction and restoration to atmospheric pressure in the same manner was repeated 7 times. (The pressure reduction was to −95, −96, −97, −81, −97, −97 and −97 kPa, respectively). The electrode laminated body was impregnated with the nonaqueous electrolytic solution by this procedure.

The electrode laminated body impregnated with the nonaqueous electrolytic solution was placed in a pressure-reducing sealing machine, and with the pressure reduced to −95 kPa, it was sealed at 180° C. for 10 seconds at a pressure of 0.1 MPa to seal the aluminum laminate package material.

(Pre-Doping)

The obtained electrode laminated body was placed in an argon box at a temperature of 25° C., a dew point of −60° C. and an oxygen concentration of 1 ppm. The excess portion of the aluminum laminate package material was cut to unseal it, and it was subjected to initial charging by a method of constant-current charge using a power source by Matsusada Precision, Inc. (P4LT18-0.2), with a current value of 2 mA until reaching a voltage of 4.5 V, followed by constant-voltage charge at 4.5 V continued for 2 hours, for pre-doping of the negative electrode. Upon completion of the pre-doping, a heat sealer by Fuji Impulse Co., Ltd. (FA-300) was used to seal the aluminum laminate.

(Aging)

The pre-doped electrode laminated body was removed from the argon box and subjected to constant-current discharge in an environment of 25° C. at 50 mA until reaching a voltage of 3.8 V, and then constant-current discharge at 3.8 V for 1 hour, to adjust the voltage to 3.8 V. The electrode laminated body was then stored for 8 hours in a thermostatic bath at 60° C.

(Degassing)

A portion of the aluminum laminate package material of the aged electrode laminated body was unsealed in a dry air environment with a temperature of 25° C. and a dew point of −40° C. It was then placed in a pressure reduction chamber, and a procedure of using a diaphragm pump (N816.3KT.45.18 by KNF Co.) for pressure reduction over a period of 3 minutes from atmospheric pressure to −80 kPa, followed by restoration to atmospheric pressure over a period of 3 minutes, was repeated 3 times. Next, it was placed in a pressure-reducing sealing machine, and after pressure reduction to −90 kPa, it was sealed at 200° C. for 10 seconds at a pressure of 0.1 MPa to seal the aluminum laminate package material, to fabricate a nonaqueous alkali metal-type power storage element.

[Evaluation of Nonaqueous Alkali Metal-Type Power Storage Element]

(Measurement of Service Capacity)

First, using a charge/discharge apparatus (ACD-01) by Aska Electronic Co., Ltd. in a thermostatic bath set to 25° C., the obtained nonaqueous alkali metal-type power storage element was subjected to constant-current charge at the 0.1C current value (0.8 mA) until 4.2 V was reached, and then constant-voltage charge with application of a constant voltage of 4.2 V, for a total of 30 minutes. After this, the service capacity Q after constant-current discharge to 3.0 V at the 0.1C current value (0.8 mA) was 8.24 mAh.

Example 5-2

A nonaqueous alkali metal-type power storage element was fabricated by the same method as Example 5-1, except that the positive electrode precursor was fabricated using a mixed solvent comprising NMP (N-methylpyrrolidone) and purified water in a weight ratio of 98:2 as the dispersion solvent for the positive electrode coating solution.

Example 5-3

A nonaqueous alkali metal-type power storage element was fabricated by the same method as Example 5-1, except that the positive electrode precursor was fabricated using a mixed solvent comprising NMP (N-methylpyrrolidone) and purified water in a weight ratio of 97:3 as the dispersion solvent for the positive electrode coating solution.

Example 5-4

A nonaqueous alkali metal-type power storage element was fabricated by the same method as Example 5-1, except that the positive electrode precursor was fabricated using 88.2 parts by weight of $LiCoO_2$ powder, 3.1 parts by weight of lithium carbonate 1, 5.1 parts by weight of Ketchen black and 3.6 parts by weight of PVDF (polyvinylidene fluoride), as the composition of the coating solution of the positive electrode.

Example 5-5

A nonaqueous alkali metal-type power storage element was fabricated by the same method as Example 5-4, except that the positive electrode precursor was fabricated using a mixed solvent comprising NMP (N-methylpyrrolidone) and purified water in a weight ratio of 98:2 as the dispersion solvent for the positive electrode coating solution.

Example 5-6

A nonaqueous alkali metal-type power storage element was fabricated by the same method as Example 5-4, except that the positive electrode precursor was fabricated using a mixed solvent comprising NMP (N-methylpyrrolidone) and purified water in a weight ratio of 97:3 as the dispersion solvent for the positive electrode coating solution.

Example 5-7

A nonaqueous alkali metal-type power storage element was fabricated by the same method as Example 5-1, except that the positive electrode precursor was fabricated using 89.6 parts by weight of $LiCoO_2$ powder, 1.6 parts by weight of lithium carbonate 1, 5.2 parts by weight of Ketchen black and 3.6 parts by weight of PVDF (polyvinylidene fluoride), as the composition of the coating solution of the positive electrode.

Example 5-8

A nonaqueous alkali metal-type power storage element was fabricated by the same method as Example 5-7, except that the positive electrode precursor was fabricated using a mixed solvent comprising NMP (N-methylpyrrolidone) and purified water in a weight ratio of 98:2 as the dispersion solvent for the positive electrode coating solution.

Example 5-9

A nonaqueous alkali metal-type power storage element was fabricated by the same method as Example 5-7, except that the positive electrode precursor was fabricated using a mixed solvent comprising NMP (N-methylpyrrolidone) and purified water in a weight ratio of 97:3 as the dispersion solvent for the positive electrode coating solution.

Example 5-10

A nonaqueous alkali metal-type power storage element was fabricated by the same method as Example 5-1, except that the positive electrode precursor was fabricated using 82.0 parts by weight of $LiCoO_2$ powder, 10.0 parts by weight of lithium carbonate 1, 4.7 parts by weight of Ketchen black and 3.3 parts by weight of PVDF (polyvinylidene fluoride), as the composition of the coating solution of the positive electrode.

Example 5-11

A nonaqueous alkali metal-type power storage element was fabricated by the same method as Example 5-10, except that the positive electrode precursor was fabricated using a mixed solvent comprising NMP (N-methylpyrrolidone) and purified water in a weight ratio of 98:2 as the dispersion solvent for the positive electrode coating solution.

Example 5-12

A nonaqueous alkali metal-type power storage element was fabricated by the same method as Example 5-10, except that the positive electrode precursor was fabricated using a mixed solvent comprising NMP (N-methylpyrrolidone) and purified water in a weight ratio of 97:3 as the dispersion solvent for the positive electrode coating solution.

Example 5-13

A nonaqueous alkali metal-type power storage element was fabricated by the same method as Example 5-1, except that the positive electrode precursor was fabricated using 77.8 parts by weight of $LiCoO_2$ powder, 14.5 parts by weight of lithium carbonate 1, 4.5 parts by weight of Ketchen black and 3.2 parts by weight of PVDF (polyvinylidene fluoride), as the composition of the coating solution of the positive electrode.

Example 5-14

A nonaqueous alkali metal-type power storage element was fabricated by the same method as Example 5-13, except that the positive electrode precursor was fabricated using a mixed solvent comprising NMP (N-methylpyrrolidone) and purified water in a weight ratio of 98:2 as the dispersion solvent for the positive electrode coating solution.

Example 5-15

A nonaqueous alkali metal-type power storage element was fabricated by the same method as Example 5-13, except that the positive electrode precursor was fabricated using a mixed solvent comprising NMP (N-methylpyrrolidone) and purified water in a weight ratio of 97:3 as the dispersion solvent for the positive electrode coating solution.

Example 5-16

A nonaqueous alkali metal-type power storage element was fabricated by the same method as Example 5-1, except that the positive electrode precursor was fabricated using 73.3 parts by weight of $LiCoO_2$ powder, 19.5 parts by weight of lithium carbonate 1, 4.2 parts by weight of Ketchen black and 3.0 parts by weight of PVDF (polyvinylidene fluoride), as the composition of the coating solution of the positive electrode.

Example 5-17

A nonaqueous alkali metal-type power storage element was fabricated by the same method as Example 5-16, except that the positive electrode precursor was fabricated using a mixed solvent comprising NMP (N-methylpyrrolidone) and purified water in a weight ratio of 98:2 as the dispersion solvent for the positive electrode coating solution.

Example 5-18

A nonaqueous alkali metal-type power storage element was fabricated by the same method as Example 5-16, except that the positive electrode precursor was fabricated using a mixed solvent comprising NMP (N-methylpyrrolidone) and purified water in a weight ratio of 97:3 as the dispersion solvent for the positive electrode coating solution.

Comparative Example 5-1

Using a rotating/revolving pulverizer (NP-100) by Thinky, Inc., 20 g of lithium carbonate with a mean particle diameter of 53 μm was pulverized for 20 minutes at 1700 rpm using 0.1 mm zirconia beads, in a 25° C. environment, to obtain lithium carbonate 2 having a mean particle diameter of 1.6 μm.

A nonaqueous alkali metal-type power storage element was fabricated by the same method as Example 5-1, except that the positive electrode precursor was fabricated using 90.6 parts by weight of $LiCoO_2$ powder, 0.5 part by weight of lithium carbonate 2, 5.2 parts by weight of Ketchen black, 3.7 parts by weight of PVDF (polyvinylidene fluoride) and NMP (N-methylpyrrolidone) as the dispersion solvent, as the composition of the coating solution of the positive electrode.

Comparative Example 5-2

A nonaqueous alkali metal-type power storage element was fabricated by the same method as Comparative Example 5-1, except that the positive electrode precursor was fabricated using a mixed solvent comprising NMP (N-methylpyrrolidone) and purified water in a weight ratio of 99.9:0.1 as the dispersion solvent for the positive electrode coating solution.

Comparative Example 5-3

A nonaqueous alkali metal-type power storage element was fabricated by the same method as Comparative Example 5-1, except that the positive electrode precursor was fabricated using 91.0 parts by weight of $LiCoO_2$ powder, 0.1 part by weight of lithium carbonate 2, 5.2 parts by weight of Ketchen black, 3.7 parts by weight of PVDF (polyvinylidene fluoride) and NMP (N-methylpyrrolidone) as the dispersion solvent, as the composition of the coating solution of the positive electrode.

Comparative Example 5-4

A nonaqueous alkali metal-type power storage element was fabricated by the same method as Comparative Example 5-3, except that the positive electrode precursor was fabricated using a mixed solvent comprising NMP (N-methylpyrrolidone) and purified water in a weight ratio of 99.9:0.1 as the dispersion solvent for the positive electrode coating solution.

Comparative Example 5-5

A nonaqueous alkali metal-type power storage element was fabricated by the same method as Comparative Example 5-1, except that the positive electrode precursor was fabricated using 86.5 parts by weight of $LiCoO_2$ powder, 5.0 parts by weight of lithium carbonate 2, 5.0 parts by weight of Ketchen black, 3.5 parts by weight of PVDF (polyvinylidene fluoride) and NMP (N-methylpyrrolidone) as the dispersion solvent, as the composition of the coating solution of the positive electrode.

Comparative Example 5-6

A nonaqueous alkali metal-type power storage element was fabricated by the same method as Comparative Example 5-5, except that the positive electrode precursor was fabricated using a mixed solvent comprising NMP (N-methylpyrrolidone) and purified water in a weight ratio of 99.9:0.1 as the dispersion solvent for the positive electrode coating solution.

Comparative Example 5-7

A nonaqueous alkali metal-type power storage element was fabricated by the same method as Comparative Example 5-1, except that the positive electrode precursor was fabricated using 82.0 parts by weight of $LiCoO_2$ powder, 10.0 parts by weight of lithium carbonate 2, 4.7 parts by weight of Ketchen black, 3.3 parts by weight of PVDF (polyvinylidene fluoride) and NMP (N-methylpyrrolidone) as the dispersion solvent, as the composition of the coating solution of the positive electrode.

Comparative Example 5-8

A nonaqueous alkali metal-type power storage element was fabricated by the same method as Comparative Example 5-7, except that the positive electrode precursor was fabricated using a mixed solvent comprising NMP (N-methylpyrrolidone) and purified water in a weight ratio of 80:20 as the dispersion solvent for the positive electrode coating solution.

Comparative Example 5-9

A nonaqueous alkali metal-type power storage element was fabricated by the same method as Comparative Example 5-1, except that the positive electrode precursor was fabricated using 77.8 parts by weight of $LiCoO_2$ powder, 14.6 parts by weight of lithium carbonate 2, 4.5 parts by weight of Ketchen black, 3.1 parts by weight of PVDF (polyvinylidene fluoride) and a mixed solvent comprising NMP (N-methylpyrrolidone) and purified water in a weight ratio of 90:10, as the dispersion solvent, as the composition of the coating solution of the positive electrode.

Comparative Example 5-10

A nonaqueous alkali metal-type power storage element was fabricated by the same method as Comparative Example 5-9, except that the positive electrode precursor was fabricated using a mixed solvent comprising NMP (N-methylpyrrolidone) and purified water in a weight ratio of 80:20 as the dispersion solvent for the positive electrode coating solution.

Comparative Example 5-11

A nonaqueous alkali metal-type power storage element was fabricated by the same method as Comparative Example 5-1, except that the positive electrode precursor was fabricated using 70.5 parts by weight of LiCoO$_2$ powder, 22.5 parts by weight of lithium carbonate 2, 4.1 parts by weight of Ketchen black, 2.9 parts by weight of PVDF (polyvinylidene fluoride) and a mixed solvent comprising NMP (N-methylpyrrolidone) and purified water in a weight ratio of 90:10, as the dispersion solvent, as the composition of the coating solution of the positive electrode.

Comparative Example 5-12

A nonaqueous alkali metal-type power storage element was fabricated by the same method as Comparative Example 5-11, except that the positive electrode precursor was fabricated using a mixed solvent comprising NMP (N-methylpyrrolidone) and purified water in a weight ratio of 80:20 as the dispersion solvent for the positive electrode coating solution.

The evaluation results for the positive electrode precursors and the evaluation results for the nonaqueous alkali metal-type power storage elements, in Examples 5-1 to 5-18 and Comparative Examples 5-1 to 5-12, are shown in Table 12.

polymer on the negative electrode surface, thus lowering the service capacity, when X was greater than 20, the alkali metal carbonate excessively covered the surface of the active material, and therefore the pre-doping rate was slowed, when $A_2$ was less than 1 or $A_2/X$ was less than 0.5, electron conduction between the positive electrode active material and the alkali metal carbonate was insufficient, and therefore reaction overvoltage was increased during pre-doping, and when $A_2$ was greater than 30 or $A_2/X$ was greater than 2.0, the alkali metal carbonate excessively covered the surface of the positive electrode active material, and therefore diffusion of alkali metal ions produced by oxidative decomposition of the alkali metal carbonate, into the electrolytic solution, was inhibited, and the pre-doping rate was slowed. In other words, alkali metal ions consumed during formation of the solid polymer film on the surface of the negative electrode was compensated by the alkali metal carbonate in the positive electrode precursor, thereby allowing the capacitance of the positive electrode active material to be maximally utilized.

Moreover, it is conjectured that addition of a trace amount of purified water to NMP during dispersion of the coating

TABLE 12

|  | X [weight %] | $A_2$ [%] | $A_2/X$ | $A_3$ [%] | $A_3/X$ | Q [mAh] |
|---|---|---|---|---|---|---|
| Example 5-1 | 4.97 | 3.02 | 0.61 | 2.91 | 0.59 | 8.24 |
| Example 5-2 | 5.02 | 6.21 | 1.24 | 5.84 | 1.16 | 8.41 |
| Example 5-3 | 4.91 | 9.40 | 1.91 | 9.12 | 1.86 | 8.38 |
| Example 5-4 | 3.11 | 2.53 | 0.81 | 2.13 | 0.68 | 8.11 |
| Example 5-5 | 3.08 | 4.65 | 1.51 | 4.54 | 1.47 | 8.23 |
| Example 5-6 | 3.05 | 5.87 | 1.92 | 5.69 | 1.87 | 8.19 |
| Example 5-7 | 1.55 | 1.13 | 0.73 | 1.15 | 0.74 | 7.96 |
| Example 5-8 | 1.54 | 1.87 | 1.21 | 1.75 | 1.14 | 8.03 |
| Example 5-9 | 1.59 | 2.90 | 1.82 | 2.85 | 1.79 | 8.05 |
| Example 5-10 | 10.11 | 5.23 | 0.52 | 5.90 | 0.58 | 8.33 |
| Example 5-11 | 10.02 | 9.14 | 0.91 | 8.40 | 0.84 | 8.41 |
| Example 5-12 | 9.97 | 14.32 | 1.44 | 13.90 | 1.39 | 8.39 |
| Example 5-13 | 14.51 | 7.54 | 0.52 | 7.34 | 0.51 | 8.42 |
| Example 5-14 | 14.46 | 13.79 | 0.95 | 13.11 | 0.91 | 8.50 |
| Example 5-15 | 14.53 | 22.65 | 1.56 | 21.56 | 1.48 | 8.40 |
| Example 5-16 | 19.52 | 11.12 | 0.57 | 10.32 | 0.53 | 8.31 |
| Example 5-17 | 19.58 | 18.97 | 0.97 | 17.79 | 0.91 | 8.47 |
| Example 5-18 | 19.46 | 28.97 | 1.49 | 27.69 | 1.42 | 8.52 |
| Comp. Example 5-1 | 0.51 | 0.12 | 0.24 | 0.10 | 0.20 | 5.56 |
| Comp. Example 5-2 | 0.48 | 0.21 | 0.44 | 0.18 | 0.38 | 6.18 |
| Comp. Example 5-3 | 0.11 | 0.03 | 0.27 | 0.02 | 0.18 | 4.89 |
| Comp. Example 5-4 | 0.10 | 0.04 | 0.40 | 0.04 | 0.40 | 5.45 |
| Comp. Example 5-5 | 4.95 | 1.35 | 0.27 | 1.12 | 0.23 | 6.87 |
| Comp. Example 5-6 | 5.01 | 1.88 | 0.38 | 1.79 | 0.36 | 7.23 |
| Comp. Example 5-7 | 10.03 | 2.93 | 0.29 | 2.88 | 0.29 | 6.95 |
| Comp. Example 5-8 | 10.01 | 4.23 | 0.42 | 4.10 | 0.41 | 7.36 |
| Comp. Example 5-9 | 14.55 | 32.20 | 2.21 | 31.34 | 2.15 | 7.36 |
| Comp. Example 5-10 | 14.48 | 39.12 | 2.70 | 38.86 | 2.68 | 6.61 |
| Comp. Example 5-11 | 22.51 | 46.11 | 2.05 | 45.58 | 2.02 | 6.80 |
| Comp. Example 5-12 | 22.53 | 52.30 | 2.32 | 49.44 | 2.19 | 6.22 |

Without being limited to theory, it is believed that decomposition of the alkali metal carbonate in the positive electrode precursor and pre-doping of the negative electrode with alkali metal ions that can contribute to charge/discharge, as well as their release into the electrolytic solution, promotes charge/discharge of the nonaqueous alkali metal-type power storage element.

From Table 12 it is inferred that the service capacity of the nonaqueous alkali metal-type power storage element is at maximum value when $1 \leq X \leq 20$, $1 \leq A_2 \leq 30$ and $0.5 \leq A_2/X \leq 2.0$ are all satisfied. Without being limited to theory, it is conjectured that when X was less than 1, alkali metal ions were consumed for formation of the coating film of the solid solution of the positive electrode allowed a trace amount of the alkali metal carbonate to dissolve in the coating solution, suitably adhering onto the active material surface and conductive aid surface. For this reason, it is believed, the alkali metal carbonate could be efficiently decomposed during pre-doping, and pre-doping could be carried out in the very short period of time of 2 hours. On the other hand, when the amount of purified water was 10% or greater, presumably dissolution of the alkali metal carbonate proceeded excessively, and the alkali metal carbonate excessively covered the positive electrode active material surface and conductive aid surface, such that impregnation of the electrolytic solution was insufficient, and decomposition of the alkali metal carbonate was inhibited.

Example 5-19

A nonaqueous alkali metal-type power storage element was fabricated by the same method as Example 5-1, except for using sodium carbonate ($Na_2CO_3$) as the alkali metal carbonate.

Example 5-20

A nonaqueous alkali metal-type power storage element was fabricated by the same method as Example 5-1, except for using potassium carbonate ($K_2CO_3$) as the alkali metal carbonate.

Example 5-21

A nonaqueous alkali metal-type power storage element was fabricated by the same method as Example 5-1, except for using a mixture of lithium carbonate and sodium carbonate in a weight ratio of 9:1 as the alkali metal carbonate.

Example 5-22

A nonaqueous alkali metal-type power storage element was fabricated by the same method as Example 5-1, except for using a mixture of lithium carbonate and sodium carbonate in a weight ratio of 1:1 as the alkali metal carbonate.

Example 5-23

A nonaqueous alkali metal-type power storage element was fabricated by the same method as Example 5-1, except for using a mixture of lithium carbonate and sodium carbonate in a weight ratio of 1:9 as the alkali metal carbonate.

Example 5-24

A nonaqueous alkali metal-type power storage element was fabricated by the same method as Example 5-1, except for using a mixture of lithium carbonate and potassium carbonate in a weight ratio of 9:1 as the alkali metal carbonate.

Example 5-25

A nonaqueous alkali metal-type power storage element was fabricated by the same method as Example 5-1, except for using a mixture of lithium carbonate and rubidium carbonate ($Rb_2CO_3$) in a weight ratio of 9:1 as the alkali metal carbonate.

Example 5-26

A nonaqueous alkali metal-type power storage element was fabricated by the same method as Example 5-1, except for using a mixture of lithium carbonate and cesium carbonate ($Cs_2CO_3$) in a weight ratio of 9:1 as the alkali metal carbonate.

Example 5-27

A nonaqueous alkali metal-type power storage element was fabricated by the same method as Example 5-1, except for using a mixture of lithium carbonate, sodium carbonate and potassium carbonate in a weight ratio of 9:0.5:0.5 as the alkali metal carbonate.

Comparative Example 5-13

A nonaqueous alkali metal-type power storage element was fabricated by the same method as Example 5-19, except for using a mixed solvent of NMP (N-methylpyrrolidone) and purified water in a weight ratio of 90:10 as the dispersion solvent for the positive electrode coating solution.

Comparative Example 5-14

A nonaqueous alkali metal-type power storage element was fabricated by the same method as Example 5-20, except for using a mixed solvent of NMP (N-methylpyrrolidone) and purified water in a weight ratio of 90:10 as the dispersion solvent for the positive electrode coating solution.

Comparative Example 5-15

A nonaqueous alkali metal-type power storage element was fabricated by the same method as Example 5-21, except for using a mixed solvent of NMP (N-methylpyrrolidone) and purified water in a weight ratio of 90:10 as the dispersion solvent for the positive electrode coating solution.

Comparative Example 5-16

A nonaqueous alkali metal-type power storage element was fabricated by the same method as Example 5-22, except for using a mixed solvent of NMP (N-methylpyrrolidone) and purified water in a weight ratio of 90:10 as the dispersion solvent for the positive electrode coating solution.

Comparative Example 5-17

A nonaqueous alkali metal-type power storage element was fabricated by the same method as Example 5-23, except for using a mixed solvent of NMP (N-methylpyrrolidone) and purified water in a weight ratio of 90:10 as the dispersion solvent for the positive electrode coating solution.

Comparative Example 5-18

A nonaqueous alkali metal-type power storage element was fabricated by the same method as Example 24, except for using a mixed solvent of NMP (N-methylpyrrolidone) and purified water in a weight ratio of 90:10 as the dispersion solvent for the positive electrode coating solution.

Comparative Example 5-19

A nonaqueous alkali metal-type power storage element was fabricated by the same method as Example 5-25, except for using a mixed solvent of NMP (N-methylpyrrolidone) and purified water in a weight ratio of 90:10 as the dispersion solvent for the positive electrode coating solution.

Comparative Example 5-20

A nonaqueous alkali metal-type power storage element was fabricated by the same method as Example 5-26, except for using a mixed solvent of NMP (N-methylpyrrolidone) and purified water in a weight ratio of 90:10 as the dispersion solvent for the positive electrode coating solution.

Comparative Example 5-21

A nonaqueous alkali metal-type power storage element was fabricated by the same method as Example 5-27, except for using a mixed solvent of NMP (N-methylpyrrolidone) and purified water in a weight ratio of 90:10 as the dispersion solvent for the positive electrode coating solution.

Example 5-28

A nonaqueous alkali metal-type power storage element was fabricated by the same method as Example 5-1, except for using a mixture of lithium carbonate and sodium oxide (NaO) in a weight ratio of 9:1 as the alkali metal carbonate.

Example 5-29

A nonaqueous alkali metal-type power storage element was fabricated by the same method as Example 5-1, except for using a mixture of lithium carbonate and potassium hydroxide (KOH) in a weight ratio of 1:1 as the alkali metal carbonate.

Example 5-30

A nonaqueous alkali metal-type power storage element was fabricated by the same method as Example 5-1, except for using a mixture of lithium carbonate and sodium chloride (NaCl) in a weight ratio of 9:1 as the alkali metal carbonate.

Example 5-31

A nonaqueous alkali metal-type power storage element was fabricated by the same method as Example 5-1, except for using a mixture of lithium carbonate and potassium fluoride (KF) in a weight ratio of 9:1 as the alkali metal carbonate.

The evaluation results for the positive electrode precursors and the evaluation results for the nonaqueous alkali metal-type power storage elements, in Examples 5-19 to 5-31 and Comparative Examples 5-13 to 5-21, are shown in Table 13.

TABLE 13

| | Alkali metal carbonate | | | | | | | |
|---|---|---|---|---|---|---|---|---|
| | Mixture | Mixing ratio | X [weight %] | $A_2$ [%] | $A_2/X$ | $A_3$ [%] | $A_3/X$ | Q [mAh] |
| Example 5-19 | $Na_2CO_3$ | 1 | 5.01 | 3.54 | 0.71 | 3.43 | 0.68 | 8.12 |
| Example 5-20 | $K_2CO_3$ | 1 | 5.03 | 3.23 | 0.64 | 3.15 | 0.63 | 8.02 |
| Example 5-21 | $Li_2CO_3$ $Na_2CO_3$ | 9:1 | 4.98 | 3.45 | 0.69 | 3.22 | 0.65 | 8.34 |
| Example 5-22 | $Li_2CO_3$ $Na_2CO_3$ | 1:1 | 5.02 | 3.64 | 0.73 | 3.52 | 0.70 | 8.29 |
| Example 5-23 | $Li_2CO_3$ $Na_2CO_3$ | 1:9 | 5.05 | 3.22 | 0.64 | 3.05 | 0.60 | 8.41 |
| Example 5-24 | $Li_2CO_3$ $K_2CO_3$ | 9:1 | 4.95 | 3.30 | 0.67 | 3.10 | 0.63 | 8.17 |
| Example 5-25 | $Li_2CO_3$ $Rb_2CO_3$ | 9:1 | 4.98 | 3.51 | 0.70 | 3.23 | 0.65 | 8.22 |
| Example 5-26 | $Li_2CO_3$ $Cs_2CO_3$ | 9:1 | 4.99 | 3.15 | 0.63 | 2.89 | 0.58 | 8.35 |
| Example 5-27 | $Li_2CO_3$ $Na_2CO_3$ $K_2CO_3$ | 9:0.5:0.5 | 5.00 | 3.61 | 0.72 | 3.41 | 0.68 | 8.41 |
| Comp. Example 5-13 | $Na_2CO_3$ | 1 | 4.95 | 11.21 | 2.26 | 10.89 | 2.20 | 6.32 |
| Comp. Example 5-14 | $K_2CO_3$ | 1 | 5.01 | 10.65 | 2.13 | 10.56 | 2.11 | 6.12 |
| Comp. Example 5-15 | $Li_2CO_3$ $Na_2CO_3$ | 9:1 | 5.00 | 11.34 | 2.27 | 11.12 | 2.22 | 6.42 |
| Comp. Example 5-16 | $Li_2CO_3$ $Na_2CO_3$ | 1:1 | 5.05 | 11.33 | 2.24 | 11.03 | 2.18 | 6.32 |
| Comp. Example 5-17 | $Li_2CO_3$ $Na_2CO_3$ | 1:9 | 4.94 | 10.89 | 2.20 | 10.84 | 2.19 | 6.42 |
| Comp. Example 5-18 | $Li_2CO_3$ $K_2CO_3$ | 9:1 | 5.03 | 10.82 | 2.15 | 10.64 | 2.12 | 6.35 |
| Comp. Example 5-19 | $Li_2CO_3$ $Rb_2CO_3$ | 9:1 | 4.97 | 11.12 | 2.24 | 10.79 | 2.17 | 6.29 |
| Comp. Example 5-20 | $Li_2CO_3$ Cs2CO3 | 9:1 | 5.01 | 10.79 | 2.15 | 10.59 | 2.11 | 6.31 |
| Comp. Example 5-21 | $Li_2CO_3$ $Na_2CO_3$ $K_2CO_3$ | 9:0.5:0.5 | 5.03 | 11.21 | 2.23 | 11.01 | 2.19 | 6.30 |
| Example 5-28 | $Li_2CO_3$ $Na_2O$ | 9:1 | 5.03 | 2.79 | 0.55 | 2.63 | 0.52 | 8.37 |
| Example 5-29 | $Li_2CO_3$ KOH | 9:1 | 5.05 | 2.89 | 0.57 | 2.78 | 0.55 | 8.25 |
| Example 5-30 | $Li_2CO_3$ NaCl | 9:1 | 5.00 | 2.93 | 0.59 | 2.72 | 0.54 | 8.28 |
| Example 5-31 | $Li_2CO_3$ KF | 9:1 | 4.97 | 2.81 | 0.57 | 2.69 | 0.54 | 8.43 |

As seen in Table 13, the maximum values for service capacity were exhibited when $1 \leq X \leq 20$, $1 \leq A_2 \leq 30$ and $0.5 \leq A_2/X \leq 2.0$ were all satisfied, even when using an alkali metal carbonate other than lithium or a compound other than a carbonate. It is believed that a sufficient amount of alkali metal ions could be provided to the nonaqueous electrolytic solution and negative electrode of the nonaqueous alkali metal-type power storage element.

INDUSTRIAL APPLICABILITY

The lithium ion secondary battery of the invention may be connected as a plurality of lithium ion secondary batteries in series or in parallel to create a power storage module, for example. The lithium ion secondary battery and power storage module of the invention may be suitably utilized in various power storage systems such as, for example: a power regenerating system of an automobile hybrid drive system; a power load-leveling system for natural power generation such as solar power generation or wind power generation, or a micro grid; an uninterruptable power source system for factory production equipment or the like; a non-contact power supply system designed for leveling of voltage fluctuation in microwave power transmission or electrolytic resonance, or energy storage; or an energy harvesting system designed for utilization of electric power generated by vibration or the like, which are purposes that require a high-load charge/discharge cycle characteristic.

The invention claimed is:

1. A lithium ion secondary battery comprising a positive electrode, a negative electrode, a separator and a lithium ion-containing nonaqueous electrolytic solution, wherein,
   the negative electrode has a negative electrode power collector, and a negative electrode active material layer containing a negative electrode active material provided on one or both sides of the negative electrode power collector,
   the positive electrode has a positive electrode power collector, and a positive electrode active material layer containing a positive electrode active material provided on one or both sides of the positive electrode power collector, the positive electrode active material containing a transition metal oxide capable of intercalating and releasing lithium ions, and
   the positive electrode active material layer comprises $3.8 \times 10^{-9}$ mol/g to $3.0 \times 10^{-2}$ mol/g of one or more compounds selected from the group consisting of the following formulas (1) to (3) per unit weight of the positive electrode active material layer;

[Chemical Formula 1]

$$\text{LiX}^1\text{—OR}^1\text{O—X}^2\text{Li} \qquad (1)$$

in formula (1), $R^1$ is —$C_2H_4$— or —$C_3H_6$—, and $X^1$ and $X^2$ are each independently —$(COO)_n$ (where n is 0 or 1),

[Chemical Formula 2]

$$\text{LiX}^1\text{—OR}^1\text{O—X}^2\text{R}^2 \qquad (2)$$

in formula (2), $R^1$ —$C_2H_4$— or —$C_3H_6$—, $R^2$ is hydrogen, —$CH_3$ or —$C_2H_5$, and $X^1$ and $X^2$ are each independently —$(COO)_n$ (where n is 0 or 1), and

[Chemical Formula 3]

$$R^2X^1\text{—OR}^1\text{O—X}^2R^3 \qquad (3)$$

in formula (3), $R^1$ is —$C_2H_4$— or —$C_3H_6$—, $R^2$ and $R^3$ are each independently hydrogen, —$CH_3$ or —$C_2H_5$, and $X^1$ and $X^2$ are each independently —$(COO)_n$ (where n is 0 or 1), and
   wherein $1.04 \leq b/a \leq 5.56$ is satisfied, where, in a solid $^7$Li—NMR spectrum of the positive electrode active material layer, "a" is the peak area at −40 ppm to 40 ppm, obtained by measurement with a repeated latency of 10 seconds, and "b" is the peak area at −40 ppm to 40 ppm, obtained by measurement with a repeated latency of 3000 seconds.

2. The lithium ion secondary battery according to claim 1, wherein a pore distribution curve representing the relationship between pore size and log differential pore volume, in measurement of the pore distribution of the positive electrode active material layer by mercury intrusion, has at least one peak with a peak value of 0.10 mL/g to 1.0 mL/g for the log differential pore volume in a pore size range of 0.3 µm to 50 µm, and a total cumulative pore volume Vp in the pore size range of 0.3 µm to 50 µm is 0.03 mL/g to 0.2 mL/g.

3. The lithium ion secondary battery according to claim 1, wherein a pore distribution curve representing the relationship between pore size and log differential pore volume, in measurement of the pore distribution of the positive electrode active material layer by mercury intrusion, has at least two peaks with a peak value of 0.10 mL/g to 1.0 mL/g for the log differential pore volume in the pore size range of 0.1 µm to 50 µm.

4. The lithium ion secondary battery according to claim 1, wherein a pore distribution curve representing the relationship between pore size and log differential pore volume, in measurement of the pore distribution of the positive electrode active material layer by mercury intrusion, has at least one peak with a peak value of 0.10 mL/g to 1.0 mL/g for the log differential pore volume in the pore size range of 0.5 µm to 20 µm.

5. The lithium ion secondary battery according to claim 1, wherein the negative electrode active material contains an alloy-type negative electrode material that forms an alloy with lithium.

6. The lithium ion secondary battery according to claim 5, wherein the alloy-type negative electrode material is one or more selected from the group consisting of silicon, silicon compounds, tin, tin compounds, and composite materials of these with carbon or carbonaceous materials.

7. The lithium ion secondary battery according to claim 5, wherein a film thickness of the negative electrode active material layer is 10 µm to 75 µm for each side.

8. The lithium ion secondary battery according to claim 1, wherein the positive electrode contains one or more lithium compounds different from the transition metal oxide, and a mean particle diameter of the lithium compound is 0.1 µm to 10 µm.

9. The lithium ion secondary battery according to claim 8, wherein the lithium compound is one or more lithium compounds selected from the group consisting of lithium carbonate, lithium oxide and lithium hydroxide.

10. The lithium ion secondary battery according to claim 8, wherein the lithium compound in the positive electrode is lithium carbonate.

11. The lithium ion secondary battery according to claim 1, wherein the separator contains a polymer that swells by infiltration of the nonaqueous electrolytic solution.

12. The lithium ion secondary battery according to claim 1, wherein the separator contains a solid electrolyte.

13. The lithium ion secondary battery according to claim 12, wherein the solid electrolyte contains one or more compounds selected from among inorganic oxides and inorganic sulfides having lithium ion conductivity.

14. A power storage module employing a lithium ion secondary battery according to claim 1.

15. A power regenerating system employing a lithium ion secondary battery according to claim 1.

16. A power load-leveling system employing a lithium ion secondary battery according to claim 1.

17. An uninterruptable power source system employing a lithium ion secondary battery according to claim 1.

18. A non-contact power supply system employing a lithium ion secondary battery according to claim 1.

19. An energy harvesting system employing a lithium ion secondary battery according to claim 1.

20. A power storage system employing a lithium ion secondary battery according to claim 1.

* * * * *